United States Patent
Nakayama

(10) Patent No.: US 9,715,126 B2
(45) Date of Patent: Jul. 25, 2017

(54) IMAGE BLUR CORRECTION DEVICE AND IMAGING APPARATUS HAVING OPERATING SURFACE SLIDABLE ON A ROUNDED SURFACE OF A DRIVEN PORTION

(71) Applicant: SONY CORPORATION, Tokyo (JP)

(72) Inventor: Tatsuyuki Nakayama, Kanagawa (JP)

(73) Assignee: SONY CORPORATION, Tokyo (JP)

(*) Notice: Subject to any disclaimer, the term of this patent is extended or adjusted under 35 U.S.C. 154(b) by 209 days.

(21) Appl. No.: 14/447,960

(22) Filed: Jul. 31, 2014

(65) Prior Publication Data

US 2015/0043077 A1 Feb. 12, 2015

(30) Foreign Application Priority Data

Aug. 12, 2013 (JP) ................. 2013-167624

(51) Int. Cl.
*G02B 27/64* (2006.01)
*G03B 5/00* (2006.01)

(52) U.S. Cl.
CPC ............ *G02B 27/646* (2013.01); *G03B 5/00* (2013.01); *G03B 2205/0023* (2013.01)

(58) Field of Classification Search
None
See application file for complete search history.

(56) References Cited

U.S. PATENT DOCUMENTS

| 6,101,033 | A | * | 8/2000 | Kuno | ................... | G02B 27/646 |
| | | | | | | 359/554 |
| 2007/0077052 | A1 | * | 4/2007 | Chang | ..................... | G02B 7/08 |
| | | | | | | 396/144 |
| 2010/0202766 | A1 | * | 8/2010 | Takizawa | ................ | G03B 5/00 |
| | | | | | | 396/55 |

FOREIGN PATENT DOCUMENTS

JP   H07-274056 A   10/1995

* cited by examiner

*Primary Examiner* — Stephone B Allen
*Assistant Examiner* — Ryan S Dunning
(74) *Attorney, Agent, or Firm* — Chip Law Group

(57) ABSTRACT

An image blur correction device includes: a lens unit that has at least one lens and is rotatable at least in a first direction, which is an axial rotation direction of a first fulcrum axis orthogonal to an optical axis of the lens, and a second direction which is an axial rotation direction of a second fulcrum axis orthogonal to the first fulcrum axis; a fixing member that rotatably supports the lens unit in the first and second directions; a first actuator that has a first driving portion movable in a predetermined direction so as to rotate the lens unit in the first direction; and a second actuator that has a second driving portion movable in a predetermined direction so as to rotate the lens unit in the second direction.

13 Claims, 65 Drawing Sheets

IMAGE BLUR CORRECTION DEVICE AND IMAGING APPARATUS HAVING OPERATING SURFACE SLIDABLE ON A ROUNDED SURFACE OF A DRIVEN PORTION

CROSS REFERENCE TO RELATED APPLICATIONS

This application claims the benefit of Japanese Priority Patent Application JP 2013-167624 filed Aug. 12, 2013, the entire contents of which are incorporated herein by reference.

BACKGROUND

The present technology relates to a technical field of an image blur correction device, which is rotatable in axial rotation directions of at least two fulcrum axes orthogonal to a lens unit having at least one lens, and an imaging apparatus having the same.

Some imaging apparatuses, such as video cameras, still cameras, and various apparatuses having a built-in camera unit, are provided with an image blur correction device that performs image blur correction by moving a lens in a direction orthogonal to the optical axis direction.

In some image blur correction devices provided in such imaging apparatuses, a lens unit having a lens is rotatable at least in the axial rotation directions of the two fulcrum axes orthogonal to the outer casing, for example, a first direction, which is an axial rotation direction of a first fulcrum axis orthogonal to the optical axis of the lens, and a second direction which is an axial rotation direction of a second fulcrum axis orthogonal to both of the optical axis and the first fulcrum axis (for example, refer to Japanese Unexamined Patent Application Publication No. 07-274056).

The lens unit is rotated in a pitching direction about the first fulcrum axis as a fulcrum and is rotated in a yawing direction about a second fulcrum axis as a fulcrum, thereby correcting image blur.

The image blur correction device described in Japanese Unexamined Patent Application Publication No. 07-274056 is provided with two gimbal mechanisms each having a base plate which is bent in an L-shape in order to rotate the lens unit in the pitching direction and the yawing direction.

One gimbal mechanism performs a blur correction operation in the pitching direction by rotating the lens unit in the pitching direction. The other gimbal mechanism performs a blur correction operation in the yawing direction by rotating integrally one gimbal mechanism and the lens unit in the yawing direction.

SUMMARY

However, in the image blur correction device described in Japanese Unexamined Patent Application Publication No. 07-274056, the two gimbal mechanisms for rotating the lens unit in the pitching direction and the yawing direction are provided. Thus, there is a problem in that, due to the two gimbal mechanisms, the number of components becomes large and a structure becomes complex.

Further, parts of the two gimbal mechanisms are provided to be opposed in a direction orthogonal to the optical axis and overlap with each other. Hence, there is a problem in that, due to the two gimbal mechanisms, the size of the device increases in the direction orthogonal to the optical axis and it becomes difficult to achieve reduction in the size.

Accordingly, in the image blur correction device and the imaging apparatus according to embodiments of the present technology, it is desirable to overcome the problems, simplify the structure thereof, and achieve reduction in the size thereof.

According to a first embodiment of the present technology, there is provided an image blur correction device including: a lens unit that has at least one lens and is rotatable at least in a first direction, which is an axial rotation direction of a first fulcrum axis orthogonal to an optical axis of the lens, and a second direction which is an axial rotation direction of a second fulcrum axis orthogonal to the first fulcrum axis; a fixing member that rotatably supports the lens unit in the first and second directions; a first actuator that has a first driving portion movable in a predetermined direction so as to rotate the lens unit in the first direction; and a second actuator that has a second driving portion movable in a predetermined direction so as to rotate the lens unit in the second direction, in which an operating surface, which is oblique to the fulcrum axis, is formed on the driving portion, in which a driven portion, of which the operating surface is slidable at the time of movement of the driving portion, is provided in the lens unit, and in which the lens unit is rotated by changing a position on the operating surface coming into contact with the driven portion.

Thereby, the lens unit is rotated in the first direction by changing the position on the operating surface of the first driving portion coming into contact with the driven portion, and the lens unit is rotated in the second direction by changing the position on the operating surface of the second driving portion coming into contact with the driven portion.

According to a second embodiment, in the blur correction device, it is preferable that the first fulcrum axis and the second fulcrum axis be positioned to be coplanar.

Thereby, the lens unit is rotated in the first and second directions about the first fulcrum axis and the second fulcrum axis, which are positioned to be coplanar, as fulcrums.

According to a third embodiment, in the blur correction device, it is preferable that the lens unit be rotatable in a third direction which is an axial rotation direction of a third fulcrum axis orthogonal to both of the first fulcrum axis and the second fulcrum axis, and it is preferable that a third actuator, which has a third driving portion movable in a predetermined direction so as to rotate the lens unit in the third direction, be provided.

Thereby, in addition to the first and second directions, the lens unit is rotated also in the third direction about the third fulcrum axis as the fulcrum.

According to a fourth embodiment, in the blur correction device, it is preferable that the driven portion be provided at one end in an optical axis direction, and it is preferable that a fulcrum for rotation in the first and second directions relative to the fixing member of the lens unit be positioned to be separated from the driven portion in the optical axis direction.

Thereby, it is possible to rotate the lens unit through small thrust force of the driving portion.

According to a fifth embodiment, in the blur correction device, it is preferable that a corner portion, of which an outer surface is formed to be rounded, be provided on the driven portion, and it is preferable that the operating surface be slidable on the corner portion.

Thereby, a sliding load of the driving portion to the driven portion is reduced.

According to a sixth embodiment, in the blur correction device, it is preferable that the driven portion be formed in an arc shape centered on the fulcrum for rotation in the first and second directions of the lens unit.

Thereby, when the lens unit is rotated in the first direction, it may be difficult to change the position of the driven portion coming into contact with the operating surface of the driving portion to rotate the lens unit in the second direction. In this case, when the lens unit is rotated in the second direction, it is difficult to change the position of the driven portion coming into contact with the operating surface of the driving portion to rotate the lens unit in the first direction.

According to a seventh embodiment, in the blur correction device, it is preferable that the operating surface be formed in a planar shape.

Thereby, it becomes easy to form the driving portion.

According to an eighth embodiment, in the blur correction device, it is preferable that the operating surface be formed in a curved shape convex toward the driven portion.

Thereby, it is difficult to change both contact positions when changing the angle of the driven portion to the operating surface at the time of rotation of the lens unit.

According to a ninth embodiment, in the blur correction device, it is preferable that the operating surface be formed of two planar portions which are oblique, and it is preferable that an intersection line portion between the two planar portions be slidable on the driven portion.

Thereby, both contact positions do not change when the angle of the driven portion to the operating surface is changed at the time of rotation of the lens unit.

According to a tenth embodiment, in the blur correction device, it is preferable that a bias spring for urging the lens unit in a direction, in which the driven portion is pressed against the operating surface, be provided.

Thereby, an excellent condition of contact of the driven portion with the operating surface is secured.

According to an eleventh embodiment, in the blur correction device, it is preferable that a rotatable roller be provided as the driven portion, and it is preferable that the driven portion be rotated when the operating surface slides on the driven portion.

Thereby, a load of contact of the driving portion with the driven portion at the time of rotation of the lens unit is small.

In order to solve the above problems, there is provided an imaging apparatus including: an image blur correction device that has a lens unit having at least one lens and an outer casing, in which the lens unit is disposed, and corrects image blur by rotating the lens unit at least in a first direction, which is an axial rotation direction of a first fulcrum axis orthogonal to an optical axis of the lens, and a second direction which is an axial rotation direction of a second fulcrum axis orthogonal to the first fulcrum axis, in which the image blur correction device includes a fixing member that rotatably supports the lens unit in the first and second directions, a first actuator that has a first driving portion movable in a predetermined direction so as to rotate the lens unit in the first direction, and a second actuator that has a second driving portion movable in a predetermined direction so as to rotate the lens unit in the second direction, in which an operating surface, which is oblique to the fulcrum axis, is formed on the driving portion, in which a driven portion, of which the operating surface is slidable at the time of movement of the driving portion, is provided in the lens unit, and in which the lens unit is rotated by changing a position on the operating surface coming into contact with the driven portion.

Thereby, in the image blur correction device, the lens unit is rotated in the first direction by changing the position on the operating surface of the first driving portion coming into contact with the driven portion, and the lens unit is rotated in the second direction by changing the position on the operating surface of the second driving portion coming into contact with the driven portion.

In the image blur correction device and the imaging apparatus according to the embodiments of the present technology, the lens unit is rotated in the first direction by changing the position on the operating surface of the first driving portion coming into contact with the driven portion, and the lens unit is rotated in the second direction by changing the position on the operating surface of the second driving portion coming into contact with the driven portion. Hence, it is possible to simplify the structure and achieve reduction in the size of the device.

DETAILED DESCRIPTION OF EMBODIMENTS

Hereinafter, embodiments of the image blur correction device and imaging apparatus of the present technology will be described with reference to the accompanying drawings.

In the embodiments to be described later, an imaging apparatus of the present technology is applied to a mobile phone and a video camera, and an image blur correction device of the present technology is applied to an image blur correction device which is provided in each of the mobile phone and the video camera.

In addition, the applicable scopes of the imaging apparatus and the image blur correction device of the present technology are not limited to the mobile phone, the video camera, and the image blur correction devices which are respectively provided in the mobile phone and the video camera. The imaging apparatus and the image blur correction device of the present technology can be widely applied to, for example, a still camera, a personal computer, an imaging apparatus which is provided in each of various devices such as a mobile terminal, or an image blur correction device which is provided in such an imaging apparatus.

In the following description, front-back, vertical, and horizontal directions are indicated in terms of a direction viewed from a photographer at the time of photography using a mobile phone or a video camera. Accordingly, the subject side is a front side, and the photographer side is a rear side.

It should be noted that the front-back, vertical, and horizontal directions to be described later are directions for convenience of description, and the present technology does not have to be limited to such directions.

Further, the lens to be described later is defined to include both of a lens system formed of a single lens and a lens system formed of a plurality of lenses as a lens group.

Overall Configuration of Imaging Apparatus

Figure 1:
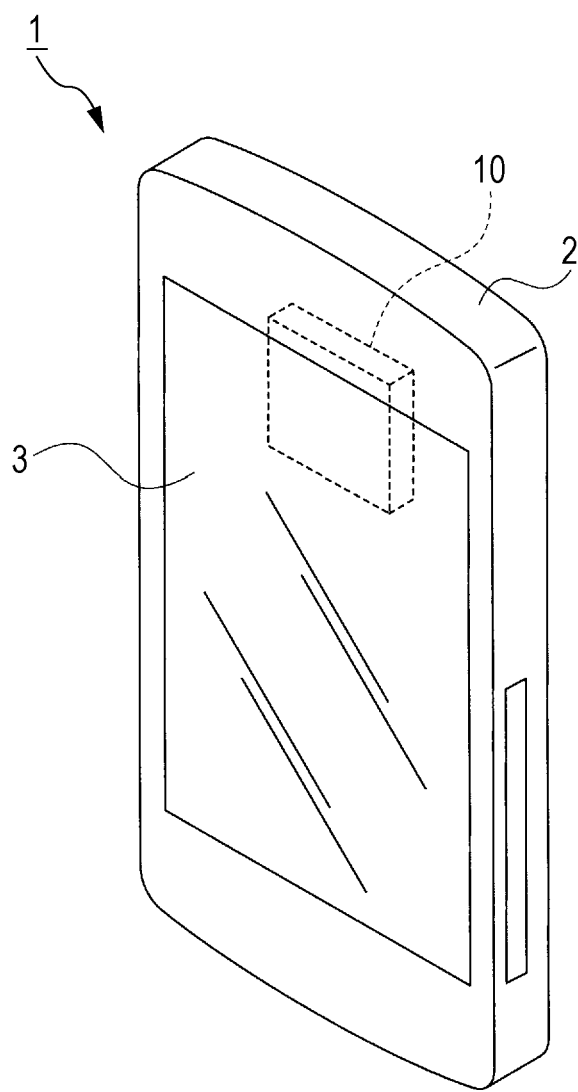
FIG. 1 is a perspective view of an imaging apparatus.

An imaging apparatus (mobile phone) 1 is formed such that necessary respective sections are disposed inside and outside an outer casing 2 (refer to FIG. 1). The outer casing 2 is formed, for example, in a casing shape which is long and planar in the vertical direction, and a display panel 3 is provided on one surface thereof. The display panel 3 is formed as a touch panel, and a predetermined function is executed by performing touching operations at respective predetermined positions on the display panel 3.

An image blur correction device 10 (10A) for performing blur correction is disposed inside the outer casing 2.

Overall Configuration of Another Imaging Apparatus

Figure 2:
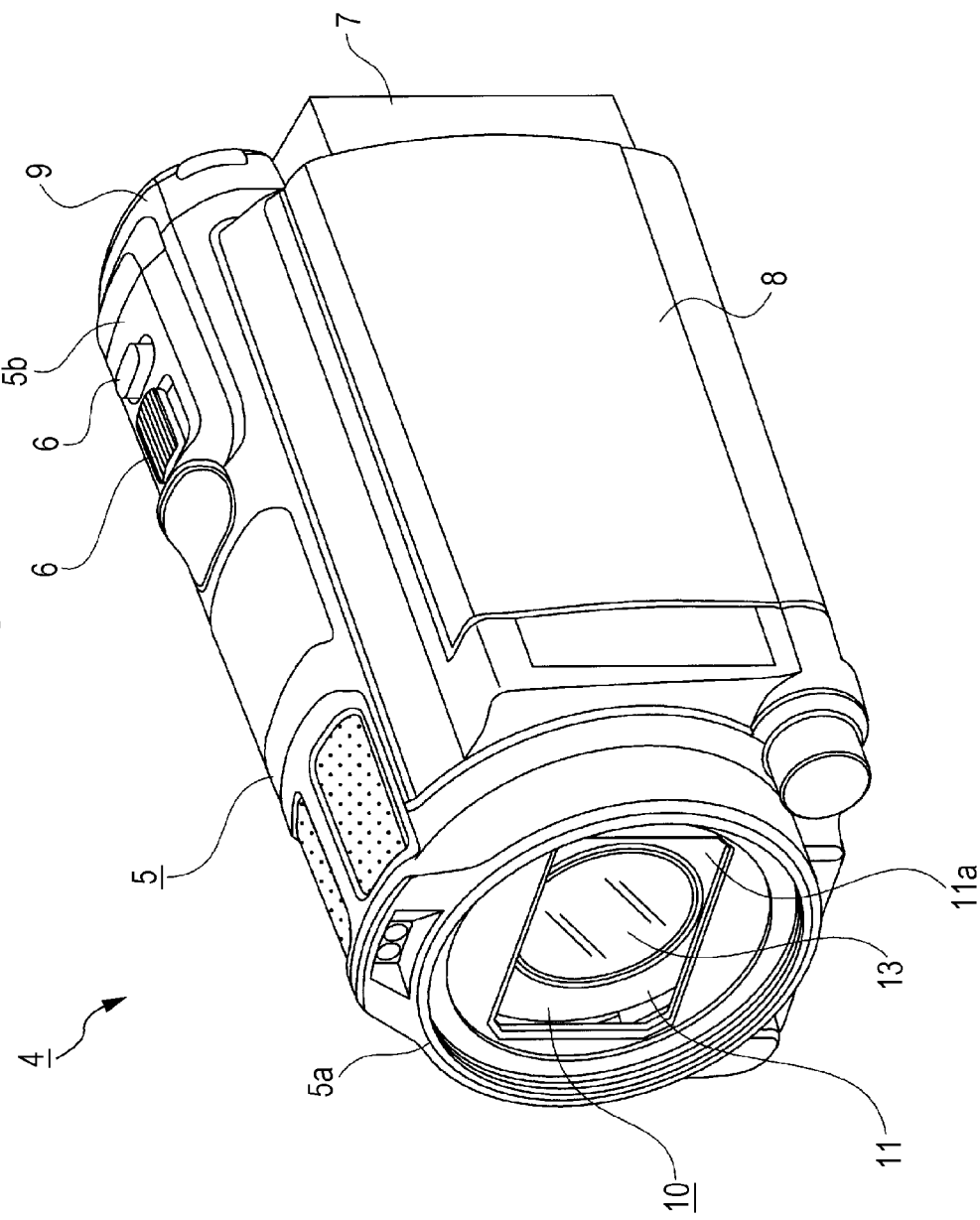
FIG. 2 is a perspective view of another imaging apparatus.
Figure 3:
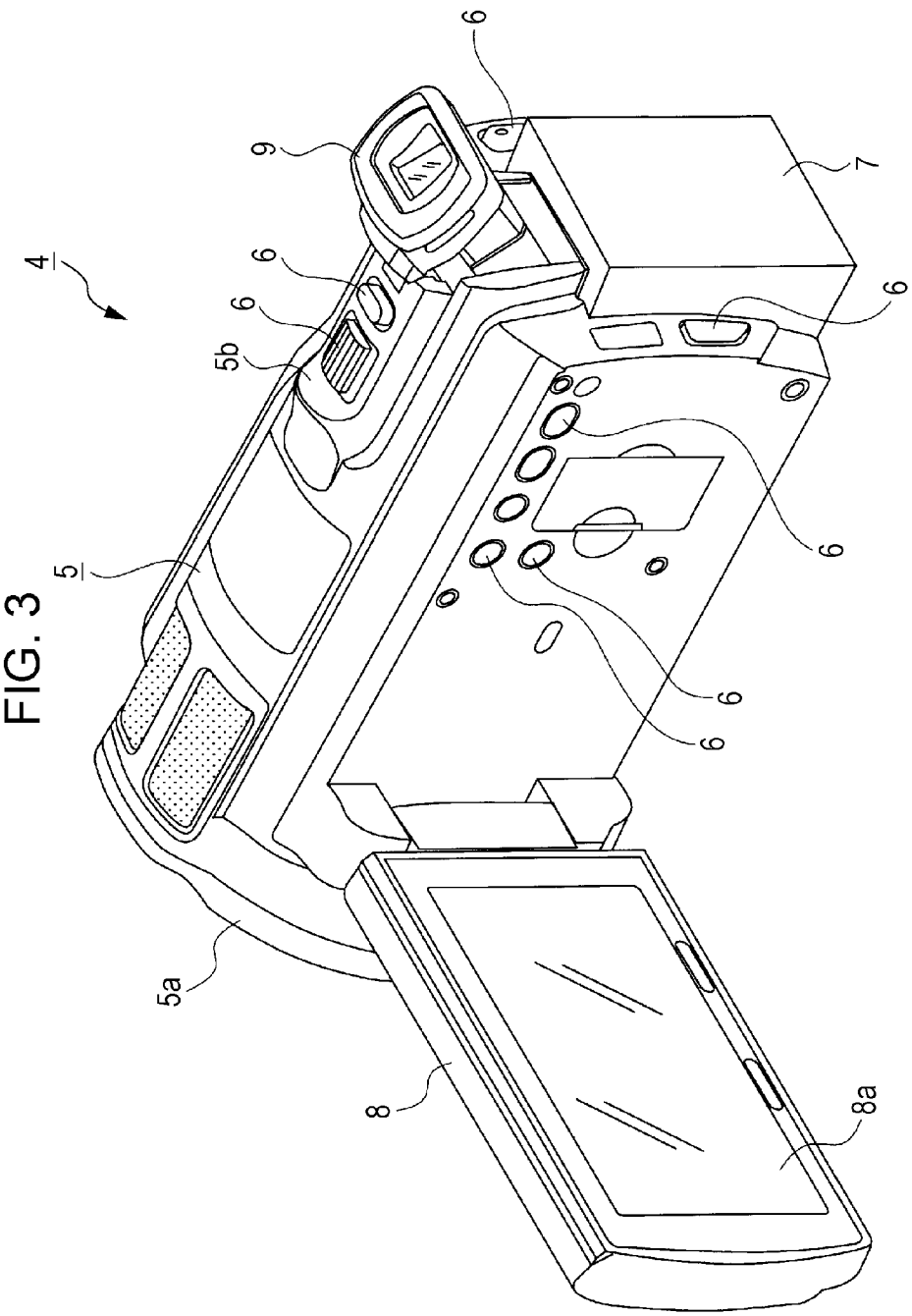
FIG. 3 is a perspective view illustrating the another imaging apparatus in a condition where the display section is open.
Figure 4:
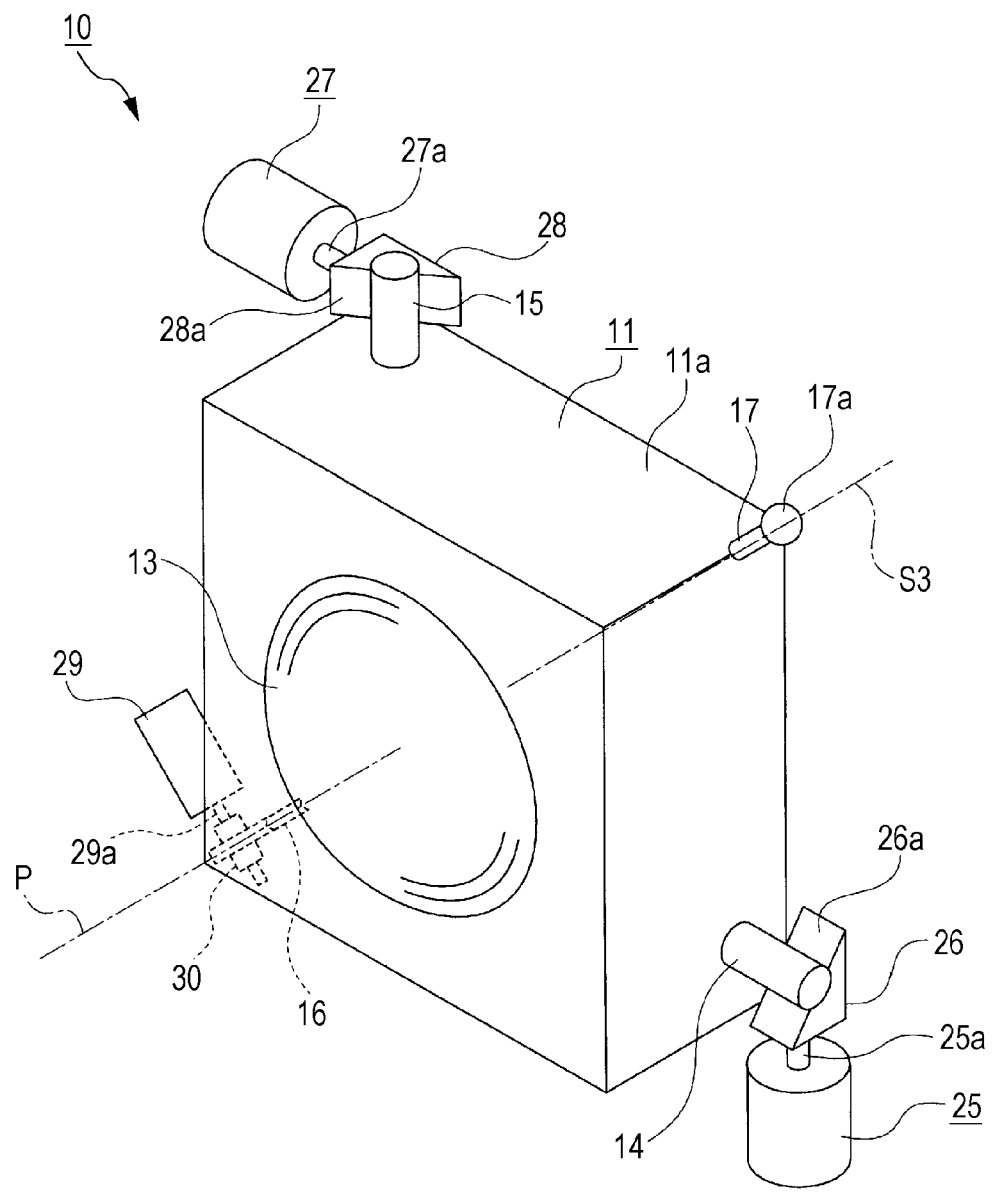
FIG. 4 is a schematic perspective view illustrating an image blur correction device according to a first embodiment together with FIGS. 5 to 17.

An imaging apparatus (video camera) 4 is formed such that the necessary respective sections are disposed inside and outside an outer casing 5 (refer to FIGS. 2 and 3). The outer casing 5 is formed, for example, in a casing shape which is long in the front-back direction, the front end portion thereof is provided as a front panel section 5a, and an upper end portion at the back end portion is provided as a storage casing section 5b which is open toward the back side thereof.

At the back end portion on the upper surface of the outer casing 5, for example, operation sections 6 and 6, which function as a zoom lever and a photography button, are disposed. Various operation sections 6, 6, . . . such as a power button and an image reproduction button are disposed on one side surface of the outer casing 5. Operation sections 6 and 6, . . . such as a mode switch button and a recording button are disposed on the rear surface of the outer casing 5.

A battery 7 is mounted on the rear surface of the outer casing 5, and thus a part of the battery 7 protrudes backward from the rear surface of the outer casing 5.

A display section 8 is swingably and rotatably connected to the side surface portion of the outer casing 5. The display section 8 has a display surface 8a, where the front end portion thereof is connected to the outer casing 5.

A finder 9 is connected to the back end portion of the outer casing 5, and the finder 9 is slidable in the front-back direction and is rotatable in the tilt direction relative to the storage casing section 5b.

An image blur correction device 40 (40A) for performing blur correction is disposed inside the outer casing 5.

Configuration (First Embodiment) of Image Blur Correction Device

Hereinafter, a configuration of an image blur correction device 10 according to a first embodiment will be described (refer to FIGS. 4 to 7). The image blur correction device 10 is, for example, provided in an imaging apparatus 1.

The image blur correction device 10 has a lens unit 11 and a fixing member 12 that supports the lens unit 11.

The lens unit 11 has a barrel portion 11a that has a substantially rectangular parallelepiped shape, of which a width in the front-back direction is set to be small as compared with vertical and horizontal widths, and a plurality of lenses or a lens group that is disposed in the barrel portion 11a. A photography lens 13, which is referred to as a front lens, is disposed on the frontmost side (object side) of the lenses or the lens group.

The lens unit 11 has a first driven portion 14 that protrudes leftward from the position close to the lower end on the left side surface, a second driven portion 15 that protrudes upward from the position close to the right end on the upper surface, and a third driven portion 16 that protrudes diagonally downward right from the right end portion on the lower surface. The first driven portion 14 and the second driven portion 15 are formed in cylindrical shapes. A supporting hole 16a is formed in the third driven portion 16 so as to extend in the front-back direction.

The lens unit 11 is provided with a fulcrum portion 17 that protrudes diagonally upward left from the left end portion on the upper surface, and the tip portion of the fulcrum portion 17 is provided as a spherical portion 17a.

The lens unit 11 is provided with a first spring latch portion 18 that protrudes downward from the position close to the left end on the lower surface, and a second spring latch portion 19 that protrudes rightward from the position close to the upper end on the right side surface.

The fixing member 12 includes: a base surface portion 20 that faces the front and back sides; a first holding portion 21 that extends to the lower left end portion of the base surface portion 20; a second holding portion 22 that extends to the upper right end portion of the base surface portion 20; a third holding portion 23 that extends to the lower right end portion of the base surface portion 20; and a bearing portion 24 that extends to the upper left end portion of the base surface portion 20. The fixing member 12 is fixed inside the lens unit 11.

The first holding portion 21 of the fixing member 12 holds a first actuator 25. The first actuator 25 has a first driving shaft 25a that is movable in the vertical direction, and a first driving portion 26 is fixed onto the first driving shaft 25a. Accordingly, the first driving portion 26 is moved in the vertical direction by movement of the first driving shaft 25a.

A first operating surface 26a, which faces the diagonal upper front side, is formed on the first driving portion 26. The first operating surface 26a of the first driving portion 26 is slidable on the first driven portion 14.

The second holding portion 22 of the fixing member 12 holds a second actuator 27. The second actuator 27 has a second driving shaft 27a that is movable in the horizontal direction, and a second driving portion 28 is fixed onto the second driving shaft 27a. Accordingly, the second driving portion 28 is moved in the horizontal direction by movement of the second driving shaft 27a.

A second operating surface 28a, which faces the diagonal upper front side, is formed on the second driving portion 28. The second operating surface 28a of the second driving portion 28 is slidable on the second driven portion 15.

The third holding portion 23 of the fixing member 12 holds a third actuator 29. The third actuator 29 has a third driving shaft 29a that is movable between the diagonal upper right side and the diagonal lower left side, and a third driving portion 30 is fixed onto the third driving shaft 29a. Accordingly, the third driving portion 30 is moved between the diagonal upper right side and the diagonal lower left side by movement of the third driving shaft 29a.

The intermediate part of the third driving portion 30 is provided as a sliding engagement portion 30a which is made to be smaller than the other parts thereof. The outer shape of the sliding engagement portion 30a is formed to be a rectangular shape or a circular shape.

The sliding engagement portion 30a of the third driving portion 30 is supported to be slidable in the front-back direction by the supporting hole 16a of the third driven portion 16, and is configured not to be rotatable in the shaft rotation direction of the third driving shaft 29a and not to be movable in the shaft direction thereof with respect to the third driven portion 16. In addition, a small gap is formed between the sliding engagement portion 30a and the supporting hole 16a in the width direction of the supporting hole 16a. Due to the gap formed between the sliding engagement portion 30a and the supporting hole 16a, the third driven portion 16 is smoothly moved relative to the third driving portion 30 when the lens unit 11 is rotated in a first direction or a second direction to be described later.

The spherical portion 17a of the fulcrum portion 17 is supported by the bearing portion 24 of the fixing member 12 to be rotatable in an arbitrary direction. Accordingly, the lens unit 11 is configured to be rotatable in the arbitrary direction by using the spherical portion 17a as the rotation fulcrum relative to the fixing member 12.

In the above description of the example, the bearing portion 24, which is concave, is provided on the fixing member 12, and the fulcrum portion 17, which is inserted into the bearing portion 24, is provided on the lens unit 11. However, on the contrary, it may be possible to adopt the following configuration: the bearing portion is provided on the lens unit, and the fulcrum portion, which is inserted into the bearing portion, is provided on the fixing member.

A first bias spring 31 is supported between the first spring latch portion 18 of the lens unit 11 and the fixing member 12. Accordingly, the lens unit 11 is urged backward by the first bias spring 31, and thus the first driven portion 14 is pressed against the first operating surface 26a of the first driving portion 26.

A second bias spring 32 is supported between the second spring latch portion 19 of the lens unit 11 and the fixing member 12. Accordingly, the lens unit 11 is urged backward by the second bias spring 32, and thus the second driven portion 15 is pressed against the second operating surface 28a of the second driving portion 28.

The lens unit 11 is configured to be rotatable in a first direction (pitching direction), which is an axial rotation direction of a first fulcrum axis S1, relative to the fixing member 12. Further, the lens unit 11 is configured to be rotatable in a second direction (yawing direction), which is an axial rotation direction of a second fulcrum axis S2, relative to the fixing member 12. Furthermore, the lens unit 11 is configured to be rotatable in a third direction (rolling direction), which is an axial rotation direction of a third fulcrum axis S3, relative to the fixing member 12.

The first fulcrum axis S1, the second fulcrum axis S2, and the third fulcrum axis S3 are orthogonal to one another. For example, the first fulcrum axis S1 and the second fulcrum axis S2 are positioned on the same plane orthogonal to an optical axis P. The first fulcrum axis S1, which is set as a rotation axis in the pitching direction, is positioned on the line connecting the spherical portion 17a of the fulcrum portion 17 and the second driving portion 28. The second fulcrum axis S2, which is set as a rotation axis in the yawing direction, is positioned on the line connecting the spherical portion 17a of the fulcrum portion 17 and the first driving portion 26. The third fulcrum axis S3, which is set as a rotation axis in the rolling direction, is positioned on the line parallel with the optical axis P passing through the spherical portion 17a of the fulcrum portion 17.

In the image blur correction device 10, at least one of the respective axes of the first fulcrum axis S1 and the second fulcrum axis S2 may be positioned on either one of the respective lines of the line connecting the fulcrum portion 17 and the second driving portion 28 or the line connecting the fulcrum portion 17 and the first driving portion 26.

Further, in the above description of the example, the first direction, the second direction, and the third direction are respectively set as the pitching direction, the yawing direction, and the rolling direction. However, each of the first direction, the second direction, and the third direction may be set as any of the pitching direction, the yawing direction, and the rolling direction.

Operation (First Embodiment) of Image Blur Correction Device

Hereinafter, a blur correction operation in the image blur correction device 10 will be described (refer to FIGS. 5 to 18).

Figure 5:
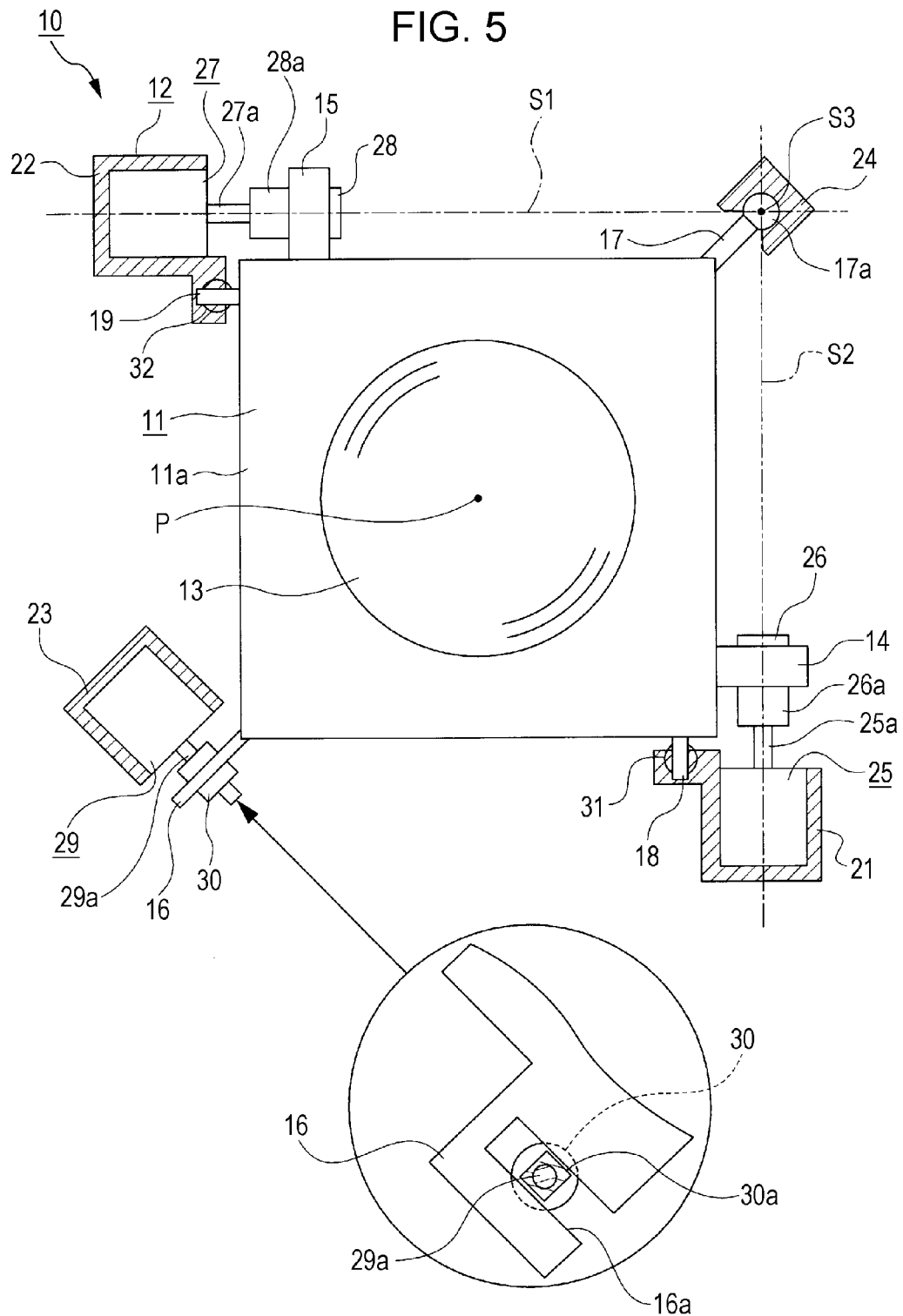
FIG. 5 is a schematic front view of the image blur correction device.
Figure 6:
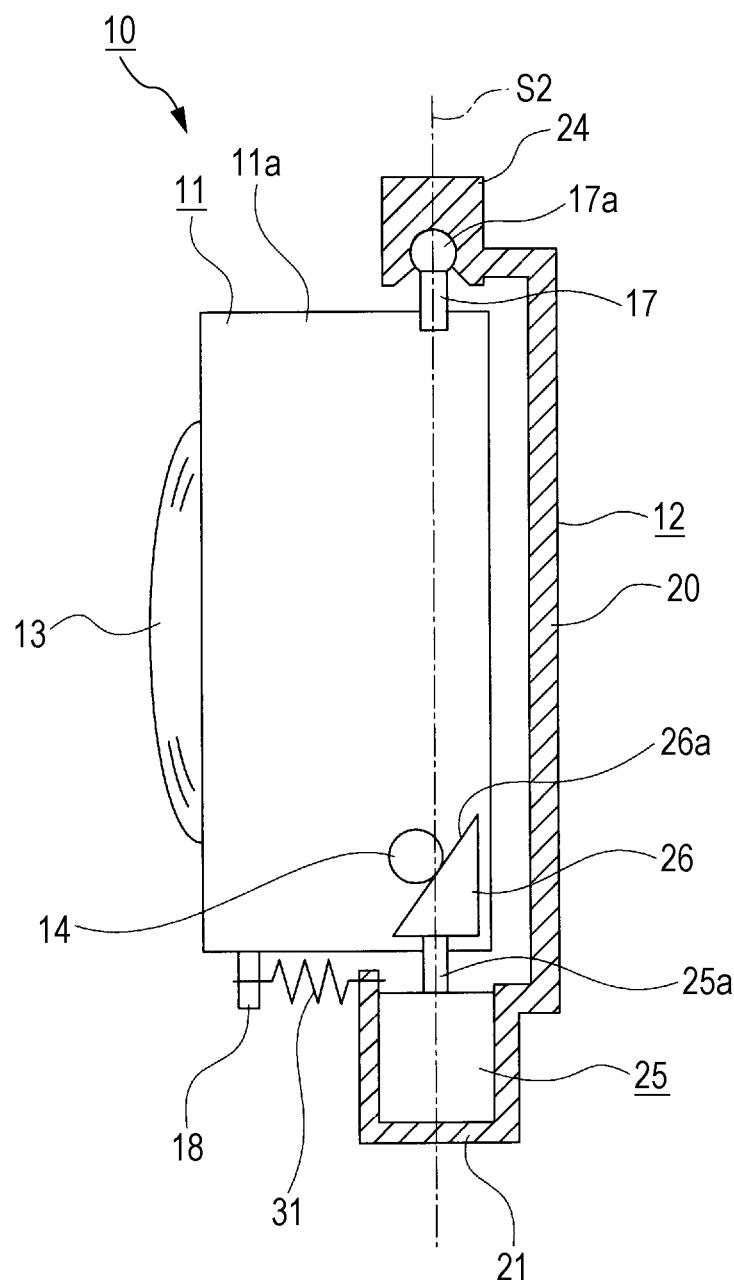
FIG. 6 is a schematic side view of the image blur correction device.
Figure 7:
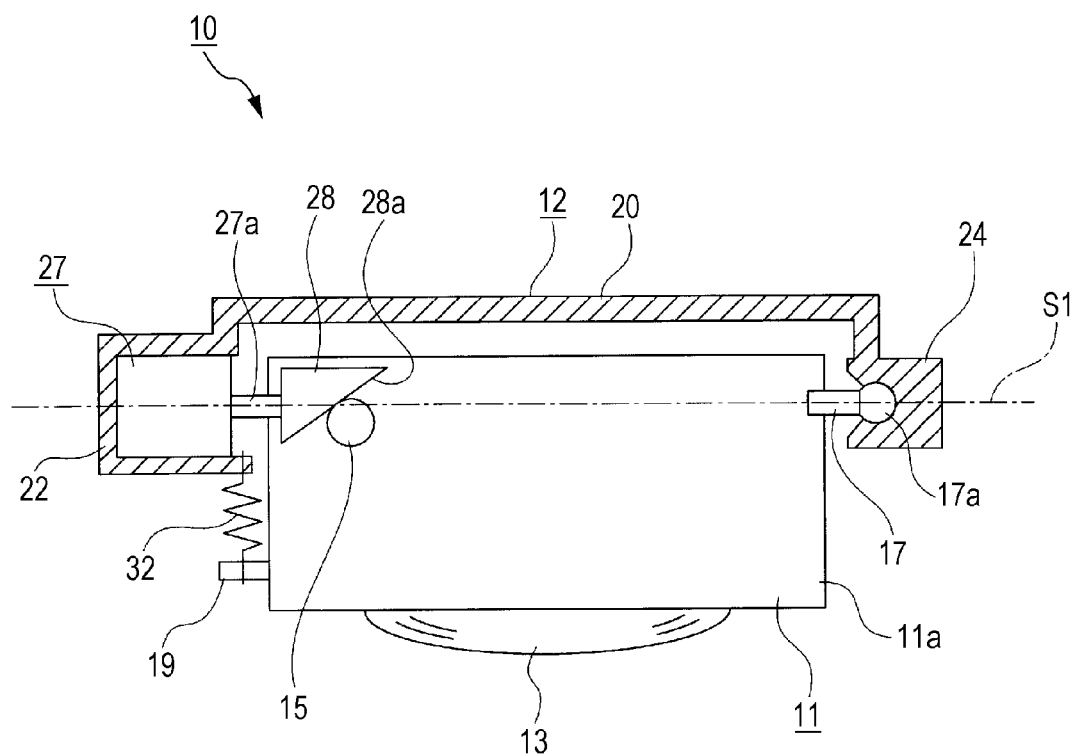
FIG. 7 is a schematic top plan view of the image blur correction device.
Figure 8:
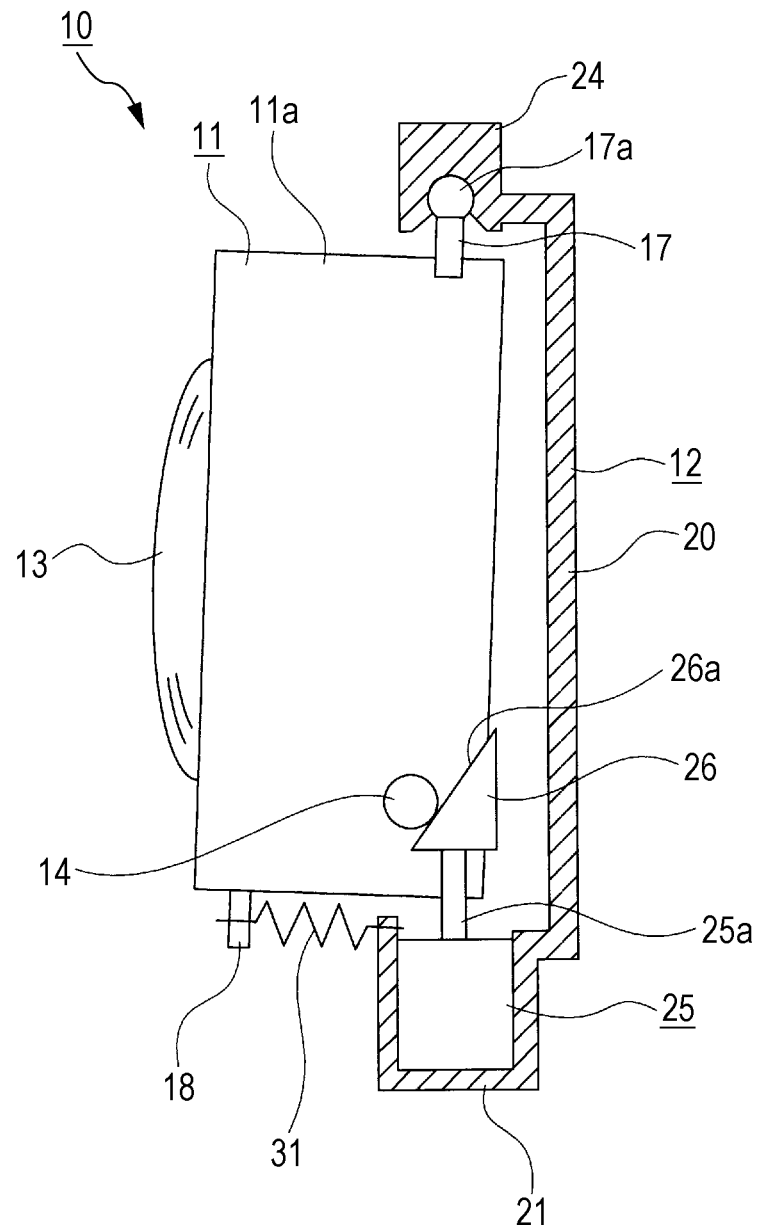
FIG. 8 is a schematic side view illustrating an operation of the image blur correction device in a condition where the lens unit is rotated toward one side in a first direction together with FIGS. 9 to 17.
Figure 9:
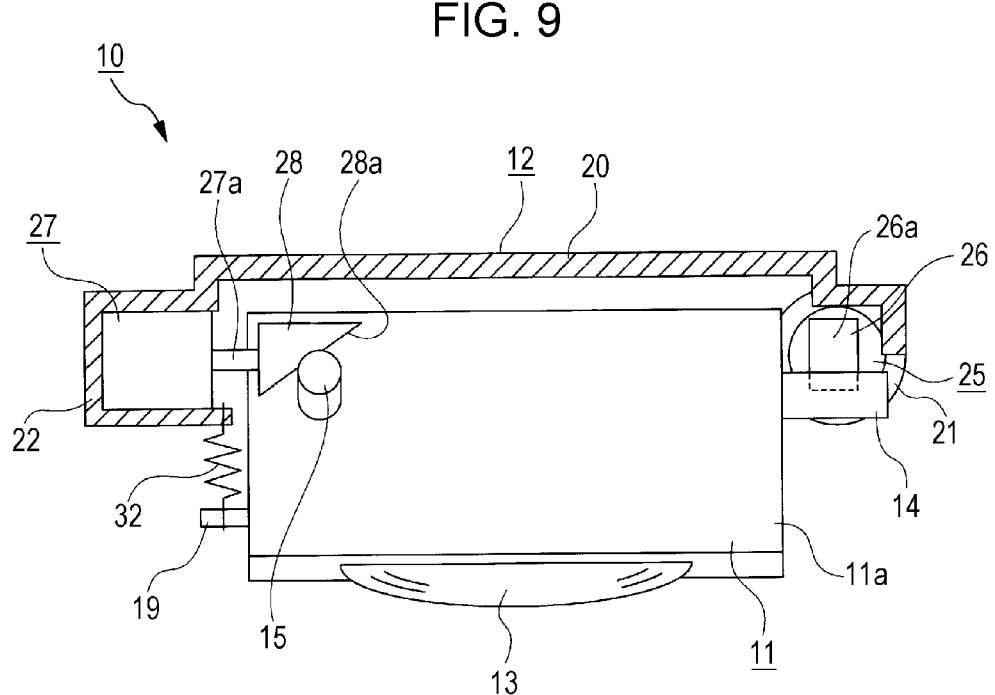
FIG. 9 is a schematic top plan view illustrating a condition of the device in a second direction when the lens unit is rotated toward one side in the first direction.

In a state where the blur correction operation is not performed, the image blur correction device 10 is at a reference position at which the lens unit 11 is not rotated in any one direction of the first direction, the second direction, and the third direction (refer to FIGS. 5 to 7).

First, a blur correction operation in the first direction (pitching direction) in the image blur correction device 10 will be described (refer to FIGS. 8 to 11).

In the image blur correction device 10, when the first driving shaft 25a of the first actuator 25 is moved upward and thereby the first driving portion 26 is moved upward, the first operating surface 26a slides on the first driven portion 14. Thereby, the lens unit 11 is rotated about the first fulcrum axis S1 as a fulcrum in the first direction in which the photography lens 13 faces slightly upward against elastic force of the first bias spring 31 (refer to FIG. 8).

At this time, the second driven portion 15 comes into contact with the second driving portion 28 of the second actuator 27. However, in accordance with the rotation of the lens unit 11 in the first direction, a condition of contact between the second driving portion 28 and the second driven portion 15 is slightly changed (refer to FIG. 9).

Figure 10:
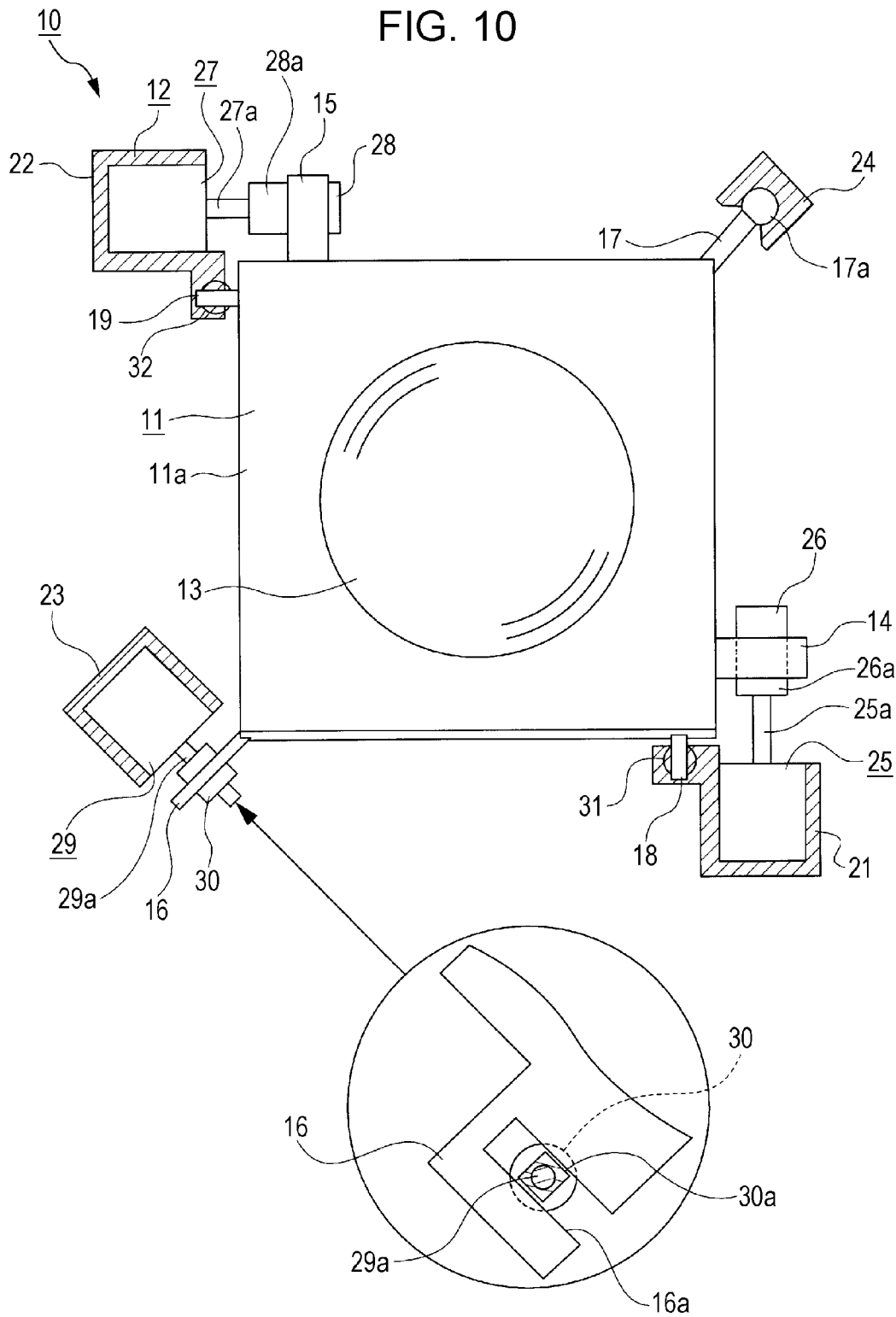
FIG. 10 is a schematic front view illustrating a condition of the device in a third direction when the lens unit is rotated toward one side in the first direction.
Figure 11:
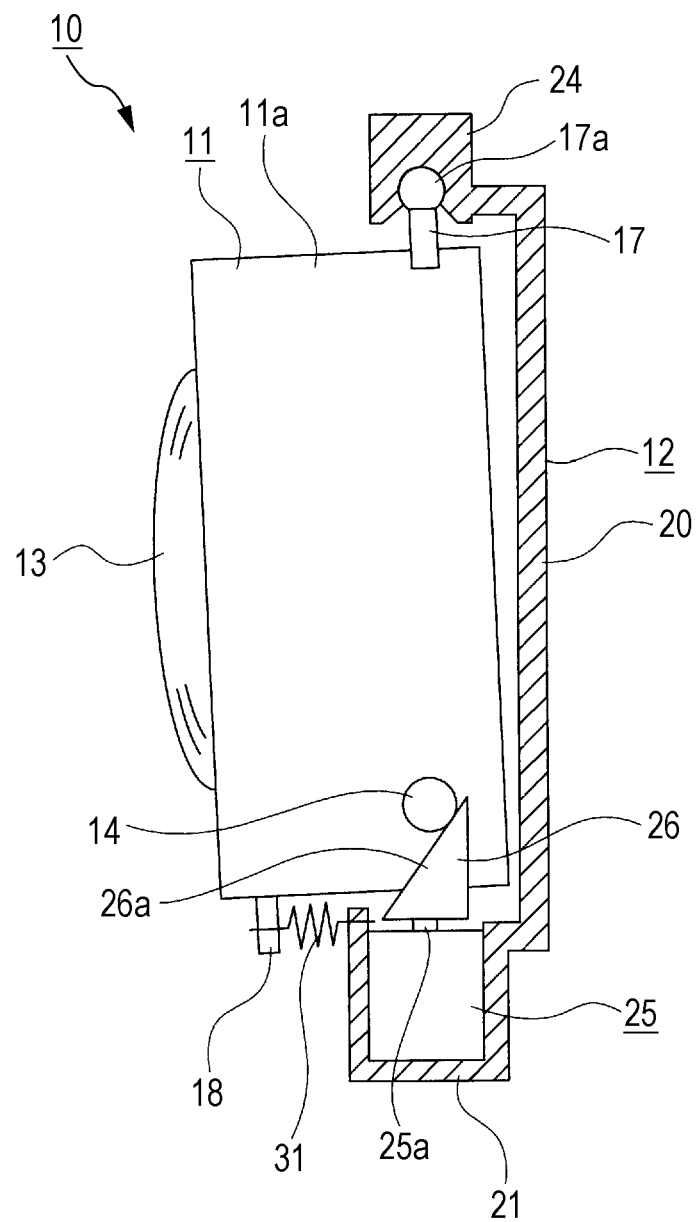
FIG. 11 is a schematic side view illustrating a condition where the lens unit is rotated toward the other side in the first direction.
Figure 12:
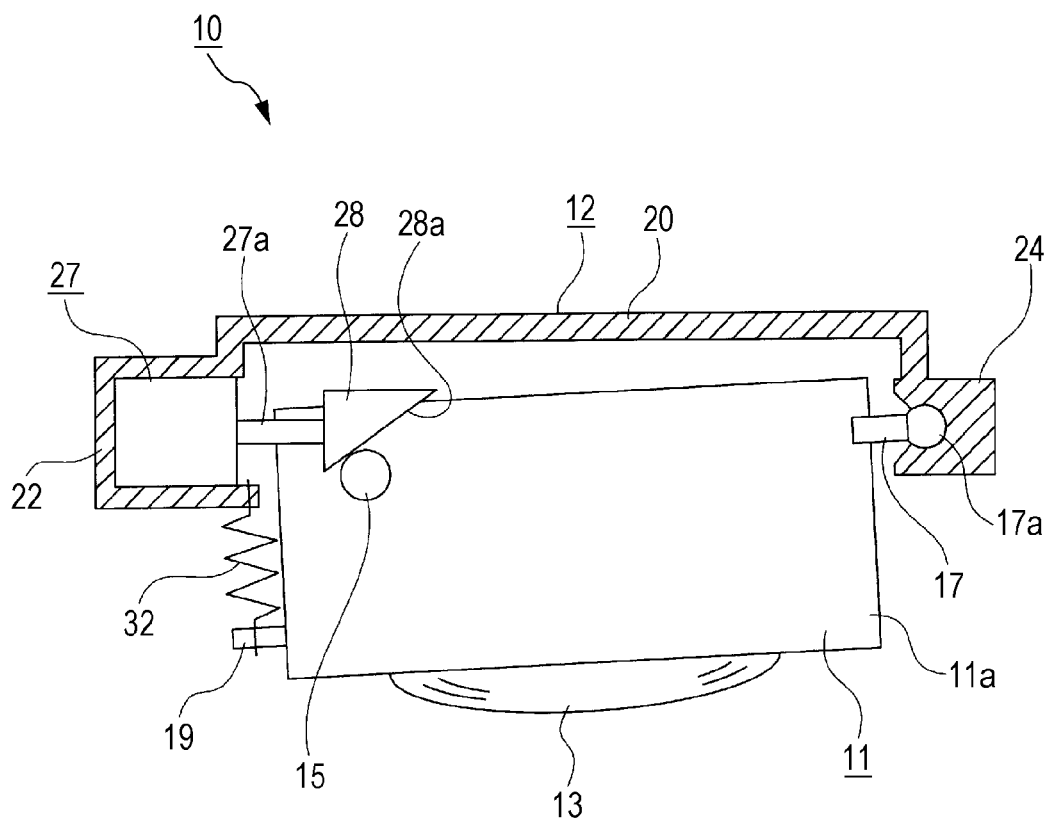
FIG. 12 is a schematic top plan view illustrating a condition where the lens unit is rotated toward one side in the second direction.
Figure 13:
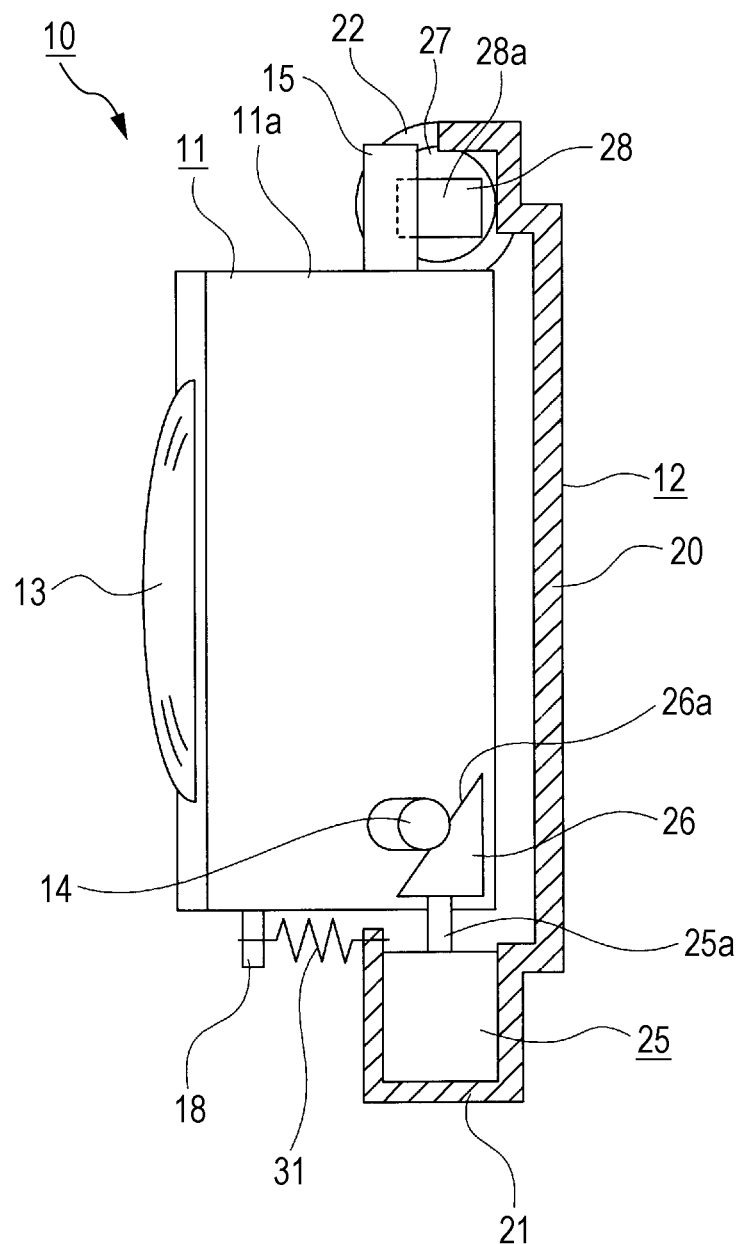
FIG. 13 is a schematic side view illustrating a condition of the device in the first direction when the lens unit is rotated toward one side in the second direction.

Simultaneously, the third driving portion 30 of the third actuator 29 slides on the third driven portion 16 in accordance with the rotation of the lens unit 11 in the first direction, and the engagement position of the supporting hole 16a is changed (refer to FIG. 10).

When the lens unit 11 is rotated in the first direction in such a manner, in accordance with the rotation of the lens unit 11, the condition of contact between the second driving portion 28 and the second driven portion 15 is changed, the third driving portion 30 slides on the third driven portion 16, and the engagement position of the supporting hole 16a is changed. Hence, it is difficult for unnecessary load to be applied to the lens unit 11 from the second driving portion 28 and the third driving portion 30. Accordingly, the lens unit 11 is smoothly rotated in the first direction.

On the other hand, in the image blur correction device 10, when the first driving shaft 25a of the first actuator 25 is moved downward and thereby the first driving portion 26 is moved downward, the first operating surface 26a slides on the first driven portion 14. Thereby, the lens unit 11 is rotated about the first fulcrum axis S1 as a fulcrum in the first direction in which the photography lens 13 faces slightly downward due to elastic force of the first bias spring 31 (refer to FIG. 11).

At this time, the second driven portion 15 comes into contact with the second driving portion 28 of the second actuator 27. However, in accordance with the rotation of the lens unit 11 in the first direction, a condition of contact between the second driving portion 28 and the second driven portion 15 is slightly changed.

Simultaneously, the third driving portion 30 of the third actuator 29 slides on the third driven portion 16 in accordance with the rotation of the lens unit 11 in the first direction, and the engagement position of the supporting hole 16a is changed.

When the lens unit 11 is rotated in the first direction in such a manner, in accordance with the rotation of the lens unit 11, the condition of contact between the second driving portion 28 and the second driven portion 15 is changed, the third driving portion 30 slides on the third driven portion 16, and the engagement position of the supporting hole 16a is changed. Hence, it is difficult for unnecessary load to be applied to the lens unit 11 from the second driving portion 28 and the third driving portion 30. Accordingly, the lens unit 11 is smoothly rotated in the first direction.

Next, a blur correction operation in the second direction (yawing direction) in the image blur correction device 10 will be described (refer to FIGS. 12 to 15).

In the image blur correction device 10, when the second driving shaft 27a of the second actuator 27 is moved leftward and thereby the second driving portion 28 is moved leftward, the second operating surface 28a slides on the second driven portion 15. Thereby, the lens unit 11 is rotated about the second fulcrum axis S2 as a fulcrum in the second direction in which the photography lens 13 faces slightly leftward against elastic force of the second bias spring 32 (refer to FIG. 12).

At this time, the first driven portion 14 comes into contact with the first driving portion 26 of the first actuator 25. However, in accordance with the rotation of the lens unit 11 in the second direction, a condition of contact between the first driving portion 26 and the first driven portion 14 is slightly changed (refer to FIG. 13).

Figure 14:
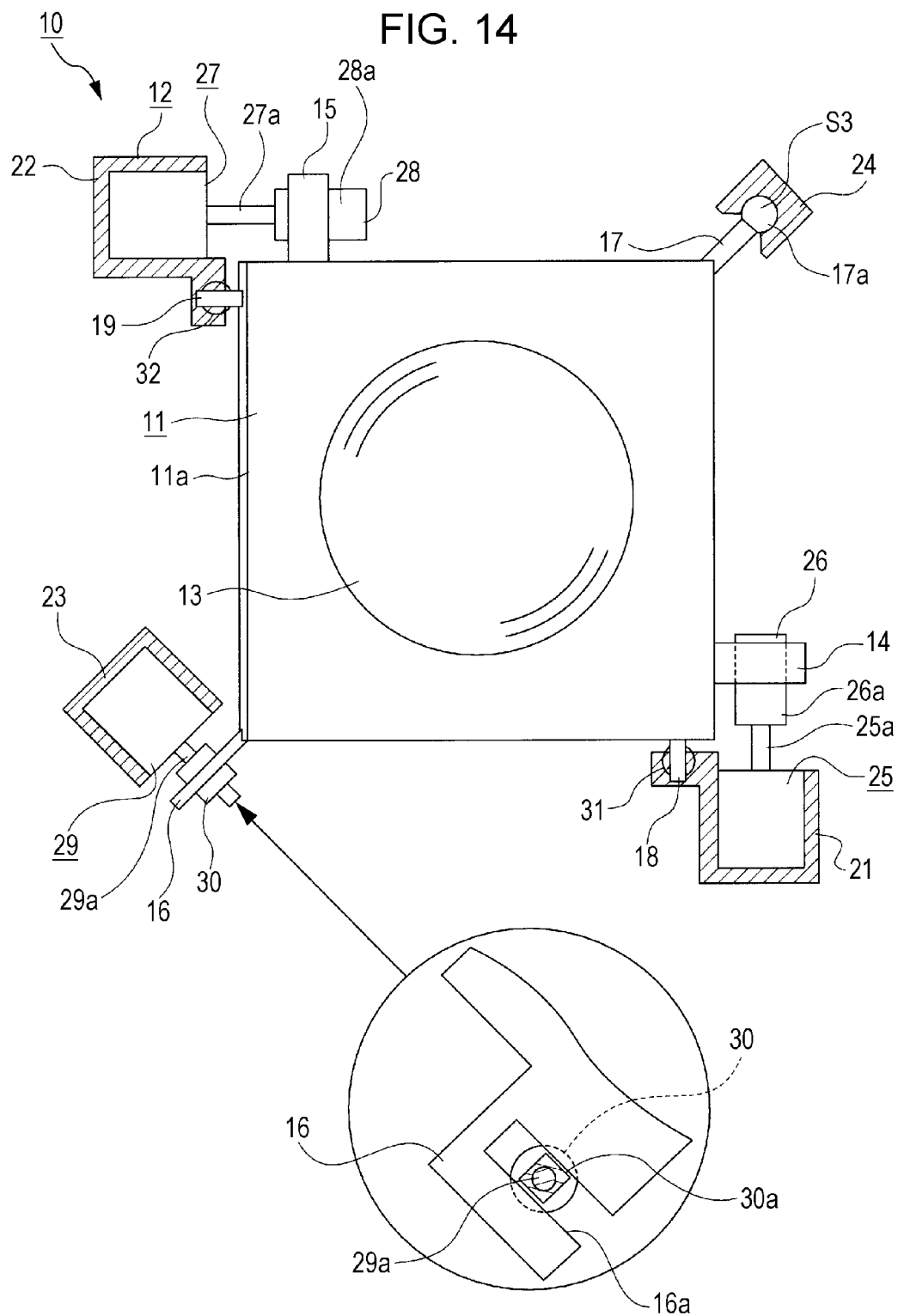
FIG. 14 is a schematic front view illustrating a condition of the device in the third direction when the lens unit is rotated toward one side in the second direction.
Figure 15:
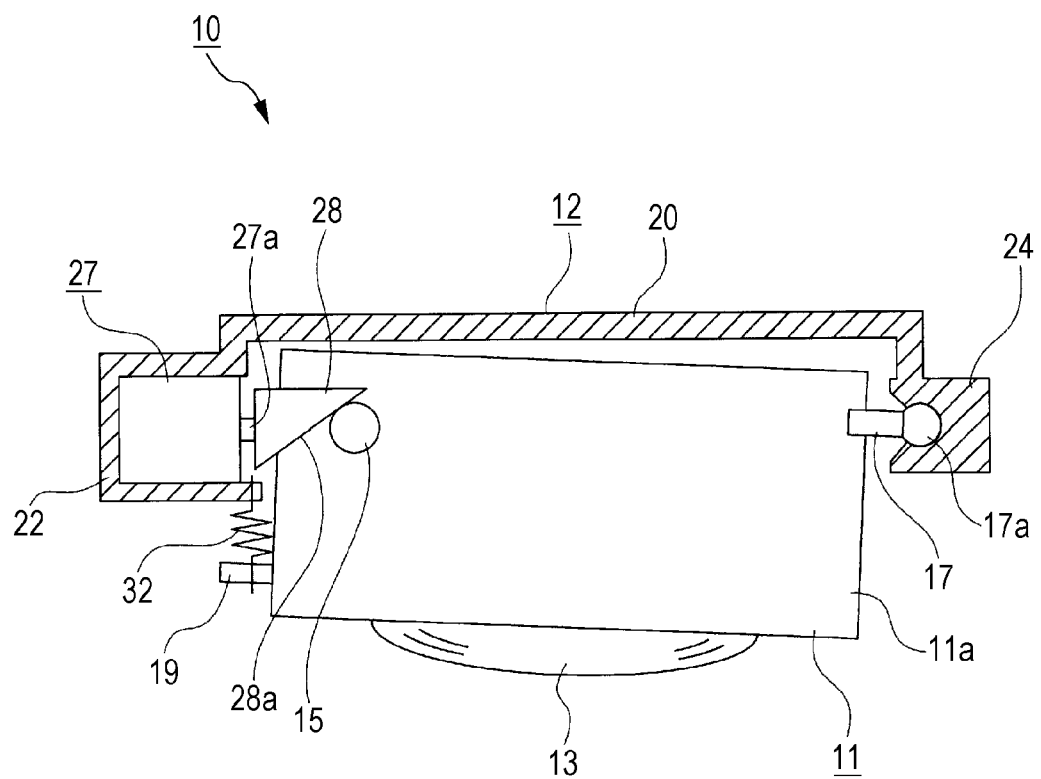
FIG. 15 is a schematic top plan view illustrating a condition where the lens unit is rotated toward the other side in the second direction.

Simultaneously, the third driving portion 30 of the third actuator 29 slides on the third driven portion 16 in accordance with the rotation of the lens unit 11 in the second direction, and the engagement position of the supporting hole 16a is changed (refer to FIG. 14).

When the lens unit 11 is rotated in the second direction in such a manner, in accordance with the rotation of the lens unit 11, the condition of contact between the first driving portion 26 and the first driven portion 14 is changed, the third driving portion 30 slides on the third driven portion 16, and the engagement position of the supporting hole 16a is changed. Hence, it is difficult for unnecessary load to be applied to the lens unit 11 from the first driving portion 26 and the third driving portion 30. Accordingly, the lens unit 11 is smoothly rotated in the second direction.

On the other hand, in the image blur correction device 10, when the second driving shaft 27a of the second actuator 27 is moved rightward and thereby the second driving portion 28 is moved rightward, the second operating surface 28a slides on the second driven portion 15. Thereby, the lens unit 11 is rotated about the second fulcrum axis S2 as a fulcrum in the second direction in which the photography lens 13 faces slightly rightward due to elastic force of the second bias spring 32 (refer to FIG. 15).

At this time, the first driven portion 14 comes into contact with the first driving portion 26 of the first actuator 25. However, in accordance with the rotation of the lens unit 11 in the second direction, the condition of contact between the first driving portion 26 and the first driven portion 14 is slightly changed.

Simultaneously, the third driving portion 30 of the third actuator 29 slides on the third driven portion 16 in accordance with the rotation of the lens unit 11 in the second direction, and the engagement position of the supporting hole 16a is changed.

When the lens unit 11 is rotated in the second direction in such a manner, in accordance with the rotation of the lens unit 11, the condition of contact between the first driving portion 26 and the first driven portion 14 is changed, the third driving portion 30 slides on the third driven portion 16, and the engagement position of the supporting hole 16a is changed. Hence, it is difficult for unnecessary load to be applied to the lens unit 11 from the first driving portion 26 and the third driving portion 30. Accordingly, the lens unit 11 is smoothly rotated in the second direction.

Figure 16:
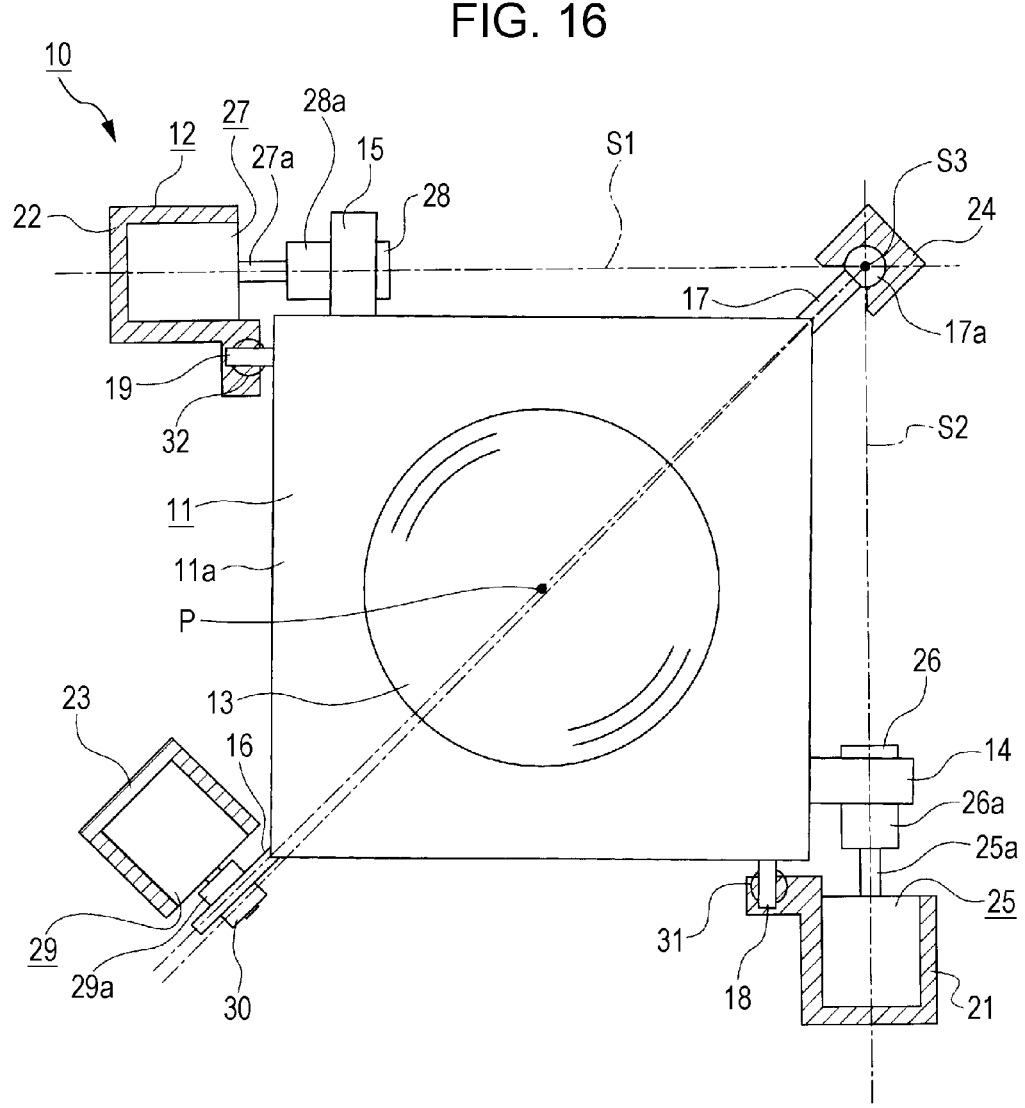
FIG. 16 is a schematic front view illustrating a condition where the lens unit is rotated toward one side in the third direction.
Figure 17:
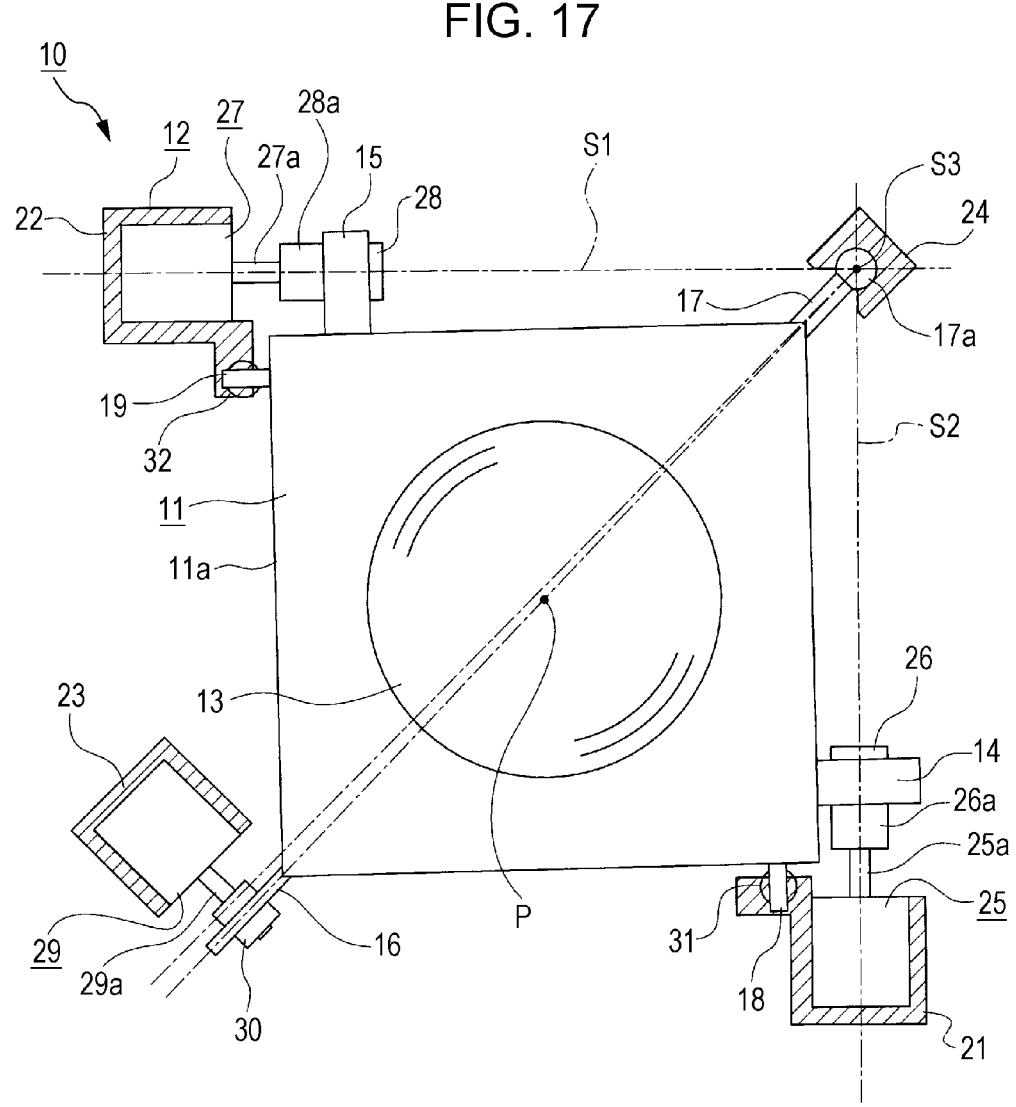
FIG. 17 is a schematic front view illustrating a condition where the lens unit is rotated toward the other side in the third direction.
Figure 18:
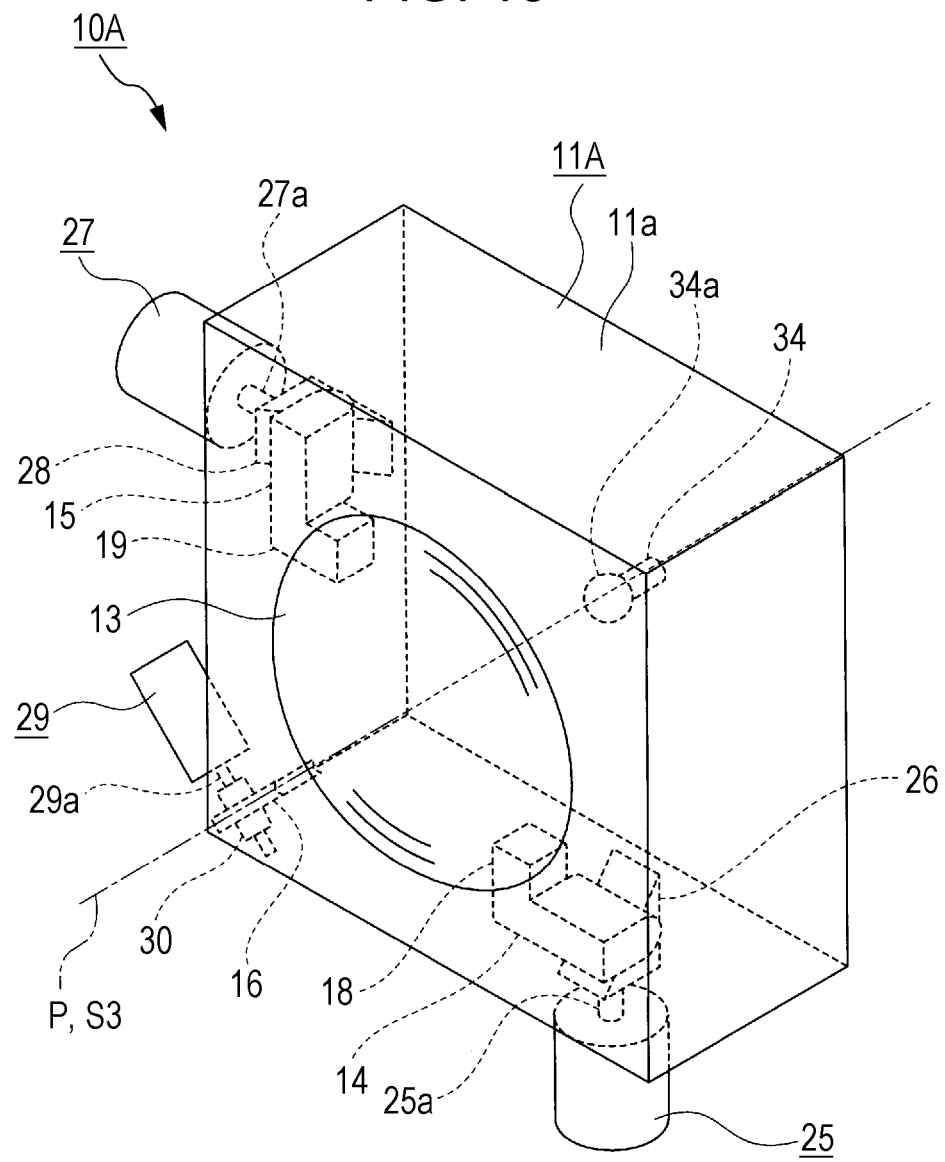
FIG. 18 is a schematic perspective view illustrating an image blur correction device according to a second embodiment together with FIGS. 19 to 27.

Subsequently, a blur correction operation in the third direction (rolling direction) in the image blur correction device 10 will be described (refer to FIGS. 16 and 17).

In the image blur correction device 10, when the third driving shaft 29a of the third actuator 29 is moved diagonally upward right and thereby the third driving portion 30 is moved diagonally upward right, the third driven portion 16 is moved in accordance with the movement of the third driving portion 30. Thereby, the lens unit 11 is rotated in the third direction about the third fulcrum axis S3 as a fulcrum such that the photography lens 13 is slightly moved diagonally upward right (refer to FIG. 16).

At this time, the first driven portion 14 comes into contact with the first driving portion 26 of the first actuator 25. However, in accordance with the rotation of the lens unit 11 in the third direction, the condition of contact between the first driving portion 26 and the first driven portion 14 is slightly changed.

Simultaneously, the second driven portion 15 comes into contact with the second driving portion 28 of the second actuator 27. However, in accordance with the rotation of the lens unit 11 in the third direction, a condition of contact between the second driving portion 28 and the second driven portion 15 is slightly changed.

When the lens unit 11 is rotated in the third direction in such a manner, in accordance with the rotation of the lens unit 11, the condition of contact between the first driving portion 26 and the first driven portion 14 is changed, and the condition of contact between the second driving portion 28 and the second driven portion 15 is changed. Hence, it is difficult for unnecessary load to be applied to the lens unit 11 from the first driving portion 26 and the second driving portion 28. Accordingly, the lens unit 11 is smoothly rotated in the third direction.

On the other hand, in the image blur correction device 10, when the third driving shaft 29a of the third actuator 29 is moved diagonally downward left and thereby the third driving portion 30 is moved diagonally downward left, the third driven portion 16 is moved in accordance with the movement of the third driving portion 30. Thereby, the lens unit 11 is rotated in the third direction about the third fulcrum axis S3 as a fulcrum such that the photography lens 13 is slightly moved diagonally downward left (refer to FIG. 17).

At this time, the first driven portion 14 comes into contact with the first driving portion 26 of the first actuator 25. However, in accordance with the rotation of the lens unit 11 in the third direction, the condition of contact between the first driving portion 26 and the first driven portion 14 is slightly changed.

Simultaneously, the second driven portion 15 comes into contact with the second driving portion 28 of the second actuator 27. However, in accordance with the rotation of the lens unit 11 in the third direction, a condition of contact between the second driving portion 28 and the second driven portion 15 is slightly changed.

When the lens unit 11 is rotated in the third direction in such a manner, in accordance with the rotation of the lens unit 11, the condition of contact between the first driving portion 26 and the first driven portion 14 is changed, and the condition of contact between the second driving portion 28 and the second driven portion 15 is changed. Hence, it is difficult for unnecessary load to be applied to the lens unit 11 from the first driving portion 26 and the second driving portion 28. Accordingly, the lens unit 11 is smoothly rotated in the third direction.

In addition, in the image blur correction device 10, although not shown in the drawing, the lens unit 11 is configured to be rotatable in the second direction in a state where the lens unit 11 is rotated in the first direction from the reference position, and the lens unit 11 is configured to be rotatable in the first direction in a state where the lens unit 11 is rotated in the second direction from the reference position.

Further, in the image blur correction device 10, although not shown in the drawing, the lens unit 11 is configured to be rotatable in the third direction in a state where the lens unit 11 is rotated in the first direction from the reference position, and the lens unit 11 is configured to be rotatable in the first direction in a state where the lens unit 11 is rotated in the third direction from the reference position.

Furthermore, in the image blur correction device 10, although not shown in the drawing, the lens unit 11 is configured to be rotatable in the third direction in a state where the lens unit 11 is rotated in the second direction from the reference position, and the lens unit 11 is configured to be rotatable in the second direction in a state where the lens unit 11 is rotated in the third direction from the reference position.

Configuration (Second Embodiment) of Image Blur Correction Device

Next, a configuration of an image blur correction device 10A according to a second embodiment will be described (refer to FIGS. 18 to 21). The image blur correction device 10A is provided in, for example, the imaging apparatus 1.

In addition, the image blur correction device 10A to be described later is different, compared with the image blur correction device 10 according to the first embodiment, in that the positions of the respective portions, such as the driving portion and the driven portion, provided in the lens unit or the fixing member are different. Accordingly, in the image blur correction device 10A, compared with the image blur correction device 10, only different parts will be described in detail, the other parts will be represented by numerals and signs the same as the numerals and signs used in the image blur correction device 10, and the description thereof will be omitted.

The image blur correction device 10A has a lens unit 11A and a fixing member 12A that supports the lens unit 11A.

The lens unit 11A has a first driven portion 14 that protrudes downward from the central portion of the lower surface in the horizontal direction, a second driven portion 15 that protrudes rightward from the central portion of the right side surface in the vertical direction, and a third driven portion 16 that protrudes diagonally downward right from the right end portion on the lower surface. The first driven portion 14 and the second driven portion 15 are bent in, for example, L-shapes, and the leading end surfaces thereof are formed to be rounded.

A bearing portion 33, which is open toward the back side, is formed at the central portion of the back side of the base surface portion 20A of the lens unit 11A.

The base end portions of the first driven portion 14 and the second driven portion 15 of the lens unit 11A respectively function as the first spring latch portion 18 and the second spring latch portion 19.

The fixing member 12A includes: a base surface portion 20A that faces the front and back sides; a first holding portion 21 that extends to the central portion of the lower end portion of the base surface portion 20A in the horizontal direction; a second holding portion 22 that extends to the central portion of the right end portion of the base surface portion 20A in the vertical direction; and a third holding portion 23 that extends to the lower right end portion of the base surface portion 20A. The fixing member 12A is fixed inside the lens unit 11A.

A fulcrum portion 34, which protrudes frontward, is provided at the central portion on the base surface portion 20A of the fixing member 12A, and a tip portion of the fulcrum portion 34 is provided as a spherical portion 34a.

The spherical portion 34a of the fulcrum portion 34 is supported by the bearing portion 33 of the fixing member 12A to be rotatable in an arbitrary direction. Accordingly, the lens unit 11A is configured to be rotatable in the arbitrary direction by using the spherical portion 34a as the fulcrum relative to the fixing member 12A.

In the above description of the example, the bearing portion 33, which is concave, is provided on the lens unit 11A, and the fulcrum portion 34, which is inserted into the bearing portion 33, is provided on the fixing member 12A. However, on the contrary, it may be possible to adopt the following configuration: the bearing portion is provided on the fixing member, and the fulcrum portion, which is inserted into the bearing portion, is provided on the lens unit.

The first bias spring 31 is supported between the first spring latch portion 18 of the lens unit 11A and the fixing member 12A. Accordingly, the lens unit 11A is urged backward by the first bias spring 31, and thus the first driven portion 14 is pressed against the first operating surface 26a of the first driving portion 26.

The second bias spring 32 is supported between the second spring latch portion 19 of the lens unit 11A and the fixing member 12A. Accordingly, the lens unit 11A is urged backward by the second bias spring 32, and thus the second driven portion 15 is pressed against the second operating surface 28a of the second driving portion 28.

The lens unit 11A is configured to be rotatable in a first direction (pitching direction), which is an axial rotation direction of a first fulcrum axis S1, relative to the fixing member 12A. Further, the lens unit 11A is configured to be rotatable in a second direction (yawing direction), which is an axial rotation direction of a second fulcrum axis S2, relative to the fixing member 12A. Furthermore, the lens unit 11A is configured to be rotatable in a third direction (rolling direction), which is an axial rotation direction of a third fulcrum axis S3, relative to the fixing member 12A.

The first fulcrum axis S1, the second fulcrum axis S2, and the third fulcrum axis S3 are orthogonal to one another. For example, the first fulcrum axis S1 and the second fulcrum axis S2 are positioned on the same plane orthogonal to an optical axis P. The first fulcrum axis S1, which is set as a rotation axis in the pitching direction, is positioned on the line connecting the spherical portion 34a of the fulcrum portion 34 and the second driving portion 28. The second fulcrum axis S2, which is set as a rotation axis in the yawing direction, is positioned on the line connecting the spherical portion 34a of the fulcrum portion 34 and the first driving portion 26. Both of the first fulcrum axis S1 and the second fulcrum axis S2 are set as intersection lines of the optical axis P. The third fulcrum axis S3, which is set as a rotation axis in the rolling direction, coincides with the optical axis P passing through the spherical portion 34a of the fulcrum portion 34.

In the image blur correction device 10A, at least one of the respective axes of the first fulcrum axis S1 and the second fulcrum axis S2 may be positioned on either one of the respective lines of the line connecting the fulcrum portion 34 and the second driving portion 28 or the line connecting the fulcrum portion 34 and the first driving portion 26.

Further, in the above description of the example, the first direction, the second direction, and the third direction are respectively set as the pitching direction, the yawing direction, and the rolling direction. However, each of the first direction, the second direction, and the third direction may be set as any of the pitching direction, the yawing direction, and the rolling direction.

Operation (Second Embodiment) of Image Blur Correction Device

Hereinafter, a blur correction operation in the image blur correction device 10A will be described (refer to FIGS. 19 to 27).

Figure 19:
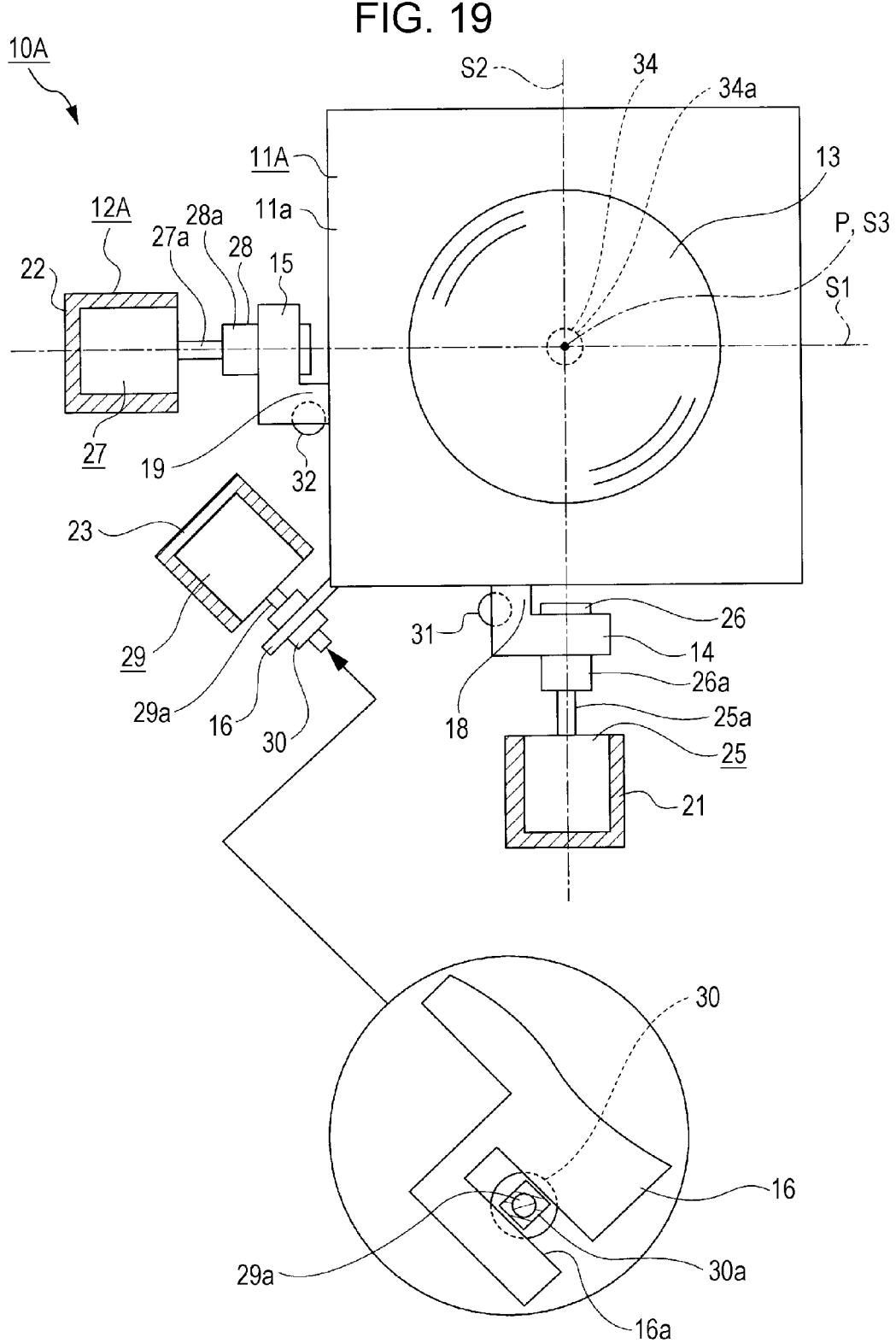
FIG. 19 is a schematic front view of the image blur correction device.
Figure 20:
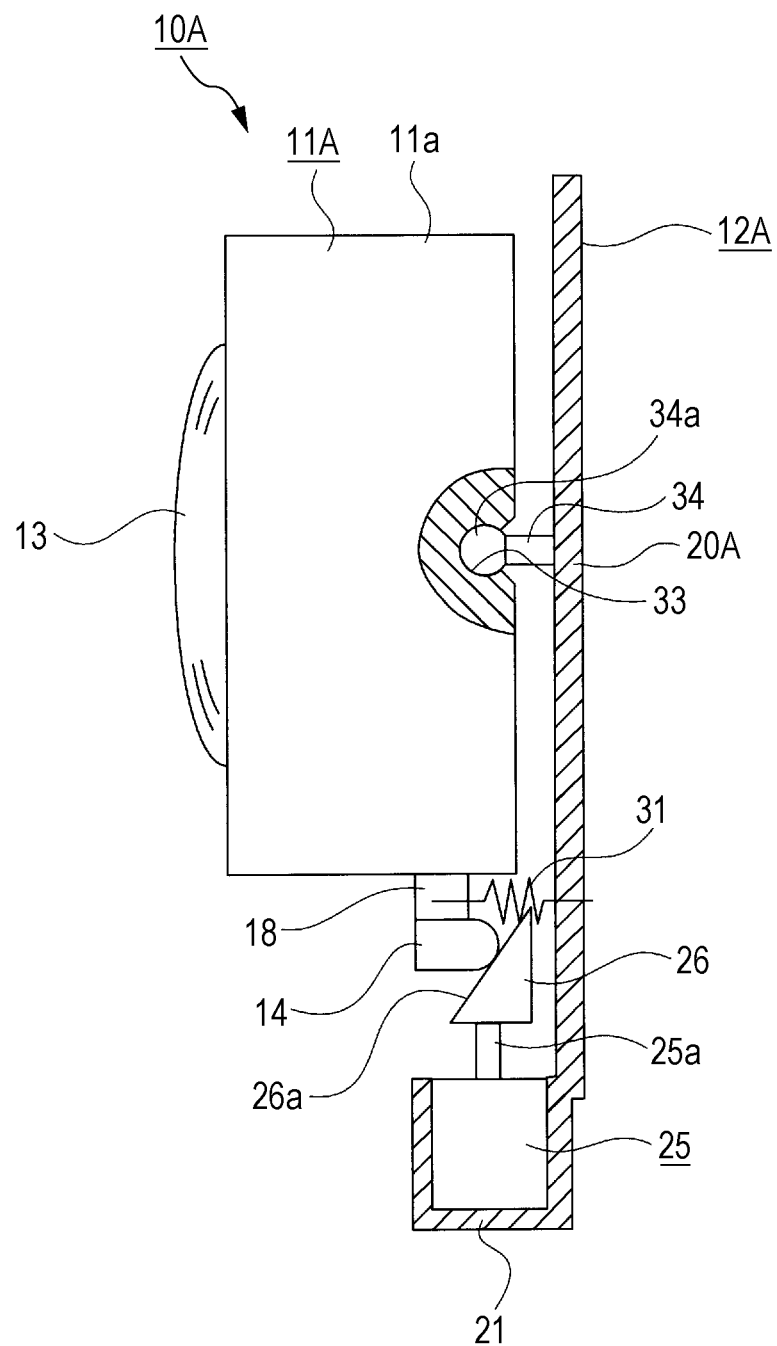
FIG. 20 is a schematic side view of the image blur correction device.
Figure 21:
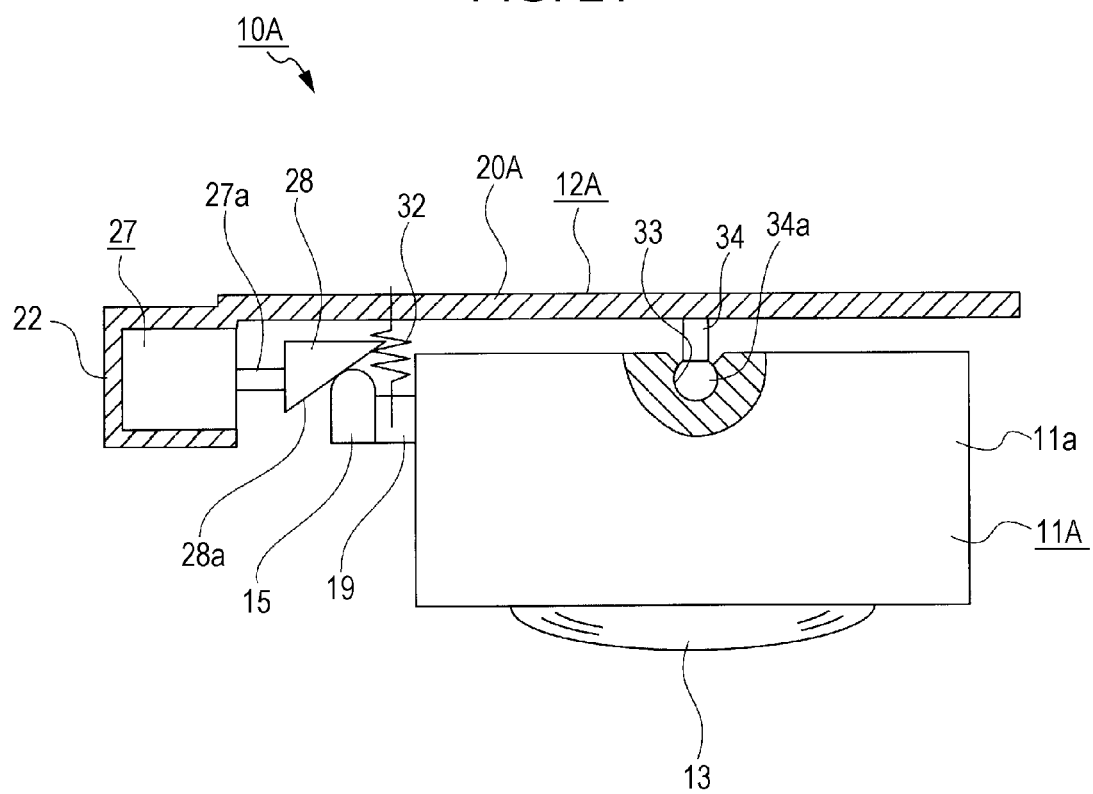
FIG. 21 is a schematic top plan view of the image blur correction device.

In a state where the blur correction operation is not performed, the image blur correction device 10A is at a reference position at which the lens unit 11A is not rotated in any one direction of the first direction, the second direction, and the third direction (refer to FIGS. 19 to 21).

Figure 22:
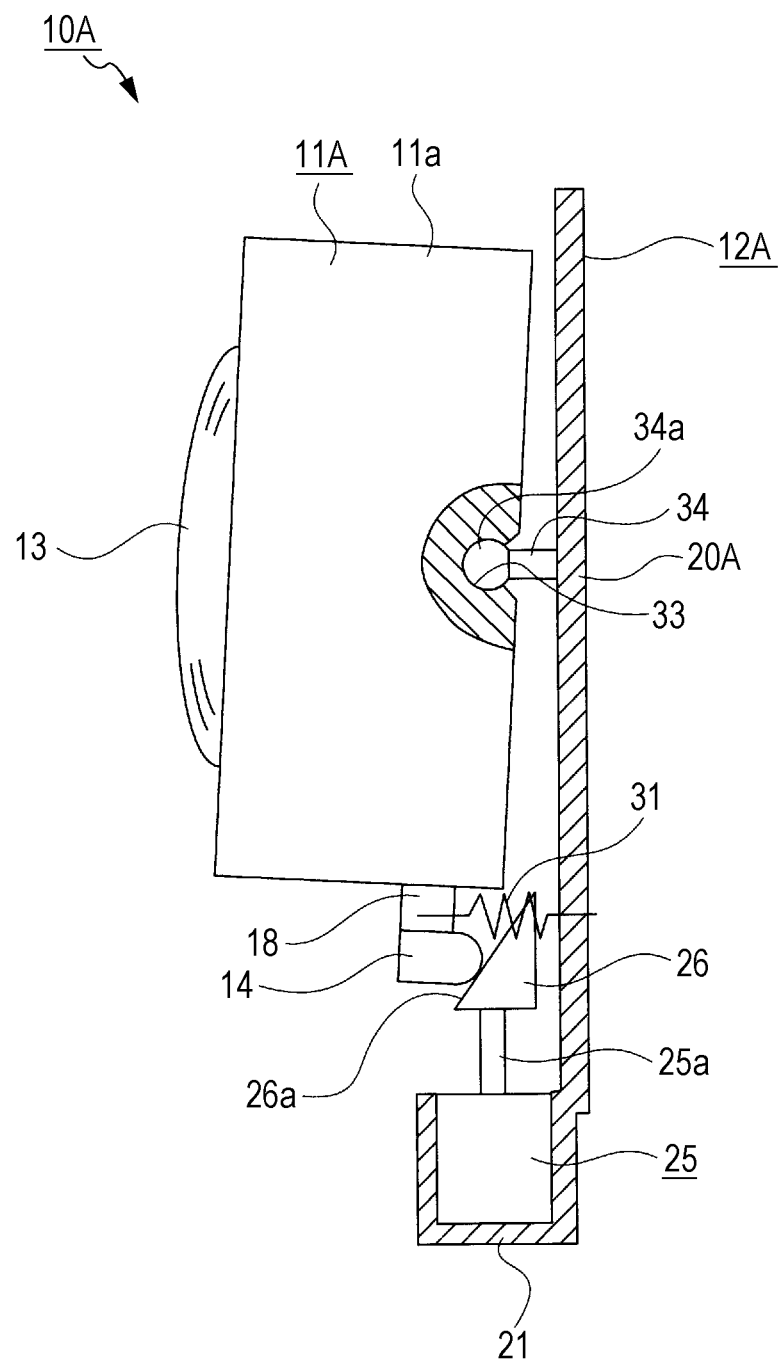
FIG. 22 is a schematic side view illustrating an operation of the image blur correction device in a condition where the lens unit is rotated toward one side in the first direction together with FIGS. 23 to 27.
Figure 23:
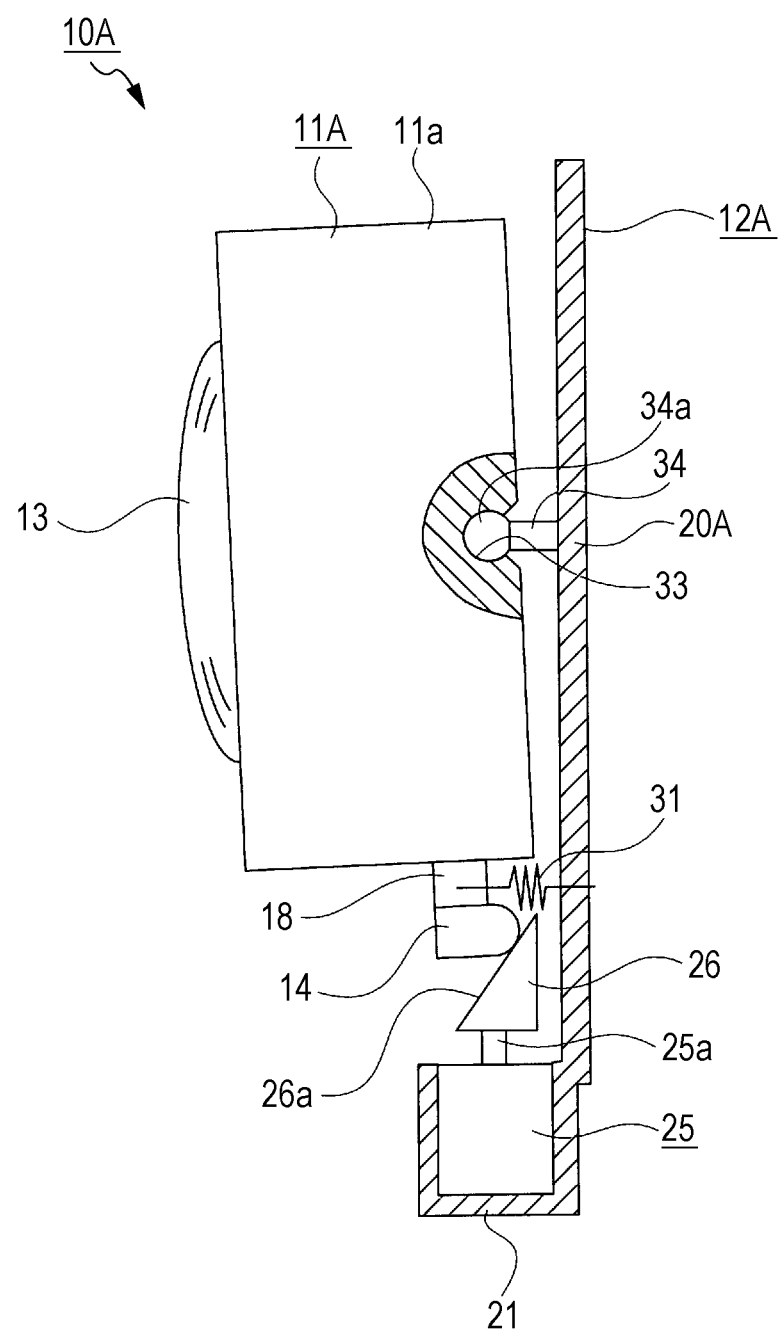
FIG. 23 is a schematic side view illustrating a condition where the lens unit is rotated toward the other side in the first direction.

First, a blur correction operation in the first direction (pitching direction) in the image blur correction device 10A will be described (refer to FIGS. 22 and 23).

In the image blur correction device 10A, when the first driving shaft 25a of the first actuator 25 is moved upward and thereby the first driving portion 26 is moved upward, the first operating surface 26a slides on the first driven portion 14. Thereby, the lens unit 11A is rotated about the first fulcrum axis S1 as a fulcrum in the first direction in which the photography lens 13 faces slightly upward against elastic force of the first bias spring 31 (refer to FIG. 22).

At this time, the second driven portion 15 comes into contact with the second driving portion 28 of the second actuator 27. However, in accordance with the rotation of the lens unit 11A in the first direction, a condition of contact between the second driving portion 28 and the second driven portion 15 is slightly changed.

Simultaneously, the third driving portion 30 of the third actuator 29 slides on the third driven portion 16 in accordance with the rotation of the lens unit 11A in the first direction, and the engagement position of the supporting hole 16a is changed. Hence, it is difficult for unnecessary load to be applied to the lens unit 11A from the second driving portion 28 and the third driving portion 30. Accordingly, the lens unit 11A is smoothly rotated in the first direction.

On the other hand, in the image blur correction device 10A, when the first driving shaft 25a of the first actuator 25 is moved downward and thereby the first driving portion 26 is moved downward, the first operating surface 26a slides on the first driven portion 14. Thereby, the lens unit 11A is rotated about the first fulcrum axis S1 as a fulcrum in the first direction in which the photography lens 13 faces slightly downward due to elastic force of the first bias spring 31 (refer to FIG. 23).

At this time, the second driven portion 15 comes into contact with the second driving portion 28 of the second actuator 27. However, in accordance with the rotation of the lens unit 11A in the first direction, a condition of contact between the second driving portion 28 and the second driven portion 15 is slightly changed.

Simultaneously, the third driving portion 30 of the third actuator 29 slides on the third driven portion 16 in accordance with the rotation of the lens unit 11A in the first direction, and the engagement position of the supporting hole 16a is changed.

When the lens unit 11A is rotated in the first direction in such a manner, in accordance with the rotation of the lens unit 11A, the condition of contact between the second driving portion 28 and the second driven portion 15 is changed, the third driving portion 30 slides on the third driven portion 16, and the engagement position of the supporting hole 16a is changed. Hence, it is difficult for unnecessary load to be applied to the lens unit 11A from the second driving portion 28 and the third driving portion 30. Accordingly, the lens unit 11A is smoothly rotated in the first direction.

Figure 24:
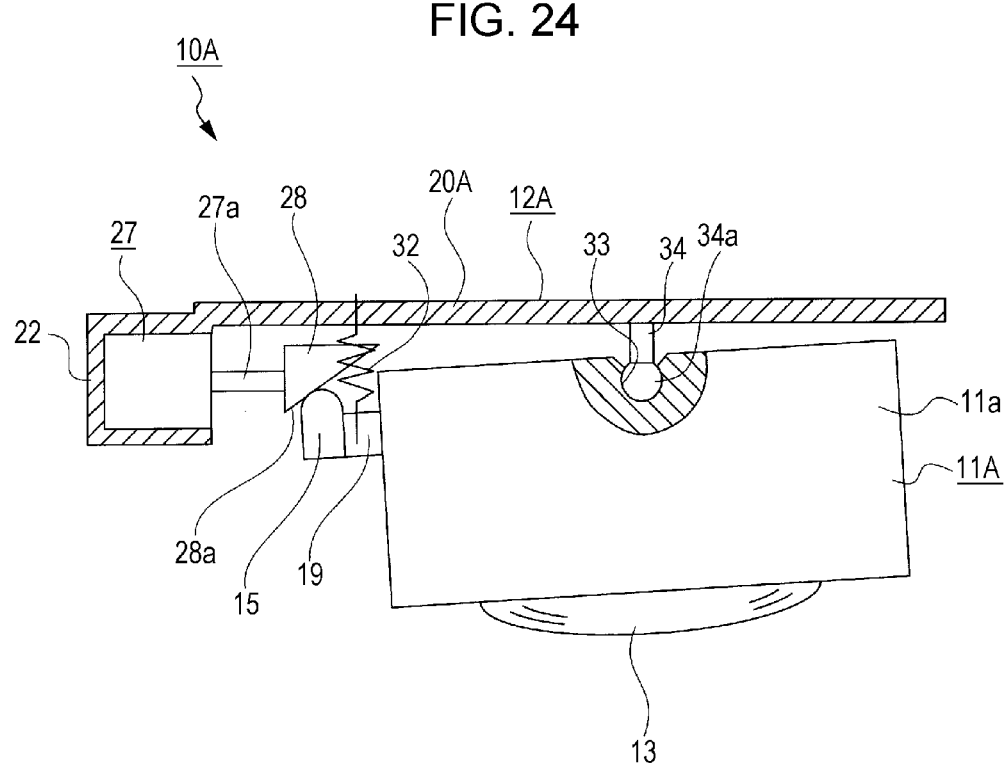
FIG. 24 is a schematic top plan view illustrating a condition where the lens unit is rotated toward one side in the second direction.
Figure 25:
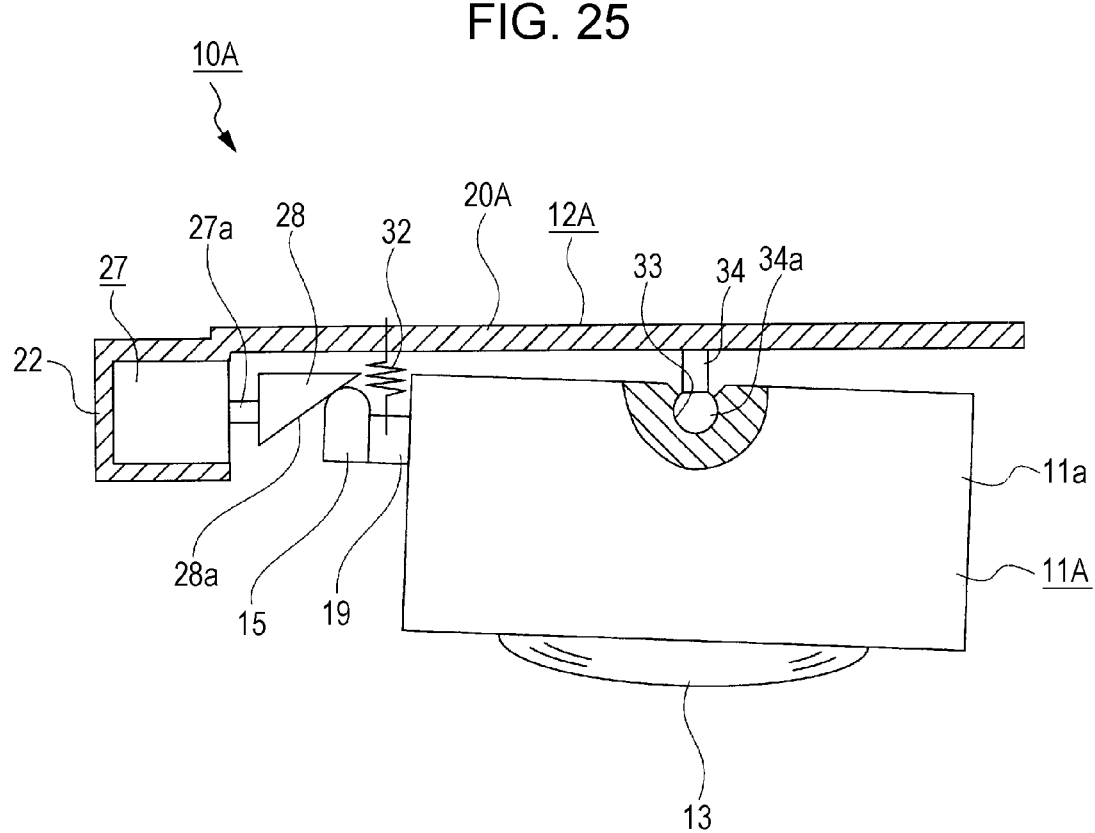
FIG. 25 is a schematic top plan view illustrating a condition where the lens unit is rotated toward the other side in the second direction.

Next, a blur correction operation in the second direction (yawing direction) in the image blur correction device 10A will be described (refer to FIGS. 24 and 25).

In the image blur correction device 10A, when the second driving shaft 27a of the second actuator 27 is moved leftward and thereby the second driving portion 28 is moved leftward, the second operating surface 28a slides on the second driven portion 15. Thereby, the lens unit 11A is rotated about the second fulcrum axis S2 as a fulcrum in the second direction in which the photography lens 13 faces slightly leftward against elastic force of the second bias spring 32 (refer to FIG. 24).

At this time, the first driven portion 14 comes into contact with the first driving portion 26 of the first actuator 25. However, in accordance with the rotation of the lens unit 11A in the second direction, a condition of contact between the first driving portion 26 and the first driven portion 14 is slightly changed.

Simultaneously, the third driving portion 30 of the third actuator 29 slides on the third driven portion 16 in accordance with the rotation of the lens unit 11A in the second direction, and the engagement position of the supporting hole 16a is changed.

When the lens unit 11A is rotated in the second direction in such a manner, in accordance with the rotation of the lens unit 11A, the condition of contact between the first driving portion 26 and the first driven portion 14 is changed, the third driving portion 30 slides on the third driven portion 16, and the engagement position of the supporting hole 16a is changed. Hence, it is difficult for unnecessary load to be applied to the lens unit 11A from the first driving portion 26 and the third driving portion 30. Accordingly, the lens unit 11A is smoothly rotated in the second direction.

On the other hand, in the image blur correction device 10A, when the second driving shaft 27a of the second actuator 27 is moved rightward and thereby the second driving portion 28 is moved rightward, the second operating surface 28a slides on the second driven portion 15. Thereby, the lens unit 11A is rotated about the second fulcrum axis S2 as a fulcrum in the second direction in which the photography lens 13 faces slightly rightward due to elastic force of the second bias spring 32 (refer to FIG. 25).

At this time, the first driven portion 14 comes into contact with the first driving portion 26 of the first actuator 25. However, in accordance with the rotation of the lens unit 11A in the second direction, the condition of contact between the first driving portion 26 and the first driven portion 14 is slightly changed.

Simultaneously, the third driving portion 30 of the third actuator 29 slides on the third driven portion 16 in accordance with the rotation of the lens unit 11A in the second direction, and the engagement position of the supporting hole 16a is changed.

When the lens unit 11A is rotated in the second direction in such a manner, in accordance with the rotation of the lens unit 11A, the condition of contact between the first driving portion 26 and the first driven portion 14 is changed, the third driving portion 30 slides on the third driven portion 16, and the engagement position of the supporting hole 16a is changed. Hence, it is difficult for unnecessary load to be applied to the lens unit 11A from the first driving portion 26 and the third driving portion 30. Accordingly, the lens unit 11A is smoothly rotated in the second direction.

Figure 26:
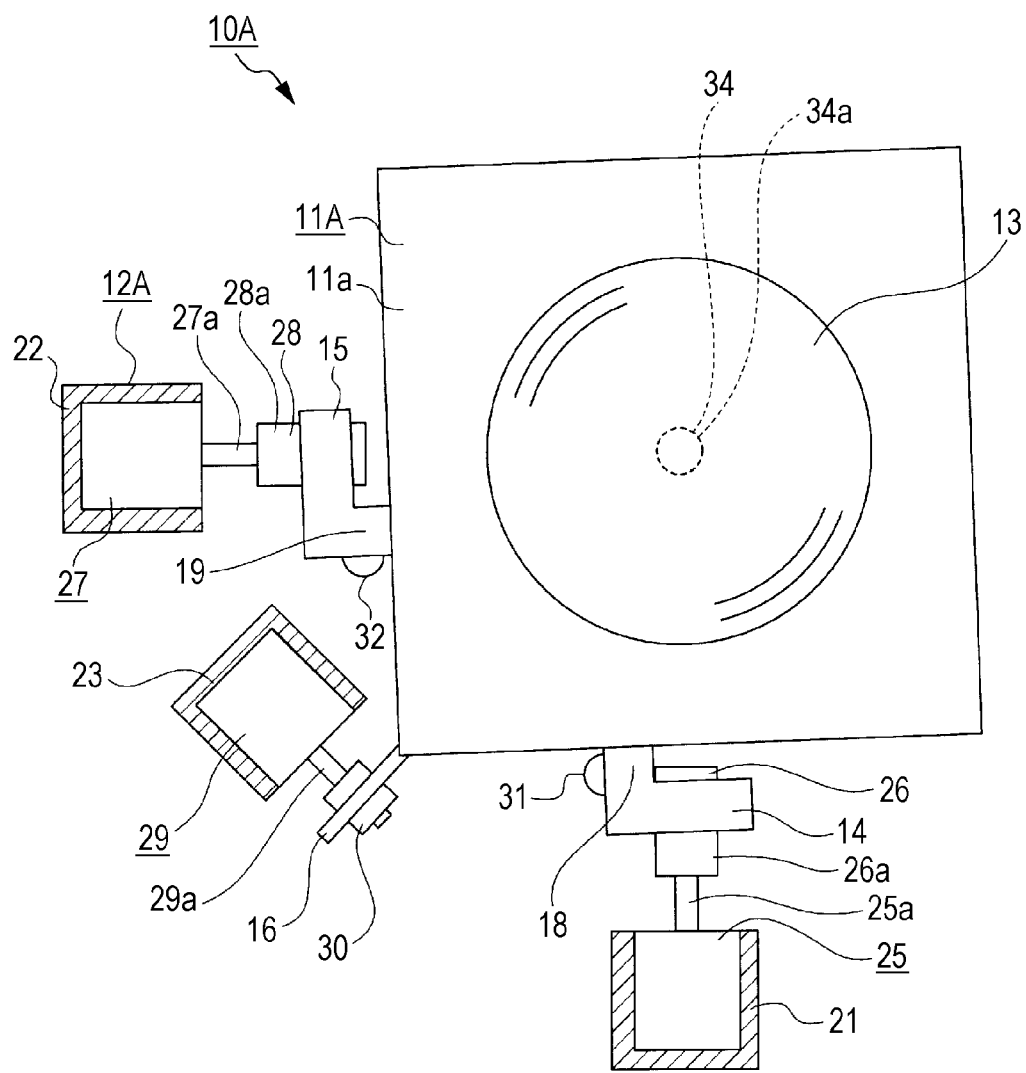
FIG. 26 is a schematic front view illustrating a condition where the lens unit is rotated toward one side in the third direction.
Figure 27:
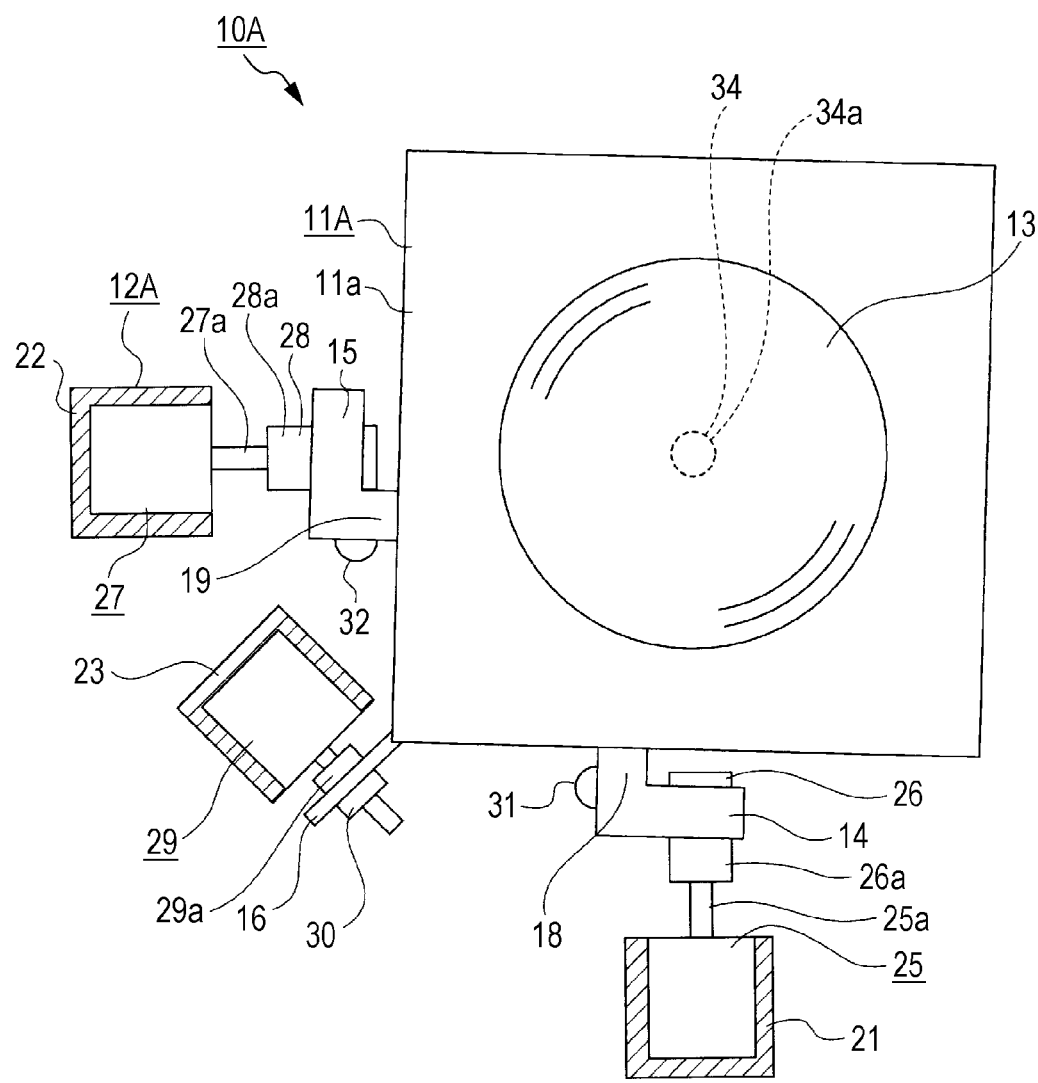
FIG. 27 is a schematic front view illustrating a condition where the lens unit is rotated toward the other side in the third direction.

Subsequently, a blur correction operation in the third direction (rolling direction) in the image blur correction device 10A will be described (refer to FIGS. 26 and 27).

In the image blur correction device 10A, when the third driving shaft 29a of the third actuator 29 is moved diagonally upward right and thereby the third driving portion 30 is moved diagonally upward right, the third driven portion 16 is moved in accordance with the movement of the third driving portion 30. Thereby, the lens unit 11A is rotated in the third direction about the third fulcrum axis S3 as a fulcrum such that the photography lens 13 is rotated toward one side (refer to FIG. 26).

At this time, the first driven portion 14 comes into contact with the first driving portion 26 of the first actuator 25. However, in accordance with the rotation of the lens unit 11A in the third direction, the condition of contact between the first driving portion 26 and the first driven portion 14 is slightly changed.

Simultaneously, the second driven portion 15 comes into contact with the second driving portion 28 of the second actuator 27. However, in accordance with the rotation of the lens unit 11A in the third direction, a condition of contact between the second driving portion 28 and the second driven portion 15 is slightly changed.

When the lens unit 11A is rotated in the third direction in such a manner, in accordance with the rotation of the lens unit 11A, the condition of contact between the first driving portion 26 and the first driven portion 14 is changed, and the condition of contact between the second driving portion 28 and the second driven portion 15 is changed. Hence, it is difficult for unnecessary load to be applied to the lens unit 11A from the first driving portion 26 and the second driving portion 28. Accordingly, the lens unit 11A is smoothly rotated in the third direction.

On the other hand, in the image blur correction device 10A, when the third driving shaft 29a of the third actuator 29 is moved diagonally downward left and thereby the third driving portion 30 is moved diagonally downward left, the third driven portion 16 is moved in accordance with the movement of the third driving portion 30. Thereby, the lens unit 11A is rotated in the third direction about the third fulcrum axis S3 as a fulcrum such that the photography lens 13 is rotated toward the other side (refer to FIG. 27).

At this time, the first driven portion 14 comes into contact with the first driving portion 26 of the first actuator 25. However, in accordance with the rotation of the lens unit 11A in the third direction, the condition of contact between the first driving portion 26 and the first driven portion 14 is slightly changed.

Simultaneously, the second driven portion 15 comes into contact with the second driving portion 28 of the second actuator 27. However, in accordance with the rotation of the lens unit 11A in the third direction, a condition of contact between the second driving portion 28 and the second driven portion 15 is slightly changed.

When the lens unit 11A is rotated in the third direction in such a manner, in accordance with the rotation of the lens unit 11A, the condition of contact between the first driving portion 26 and the first driven portion 14 is changed, and the condition of contact between the second driving portion 28 and the second driven portion 15 is changed. Hence, it is difficult for unnecessary load to be applied to the lens unit 11A from the first driving portion 26 and the second driving portion 28. Accordingly, the lens unit 11A is smoothly rotated in the third direction.

As described above, in the image blur correction device 10A, the fulcrum portion 34 is positioned on the optical axis P. Hence, the lens unit 11A is rotated about the first fulcrum axis S1, the second fulcrum axis S2, or the third fulcrum axis S3, which passes through the optical axis P, as a fulcrum. Thus, an amount of rotation of the lens unit 11A is minimized, and it is possible to achieve reduction in the size and improve the accuracy in correction of the blur correction operation.

In addition, in the image blur correction device 10A, although not shown in the drawing, the lens unit 11A is configured to be rotatable in the second direction in a state where the lens unit 11A is rotated in the first direction from the reference position, and the lens unit 11A is configured to be rotatable in the first direction in a state where the lens unit 11A is rotated in the second direction from the reference position.

Further, in the image blur correction device 10A, although not shown in the drawing, the lens unit 11A is configured to be rotatable in the third direction in a state where the lens unit 11A is rotated in the first direction from the reference position, and the lens unit 11A is configured to be rotatable in the first direction in a state where the lens unit 11A is rotated in the third direction from the reference position.

Furthermore, in the image blur correction device 10A, although not shown in the drawing, the lens unit 11A is configured to be rotatable in the third direction in a state where the lens unit 11A is rotated in the second direction from the reference position, and the lens unit 11A is configured to be rotatable in the second direction in a state where the lens unit 11A is rotated in the third direction from the reference position.

As described above, in the image blur correction device 10 or 10A, the first fulcrum axis S1 is positioned on the line connecting the fulcrum portion 17 or 34 and the second driving portion 28, and the second fulcrum axis S2 is positioned on the line connecting the fulcrum portion 17 or 34 and the first driving portion 26.

Accordingly, the two gimbal mechanisms arranged in the optical axis direction are not configured such that the lens unit is rotated. Hence, it is possible to simplify the structure and achieve reduction in the size of the device.

Further, the first fulcrum axis S1 and the second fulcrum axis S2 are positioned to be coplanar. Hence, the lens unit 11 or 11A is rotated in the first and second directions respectively about the first fulcrum axis S1 and the second fulcrum axis S2, which are positioned to be coplanar, as fulcrums. As a result, it is possible to further achieve reduction in the size.

Furthermore, the lens unit 11 or 11A is rotated in the third direction about the third fulcrum axis S3 as a fulcrum. Hence, it is possible to improve functionality, and it is possible to simplify the structure and achieve reduction in the size of the device.

Moreover, in the configuration, the first driving portion 26 and the second driving portion 28 are moved, the position of contact between the first operating surface 26*a* and the first driven portion 14 and the position of contact the second operating surface 28*a* and the second driven portion 15 are changed, and the lens unit 11 or 11A is rotated. Hence, it is possible to simplify the structure of the driving mechanism, and it is possible to further simplify the structure of the device.

Further, the first operating surface 26*a* and the second operating surface 28*a* are formed to be coplanar. Hence, it is easy to form the first driving portion 26 and the second driving portion 28, and it is possible to form the image blur correction device 10 or 10A without an increase in manufacturing costs.

In addition, there are provided the first bias spring 31 and the second bias spring 32 that urge the lens unit 11 or 11A in a direction in which the first driven portion 14 and the second driven portion 15 are respectively pressed against the first operating surface 26*a* and the second operating surface 28*a*.

Accordingly, it is possible to secure the conditions of the contact between the first driven portion 14 and the first operating surface 26*a* and the contact between the second driven portion 15 and the second operating surface 28*a*, and thus it is possible to secure a smooth and precise rotation operation of the lens unit 11 or 11A.

Modified Examples of Image Blur Correction Device

First Embodiment and Second Embodiment

Next, modified examples (first to sixth modified examples) of the respective sections according to the first embodiment and the second embodiment will be described (refer to FIGS. 28 to 45).

First Modified Example

The first modified example describes a first driving portion 26A and a second driving portion 28A as the modified examples of the first driving portion 26 and the second driving portion 28 (refer to FIGS. 28 to 31). Since the configurations and the operations of the first driving portion 26A and the second driving portion 28A are the same, the first driving portion 26A as an example will be hereinafter described.

Figure 28:
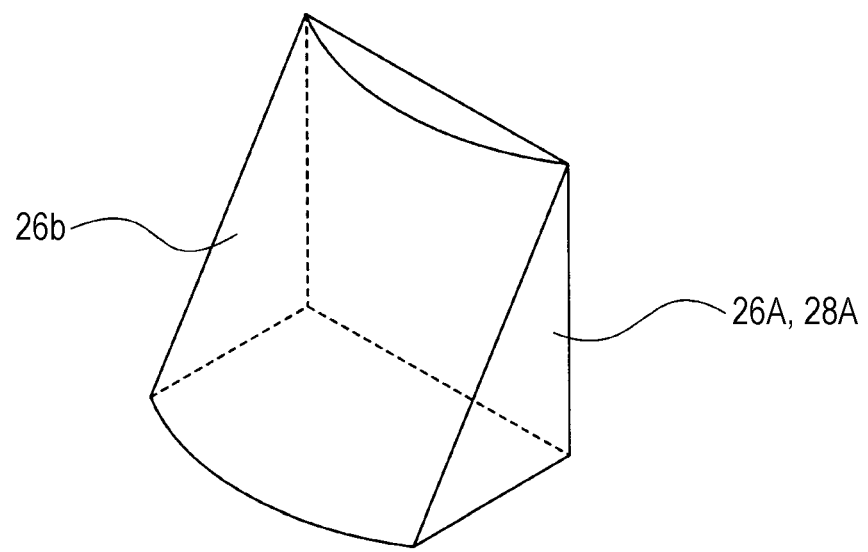
FIG. 28 is a schematic perspective view illustrating a first modified example together with FIGS. 29 to 31.
Figure 29:
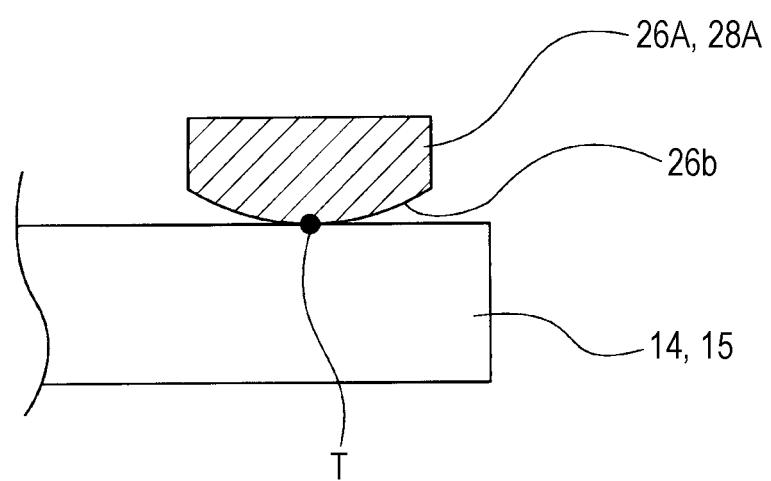
FIG. 29 is a schematic top plan view illustrating a condition where the lens unit is at a reference position before being rotated.

The first driving portion 26A has a first operating surface 26*b* that is formed in a curved shape which is convex toward the front side (refer to FIG. 28).

Figure 30:
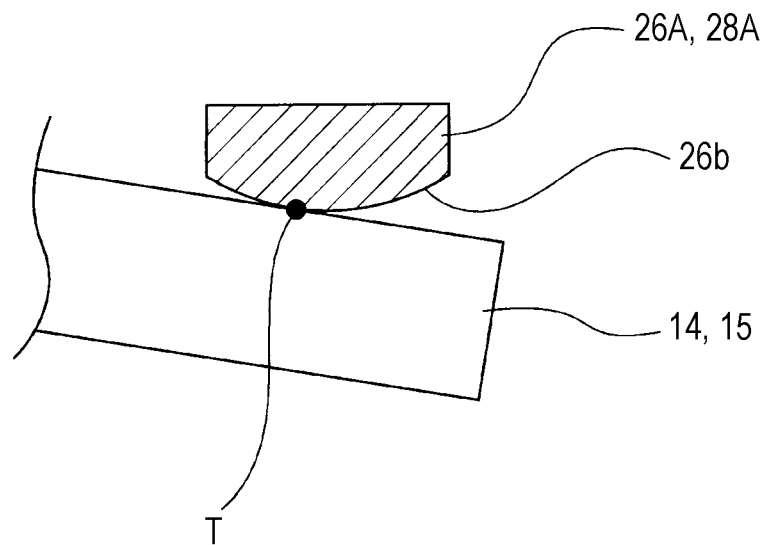
FIG. 30 is a schematic top plan view illustrating a condition where the lens unit is rotated.
Figure 31:
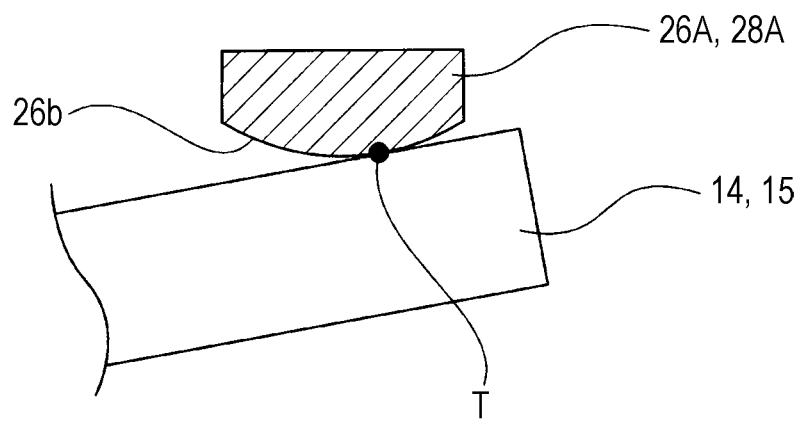
FIG. 31 is a schematic top plan view illustrating a different condition where the lens unit is rotated.

In a state where the first operating surface 26*b* of the first driving portion 26A comes into contact with the first driven portion 14 at the contact position T (refer to FIG. 29), when the lens unit 11 or 11A is rotated in the second direction and the third direction, an angle of the first driven portion 14 to the first operating surface 26*b* is changed (refer to FIGS. 30 and 31). In this case, since the first operating surface 26*b* is formed in a curved shape, when the angle of the first driven portion 14 to the first operating surface 26*b* is changed, the contact position T between both of them is not greatly changed.

Accordingly, when the lens unit 11 or 11A is rotated in a predetermined direction, positional deviation in other directions is small, and it is possible to improve the accuracy in correction of the blur correction operation.

Further, when the first operating surface 26*b* of the first driving portion 26A slides on the first driven portion 14 at the time of rotation of the lens unit 11 or 11A, the first operating surface 26*b* constantly comes into line contact or point contact with the first driven portion 14.

Accordingly, the load caused by the contact at the time of rotation of the lens unit 11 or 11A is small, and thus it is possible to secure a smooth rotation operation of the lens unit 11 or 11A.

Second Modified Example

The second modified example describes a first driving portion 26B and a second driving portion 28B as the modified examples of the first driving portion 26 and the second driving portion 28 (refer to FIGS. 32 to 35). Since the configurations and the operations of the first driving portion 26B and the second driving portion 28B are the same, the first driving portion 26B as an example will be hereinafter described.

Figure 32:
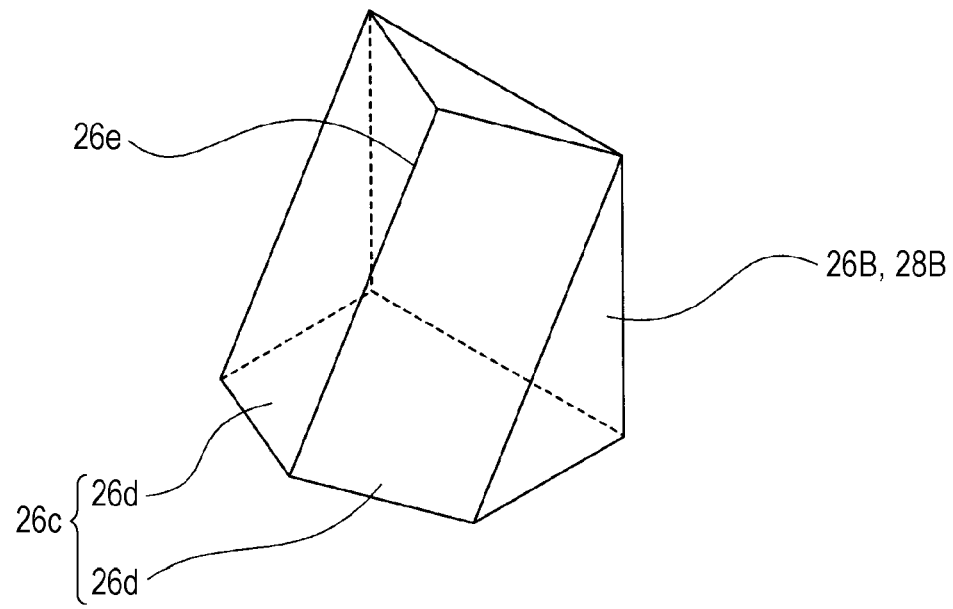
FIG. 32 is a schematic perspective view illustrating a second modified example together with FIGS. 33 to 35.
Figure 33:
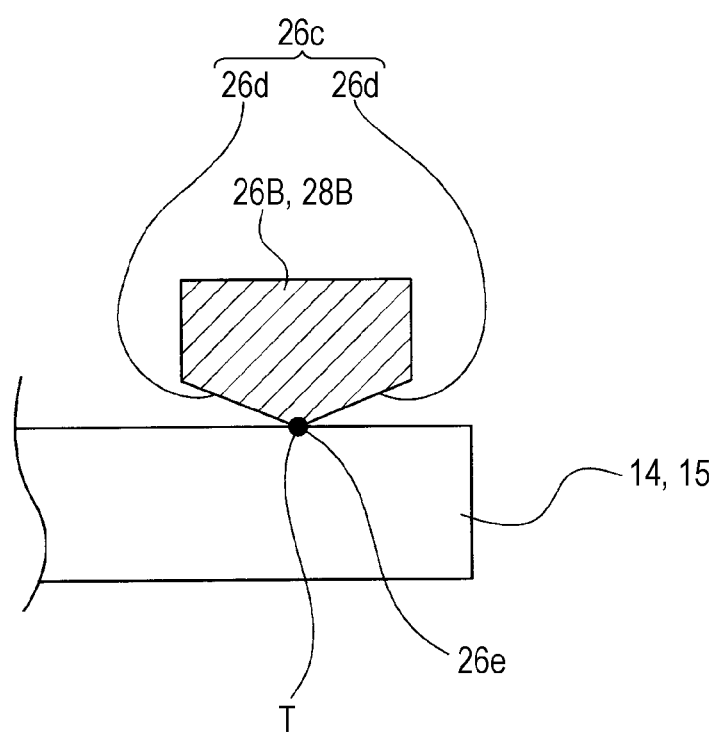
FIG. 33 is a schematic top plan view illustrating a condition where the lens unit is at a reference position before being rotated.

The first driving portion 26B is formed of two planar portions 26*d* and 26*d* which become close to each other as the first operating surface 26*c* moves forward, and the border line of the planar portions 26*d* and 26*d* is formed as an intersection line 26*e* (refer to FIG. 32).

Figure 34:
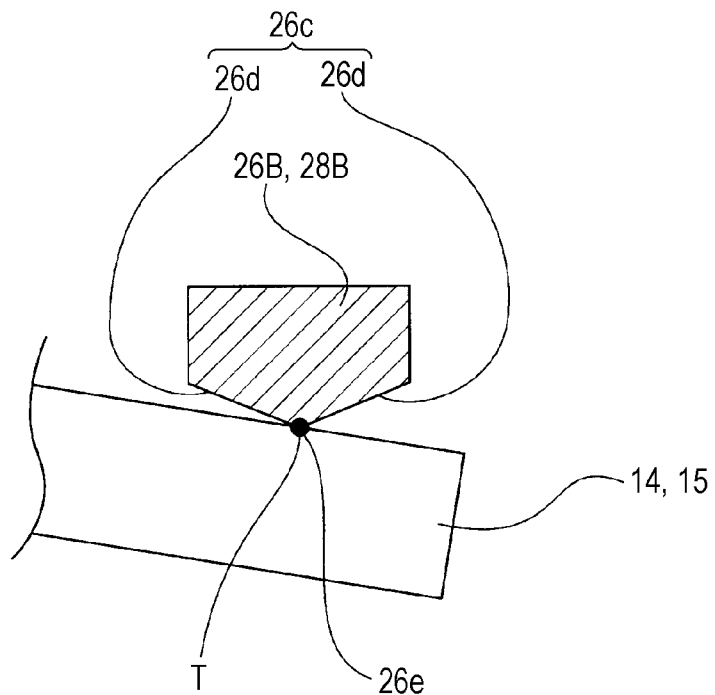
FIG. 34 is a schematic top plan view illustrating a condition where the lens unit is rotated.
Figure 35:
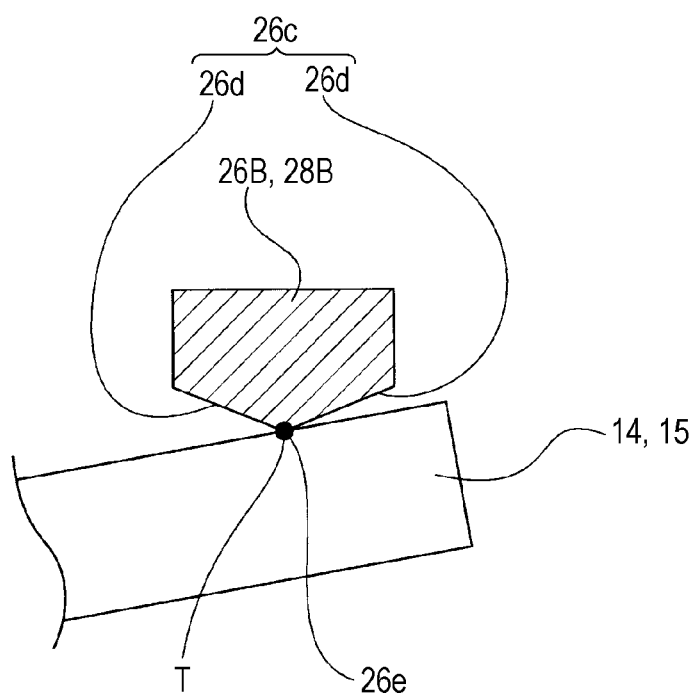
FIG. 35 is a schematic top plan view illustrating a different condition where the lens unit is rotated.

In a state where the first operating surface 26*c* of the first driving portion 26B comes into contact with the first driven portion 14 at the contact position T (refer to FIG. 33), when the lens unit 11 or 11A is rotated, the angle of the first driven portion 14 to the first operating surface 26*c* is changed (refer to FIGS. 34 and 35). In this case, since the first operating surface 26*c* is formed of planar portions 26*d* and 26*d*, when the angle of the first driven portion 14 to the first operating surface 26*c* is changed, the contact position T between both of them is constantly set as the intersection line 26*e*.

Accordingly, when the lens unit 11 or 11A is rotated in a predetermined direction, positional deviation in other directions is small, and it is possible to improve the accuracy in correction of the blur correction operation.

Further, when the first operating surface 26*c* of the first driving portion 26B slides on the first driven portion 14 at the time of rotation of the lens unit 11 or 11A, the intersection line 26*e* constantly comes into line contact or point contact with the first driven portion 14.

Accordingly, the load caused by the contact at the time of rotation of the lens unit 11 or 11A is small, and thus it is possible to secure a smooth rotation operation of the lens unit 11 or 11A.

Third Modified Example

Figure 36:
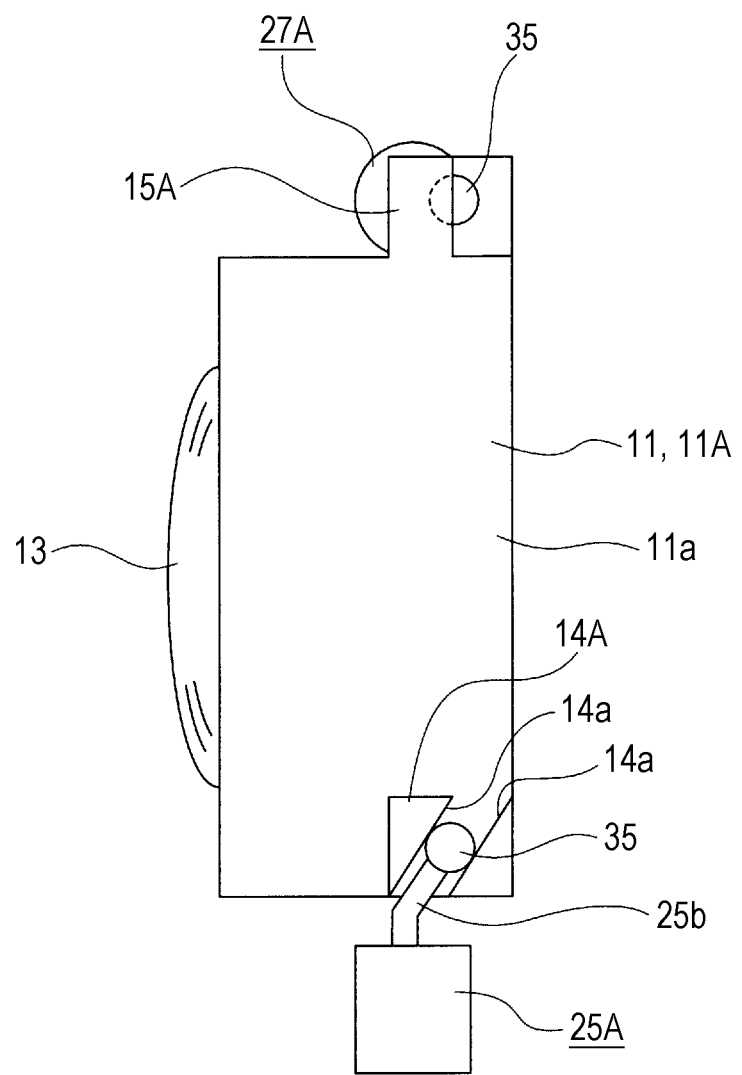
FIG. 36 is a schematic side view illustrating a third modified example together with FIG. 37.
Figure 37:
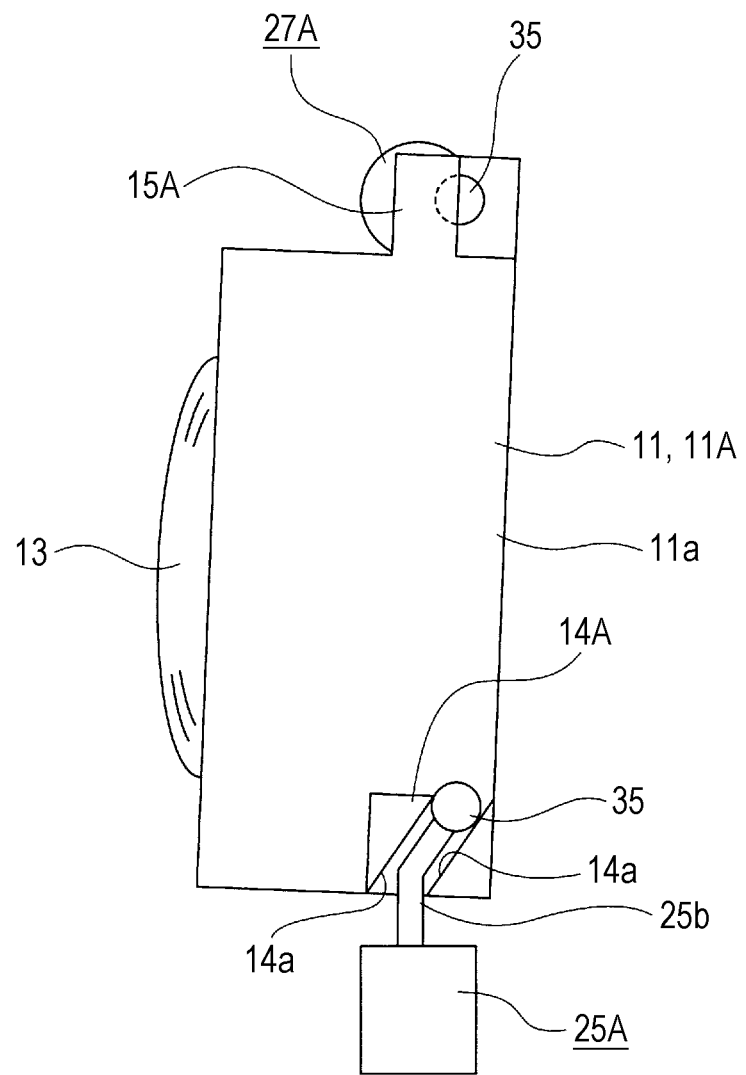
FIG. 37 is a schematic side view illustrating a condition where the lens unit is rotated.

The third modified example describes a first actuator 25A and a second actuator 27A as modified examples of the first actuator 25 and the second actuator 27 which rotate the lens unit 11 or 11A without using a bias spring (refer to FIGS. 36 and 37). Since the configurations and the operations of the first actuator 25A and the second actuator 27A are the same, the first actuator 25A as an example will be hereinafter described.

The first actuator 25A has a first driving shaft 25b which is bent, and a first driving portion 35 having a spherical shape is fixed onto the first driving shaft 25b (refer to FIG. 36).

The lens unit 11 or 11A is provided with a first driven portion 14A that protrudes laterally, and the first driven portion 14A has a pair of surfaces 14a and 14a to be operated. The surfaces 14a and 14a are positioned to be inclined in the vertical direction and to face each other.

The first driving portion 35 is inserted between the surfaces 14a and 14a to be operated, and slides on the first driven portion 14A.

When the first driving shaft 25b of the first actuator 25A is moved in the vertical direction and the first driving portion 35 is moved in the vertical direction, the first driving portion 35 slides on the first driven portion 14A. Thereby, the lens unit 11 or 11A is rotated about the first fulcrum axis S1 as a fulcrum in the first direction in which the photography lens 13 faces slightly upward or downward (refer to FIG. 37).

In such a manner, when the first actuator 25A is used, the first driving portion 35 is inserted and moved between the surfaces 14a and 14a to be operated, and the lens unit 11 or 11A is rotated. Hence, it is possible to smoothly rotate the lens unit 11 or 11A without using the bias spring. Accordingly, due to reduction in the number of components, it is possible to simplify the structure.

Further, since the first driving portion 35 is formed in a spherical shape, even when the lens unit 11 or 11A is rotated and inclined in the vertical direction or the horizontal direction, the distance between the surfaces 14a and 14a to be operated relative to the first driving portion 35 is not changed, and it is possible to smoothly rotate the lens unit 11 or 11A.

Fourth Modified Example

Figure 38:
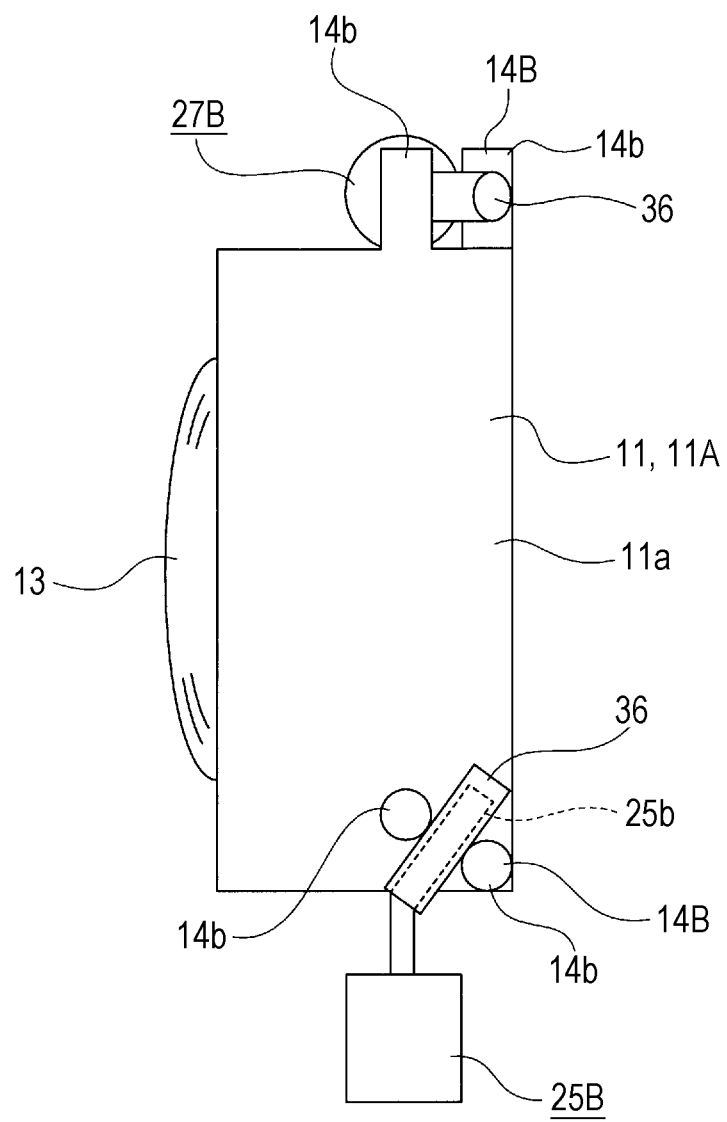
FIG. 38 is a schematic side view illustrating a fourth modified example together with FIG. 39.
Figure 39:
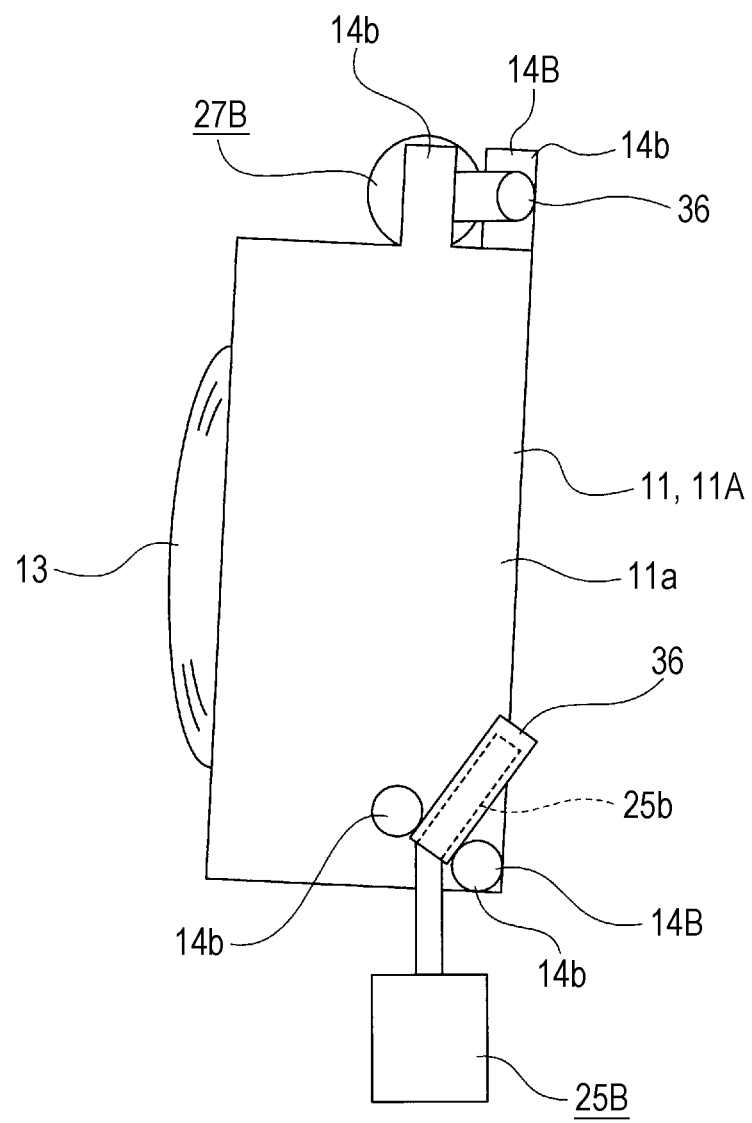
FIG. 39 is a schematic side view illustrating a condition where the lens unit is rotated.

The fourth modified example describes a first actuator 25B and a second actuator 27B as modified examples of the first actuator 25 and the second actuator 27 which rotate the lens unit 11 or 11A without using a bias spring (refer to FIGS. 38 and 39). Since the configurations and the operations of the first actuator 25B and the second actuator 27B are the same, the first actuator 25B as an example will be hereinafter described.

The first actuator 25B has a first driving shaft 25b which is bent, and a first driving portion 36 having a spherical shape is fixed onto the first driving shaft 25b (refer to FIG. 38). The axial direction of the first driving portion 36 is set as a direction which is oblique to the vertical direction.

The lens unit 11 or 11A is provided with a first driven portion 14B that protrudes laterally, and the first driven portion 14B is formed in a round shank shape, and is formed of a pair of shafts 14b and 14b to be operated. The shafts 14b and 14b are positioned to be separated in the front-back direction. The shafts 14b and 14b to be operated are positioned such that the front side shaft 14b to be operated is higher than the rear side shaft 14b to be operated.

The first driving portion 36 is inserted between the shafts 14b and 14b to be operated, and slides on the first driven portion 14B.

When the first driving shaft 25b of the first actuator 25B is moved in the vertical direction and the first driving portion 36 is moved in the vertical direction, the first driving portion 36 slides on the first driven portion 14B. Thereby, the lens unit 11 or 11A is rotated about the first fulcrum axis S1 as a fulcrum in the first direction in which the photography lens 13 faces slightly upward or downward (refer to FIG. 39).

In such a manner, when the first actuator 25B is used, the first driving portion 36 is inserted and moved between the shafts 14b and 14b to be operated, and the lens unit 11 or 11A is rotated. Hence, it is possible to smoothly rotate the lens unit 11 or 11A without using the bias spring. Accordingly, due to reduction in the number of components, it is possible to simplify the structure.

Fifth Modified Example

The fifth modified example describes a first driving portion 26C and a second driving portion 28C and a first driven portion 14C and a second driven portion 15C as modified examples of the first driving portion 26 and the second driving portion 28 and the first driven portion 14 and the second driven portion 15 (refer to FIGS. 40 to 43). Since the configurations and the operations of the first driving portion 26C and the second driving portion 28C and the first driven portion 14C and the second driven portion 15C are the same, the first driving portion 26C and the first driven portion 14C as examples will be hereinafter described.

Figure 40:
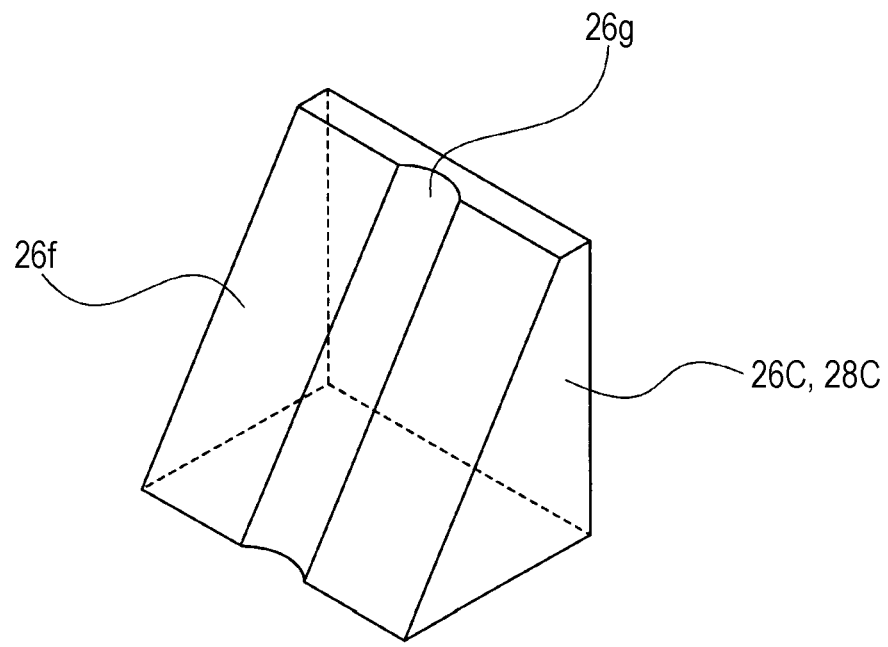
FIG. 40 is a schematic perspective view illustrating a fifth modified example together with FIGS. 41 to 43.
Figure 41:
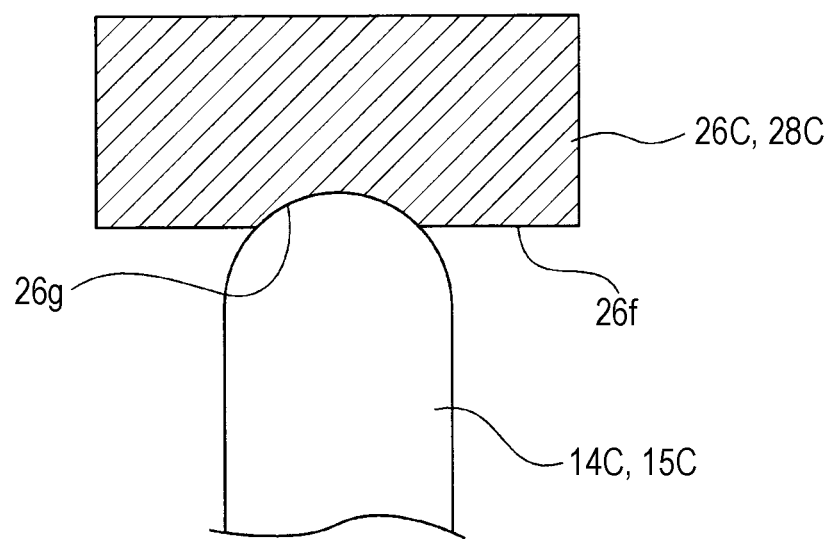
FIG. 41 is a schematic top plan view illustrating a condition where the lens unit is at a reference position before being rotated.

The first driving portion 26C has an inclined surface 26f which faces the diagonal upper front side, and a first operating surface 26g, which is formed as an arc surface and has a groove shape, is formed on the central portion of the inclined surface 26f in the horizontal direction (refer to FIG. 40).

The tip portion of the first driven portion 14C has a spherical shape, and a radius of curvature thereof is set to be equal to a radius of curvature of the first operating surface 26g. The size of the portion, which is formed in a hemispherical shape, in the first driven portion 14C is set to be larger than a depth of the first operating surface 26g.

Figure 42:
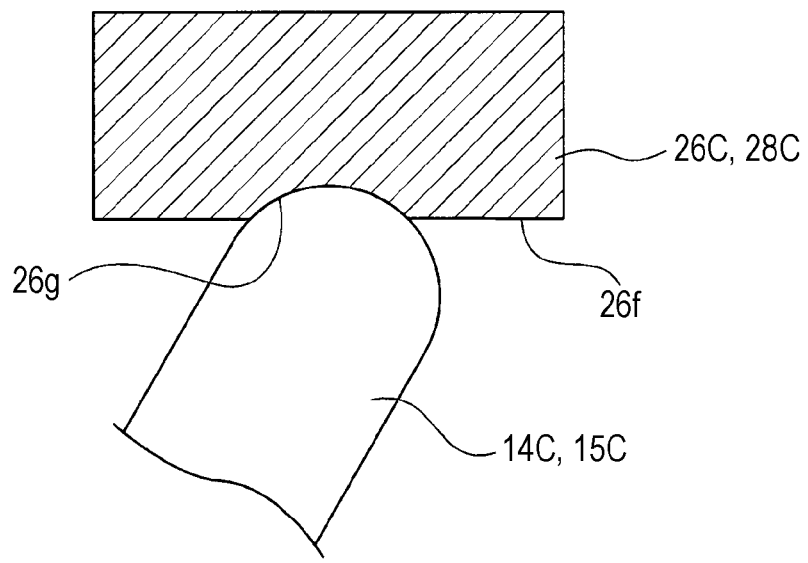
FIG. 42 is a schematic top plan view illustrating a condition where the lens unit is rotated.
Figure 43:
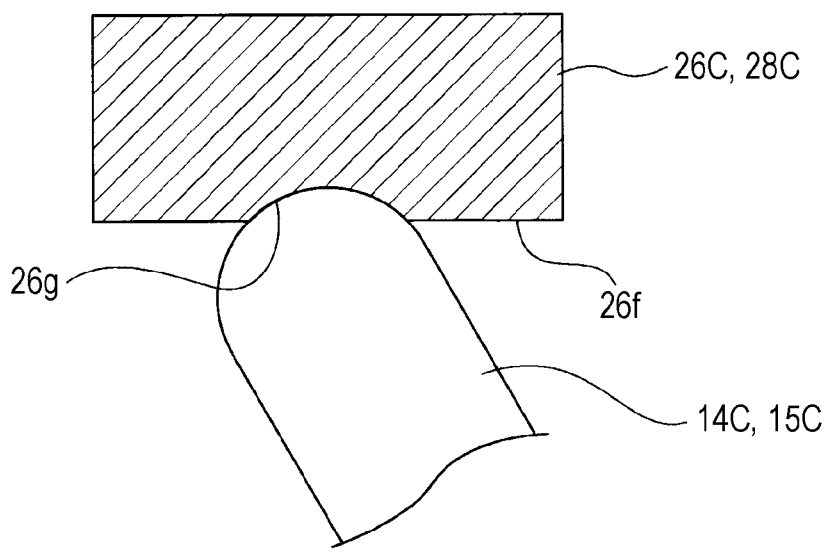
FIG. 43 is a schematic top plan view illustrating a different condition where the lens unit is rotated.

In a state where the first operating surface 26g of the first driving portion 26C comes into contact with the first driven portion 14C (refer to FIG. 41), when the lens unit 11 or 11A is rotated in the second direction and the third direction, an angle of the first driven portion 14C to the first operating surface 26g is changed (refer to FIGS. 42 and 43). In this case, the first operating surface 26g is formed in a spherical shape, and the tip portion of the first driven portion 14C is formed in a hemispherical shape which has a radius of curvature the same as the first operating surface 26g. Hence, the position on the first driven portion 14C coming into contact with the first operating surface 26g is kept at the same position.

Accordingly, when the lens unit 11 or 11A is rotated in a predetermined direction, there is no positional deviation in other directions, and it is possible to improve the accuracy in correction of the blur correction operation.

Sixth Modified Example

Figure 44:
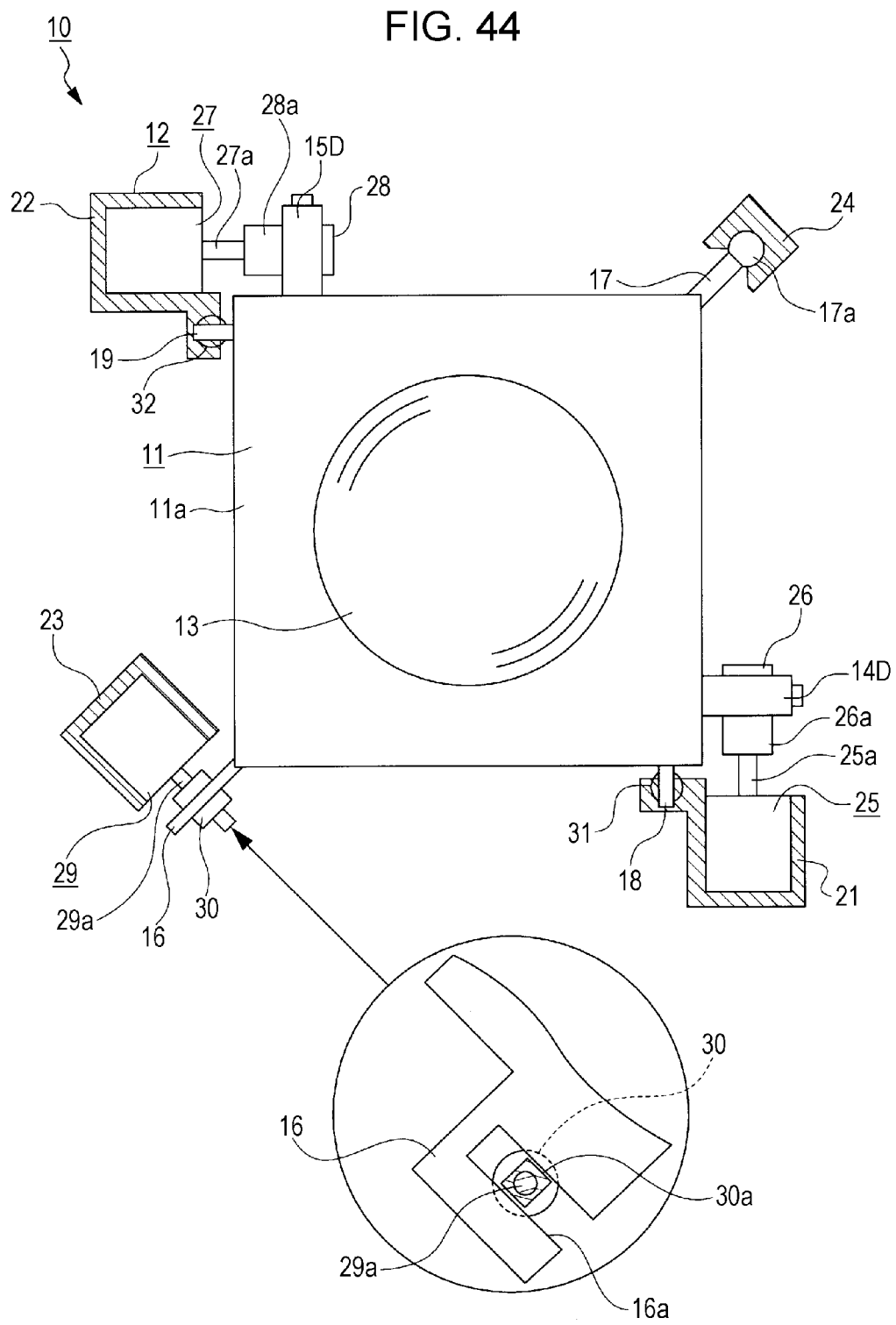
FIG. 44 is a schematic front view illustrating a sixth modified example together with FIG. 45.
Figure 45:
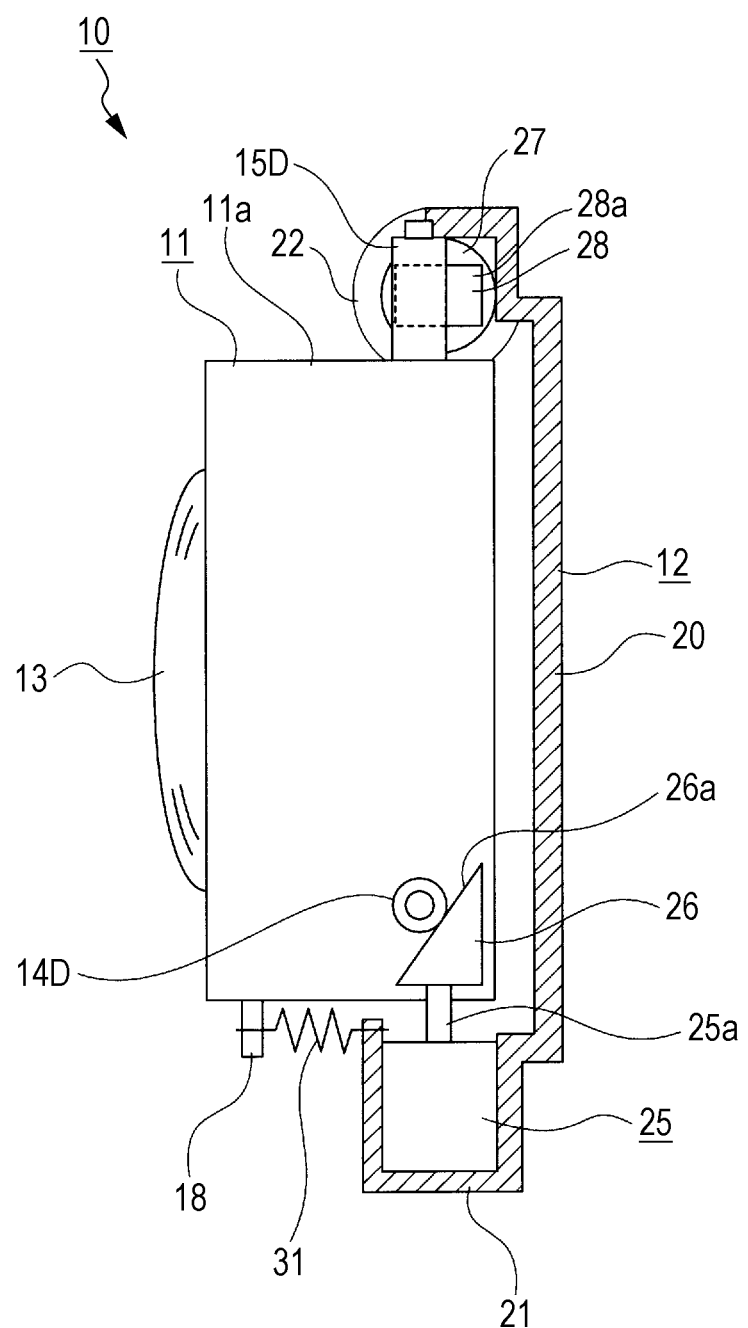
FIG. 45 is a schematic side view.

The sixth modified example describes a first driven portion 14D and a second driven portion 15D as modified examples of the first driven portion 14 and the second driven portion 15 (refer to FIGS. 44 and 45). Since the configurations and the operations of the first driven portion 14D and the second driven portion 15D are the same, the first driven portion 14D as an example will be hereinafter described.

The first driven portion 14D is formed in a cylindrical shape so as to be rotatable in the axial rotation direction, and functions as a rotatable roller. The outer peripheral surface of the first driven portion 14D is in contact with the first driving portion 26. Thus, the first driven portion 14D is rotated when the first driving portion 26 is moved.

Accordingly, when the first driven portion 14D is used, the load caused by the contact of the first driving portion 26 with the first driven portion 14D at the time of rotation of the lens unit 11 or 11A is small, and it is possible to secure a smooth rotation operation of the lens unit 11 or 11A.

In addition, the first driven portion 14D and the second driven portion 15D can be used not only in the case of respectively using the first driving portion 26 and the second driving portion 28, but also in the case of using the first driving portions 26A, 28A, 26B, 28B, and 36 according to the first modified example, the second modified example, and the fourth modified example.

Another Example

In the above described examples, the first actuator 25 and the second actuator 27 are movable-shaft-type actuators in which the first driving shaft 25a and the second driving shaft 27a are movable in the shaft direction. However, as described later, the first actuator 25 and the second actuator 27 (including the first actuators 25A, 25B, and the like) may be rotatable-shaft-type actuators in which the first driving shaft 25a and the second driving shaft 27a are rotated in the shaft rotation direction (refer to FIGS. 46 and 47).

In the case where the first actuator 25 and the second actuator 27 are the rotatable-shaft-type actuators, the configurations and the operations of both of them are the same, and thus an exemplary case of the first actuator 25 will be hereinafter described.

When the first actuator 25 is used as the rotatable-shaft-type actuator, thread grooves are formed in the driving shaft 25a, and thus the first driving portion 26 is threadedly engaged with the driving shaft 25a. For example, the first driving portion 26 comes into surface contact with a rotation regulation portion 37 which is provided in the fixing member 12, whereby the rotation is regulated.

Accordingly, when the driving shaft 25a of the first actuator 25 is rotated, the first driving portion 26, of which rotation is regulated by the rotation regulation portion 37, is pushed in a direction according to the rotation direction of the driving shaft 25a, and is moved upward or downward. When the first driving portion 26 is moved, the position of contact between the first driving portion 26 and the first driven portion 14 is changed, and the lens unit 11 is rotated.

Further, in the third actuator 29, the outer shape of the sliding engagement portion 30a of the driving portion 30 is formed in a rectangular shape so as not to rotate relative to the third driven portion 16. Thereby, as the third actuator 29, the rotatable-shaft-type actuator can also be used.

Others

In the above described example, by using the image blur correction device 10 according to the first embodiment and the image blur correction device 10A according to the second embodiment, the lens unit 11 or 11A is rotatable in three directions of the first, second, and third directions.

However, in the image blur correction device according to the first embodiment and the image blur correction device according to the second embodiment, the lens unit may be configured to be rotatable in any two directions of the first, second, and third directions.

Configuration (Third Embodiment) of Image Blur Correction Device

Hereinafter, a configuration of an image blur correction device 40 according to a third embodiment will be described (refer to FIGS. 48 to 51). The image blur correction device 40 is, for example, provided in an imaging apparatus 4.

The image blur correction device 40 has a lens unit 41 and a fixing member 42 that supports the lens unit 41.

The lens unit 41 has, for example, a substantially cylindrical shape that extends in the optical axis direction. The lens unit 41 has a barrel portion 41a and a lens group or a plurality of lenses arranged on the barrel portion 41a in the optical axis direction. A photography lens 43, which is referred to as a front lens, is disposed on the frontmost side (object side) of the lenses or the lens group.

A sliding portion 44 is provided on an outer peripheral surface of an intermediate part of the lens unit 41 in the optical axis direction. The sliding portion 44 has a spherical shape of which a diameter is set to be larger than the diameters of the other outer peripheral surfaces. The sliding portion 44 is formed in a spherical shape centered on a reference point M which is one point inside the lens unit 41. The reference point M is, for example, positioned on the optical axis, and set as the rotation fulcrum of the lens unit 41.

A first driven portion 45 and a second driven portion 46 are provided at the back end portion of the lens unit 41.

The first driven portion 45 is provided at the upper end portion of the lens unit 41, and is formed in a shape which extends in the horizontal direction. The upper back end portion of the first driven portion 45 is provided as a corner portion 45a, and the outer surface of the corner portion 45a is formed to be rounded.

The second driven portion 46 is provided at the left end portion of the lens unit 41, and is formed in a shape which extends in the vertical direction. The left back end portion of the second driven portion 46 is provided as a corner portion 46a, and the outer surface of the corner portion 46a is formed to be rounded.

A spring-support protrusion portion 47, which protrudes backward, is provided at the central portion on the back side of the lens unit 41.

Spherical objects 48, 48, . . . are rotatably disposed on the sliding portion 44 to be separated in the front-back direction. For example, groups of two spherical objects 48 and 48, which are disposed to be separated in the front-back direction, are provided to be separated in the circumferential direction.

The fixing member 42 has a supporting portion 49 that has a substantially cylindrical shape, and an actuator attaching portion 50 that is provided on the back side of the supporting portion 49.

An annular portion 51, which has a substantially annular shape, is provided at the front end portion of the supporting portion 49, and an inner peripheral surface of the annular portion 51 is formed as a supporting surface 51a that has a spherical shape centered on the reference point M.

The actuator attaching portion 50 is formed in a box shape which is open toward the front side, and has a first holding portion 50a that is provided at the upper end portion and a second holding portion 50b that is provided at the left end portion.

In the lens unit 41, the sliding portion 44 is rotatably supported on the annular portion 51 of the fixing member 42 with the spherical objects 48, 48, . . . interposed therebetween. In the state where the lens unit 41 is supported on the fixing member 42, the supporting surface 51a of the annular portion 51 is in contact with the spherical objects 48, 48, . . . , and the lens unit 41 is rotated with the spherical objects 48, 48, . . . interposed.

In addition, a dropout prevention portion, which is not shown in the drawing, is provided on the lens unit 41 or the fixing member 42. The dropout prevention portion prevents the spherical objects 48, 48, . . . , which are interposed between the supporting surface 51a and the sliding portion 44, from dropping out.

The first holding portion 50a of the actuator attaching portion 50 in the fixing member 42 holds a first actuator 52. The first actuator 52 has a first driving shaft 52a that is movable in the front-back direction, and a first driving portion 53 is fixed onto the first driving shaft 52a. Accordingly, the first driving portion 53 is moved in the front-back direction by movement of the first driving shaft 52a.

A first operating surface 53a, which faces the diagonal lower front side, is formed on the first driving portion 53. The first operating surface 53a of the first driving portion 53 is slidable on the corner portion 45a of the first driven portion 45.

The second holding portion 50b of the actuator attaching portion 50 in the fixing member 42 holds a second actuator 54. The second actuator 54 has a second driving shaft 54a that is movable in the front-back direction, and a second driving portion 55 is fixed onto the second driving shaft 54a. Accordingly, the second driving portion 55 is moved in the front-back direction by movement of the second driving shaft 54a.

A second operating surface 55a, which faces the diagonal right front side, is formed on the second driving portion 55. The second operating surface 55a of the second driving portion 55 is slidable on the second driven portion 46.

A first bias spring 56 is supported between the first holding portion 50a of the fixing member 42 and the spring-support protrusion portion 47 of the lens unit 41. Accordingly, the lens unit 41 is urged by the first bias spring 56 in a direction in which the back end portion moves substantially upward, and thus the first driven portion 45 is pressed against the first operating surface 53a of the first driving portion 53.

A second bias spring 57 is supported between the second holding portion 50b of the fixing member 42 and the spring-support protrusion portion 47 of the lens unit 41. Accordingly, the lens unit 41 is urged by the second bias spring 57 in a direction in which the back end portion moves substantially leftward, and thus the second driven portion 46 is pressed against the second operating surface 55a of the second driving portion 55.

The lens unit 41 is configured to be rotatable in a first direction (pitching direction) about the first fulcrum axis S1 as a fulcrum, relative to the fixing member 42. The first fulcrum axis S1 is orthogonal to the optical axis P, passes through the reference point M, and extends in the horizontal direction. The lens unit 41 is configured to be rotatable in a second direction (yawing direction) about the second fulcrum axis S2 as a fulcrum. The second fulcrum axis S2 is orthogonal to both of the optical axis P and the first fulcrum axis S1, passes through the reference point M, and extends in the vertical direction.

The first fulcrum axis S1 and the second fulcrum axis S2 are orthogonal to each other. For example, the first fulcrum axis S1 and the second fulcrum axis S2 are positioned on the same plane orthogonal to the optical axis P.

The intersection point of the first fulcrum axis S1, the second fulcrum axis S2, and the optical axis P is set as the reference point M, and the reference point M is set as a rotation fulcrum of the lens unit 41.

Operation (Third Embodiment) of Image Blur Correction Device

Hereinafter, a blur correction operation in the image blur correction device 40 will be described (refer to FIGS. 48 to 55).

Figure 49:
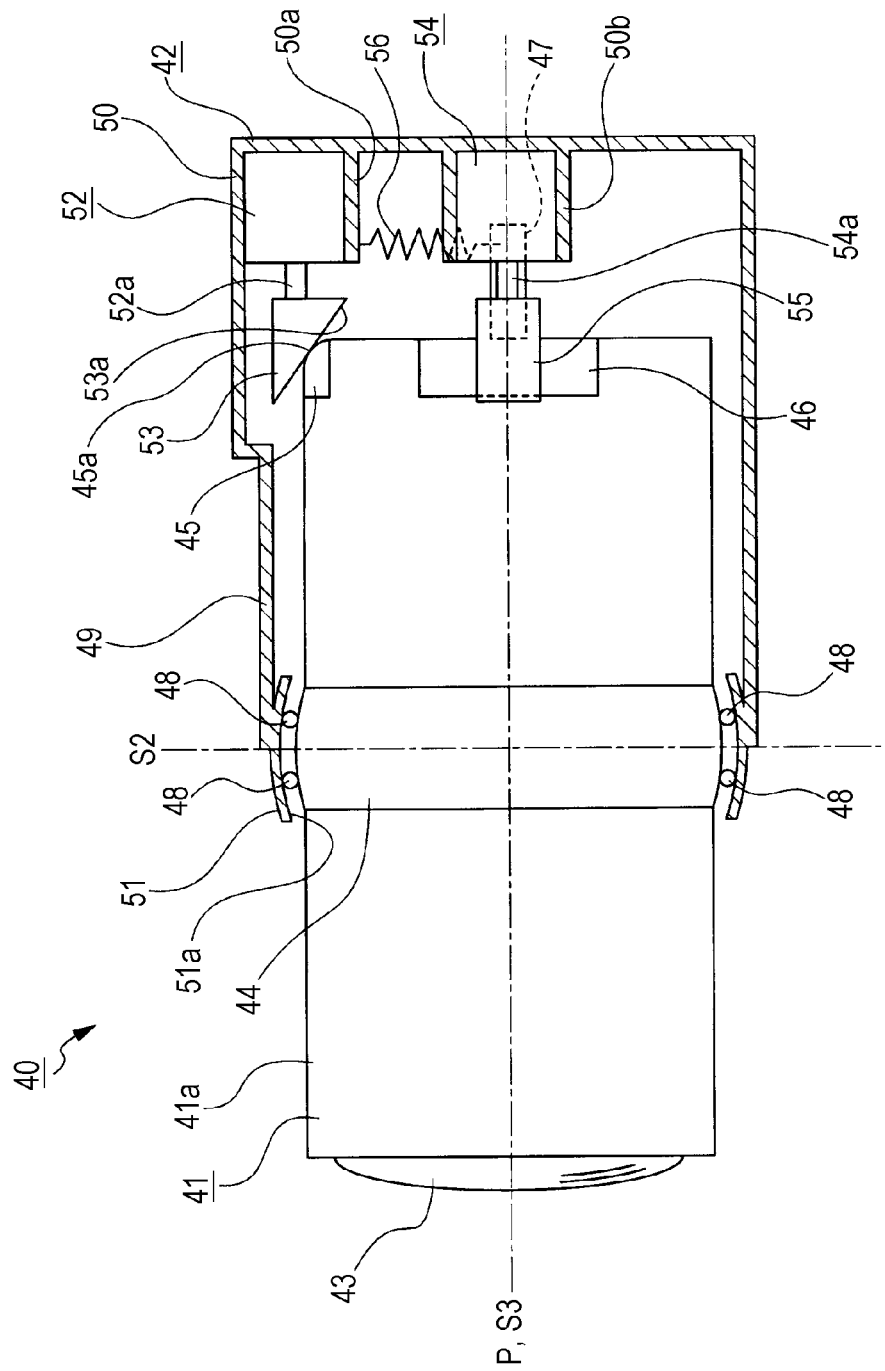
FIG. 49 is a schematic side view of the image blur correction device.
Figure 50:
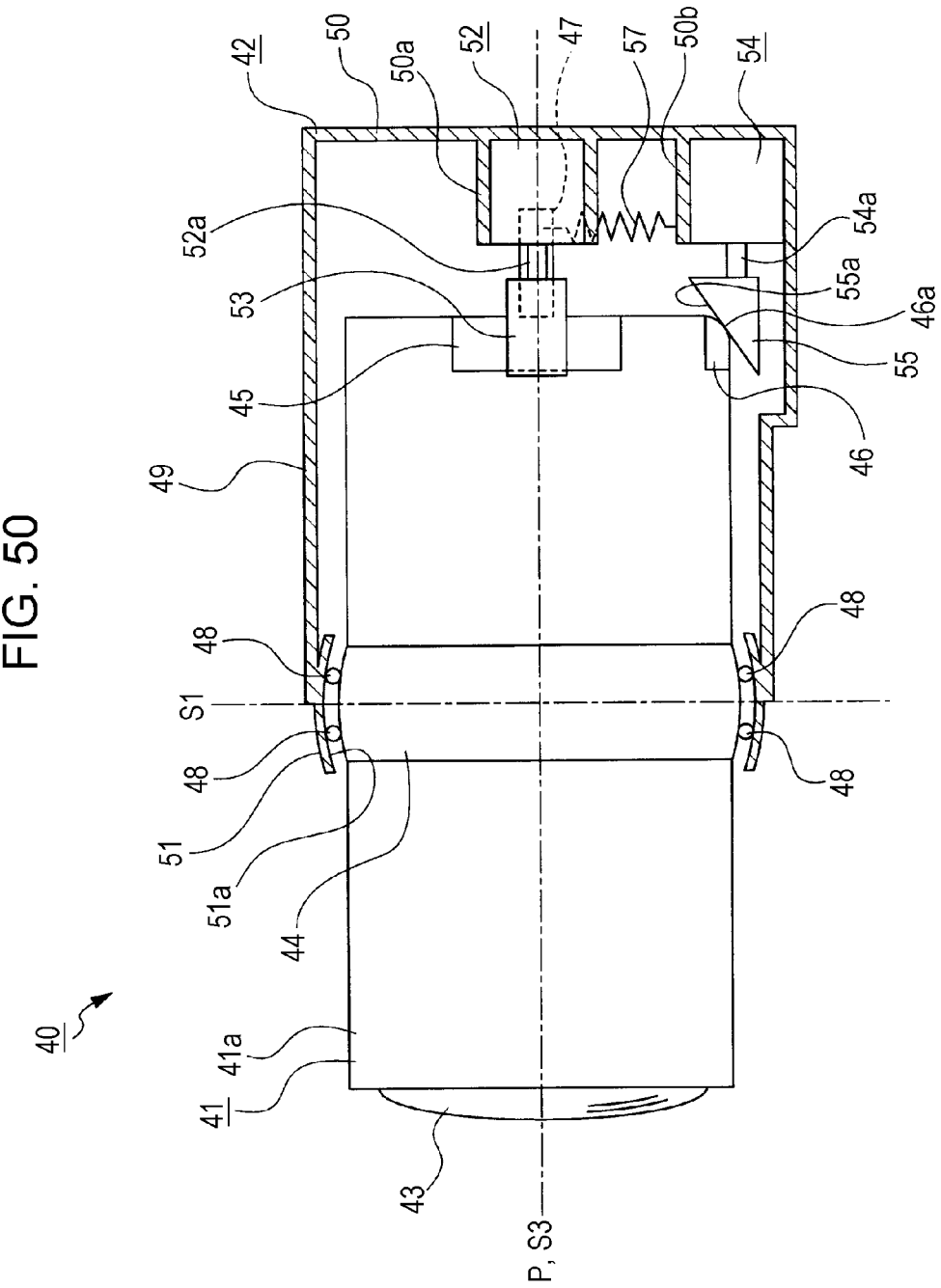
FIG. 50 is a schematic top plan view of the image blur correction device.
Figure 51:
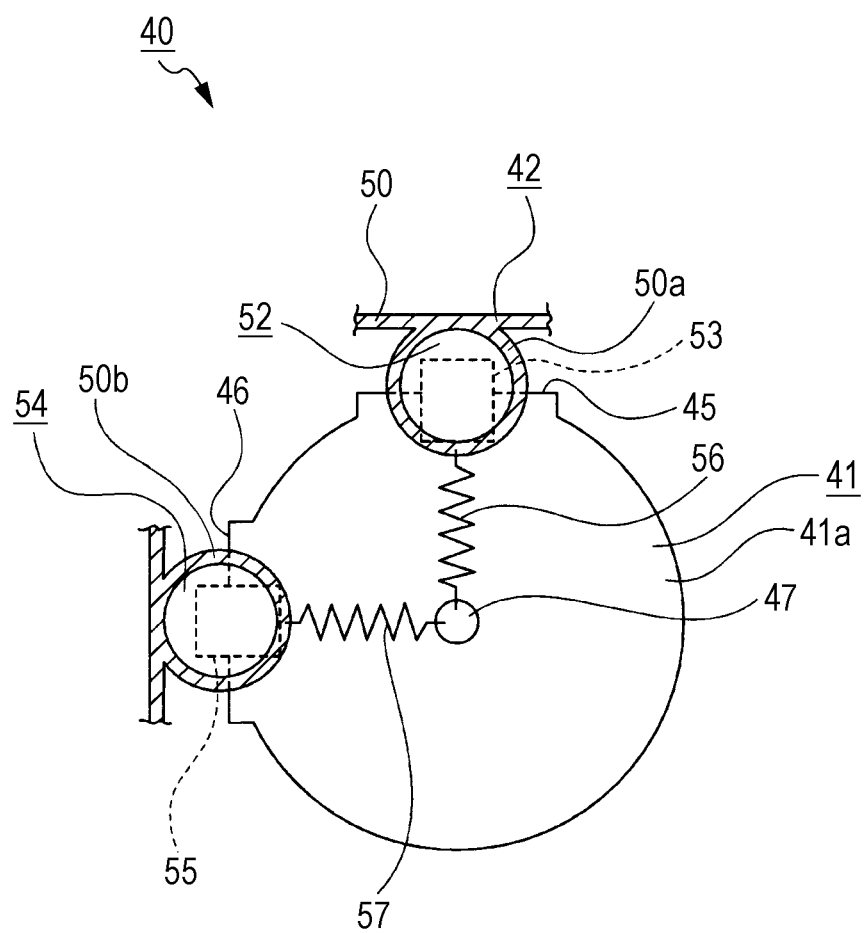
FIG. 51 is a schematic rear view of the image blur correction device.

In a state where the blur correction operation is not performed, the image blur correction device 40 is at a reference position at which the device is not rotated in any one direction of the first direction and the second direction (refer to FIGS. 49 and 50).

Figure 52:
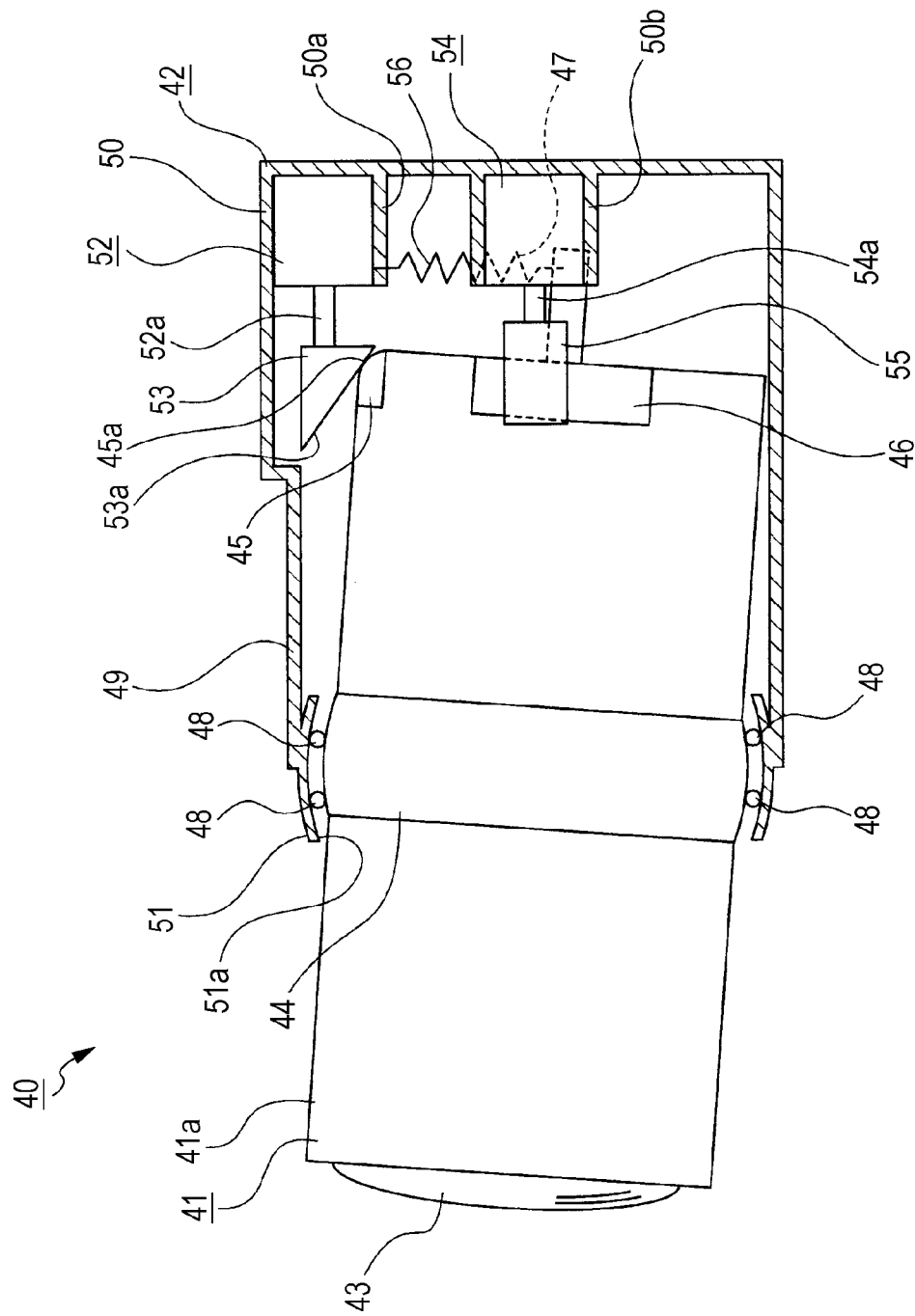
FIG. 52 is a schematic side view illustrating an operation of the image blur correction device in a condition where the lens unit is rotated toward one side in the first direction together with FIGS. 53 to 55.
Figure 53:
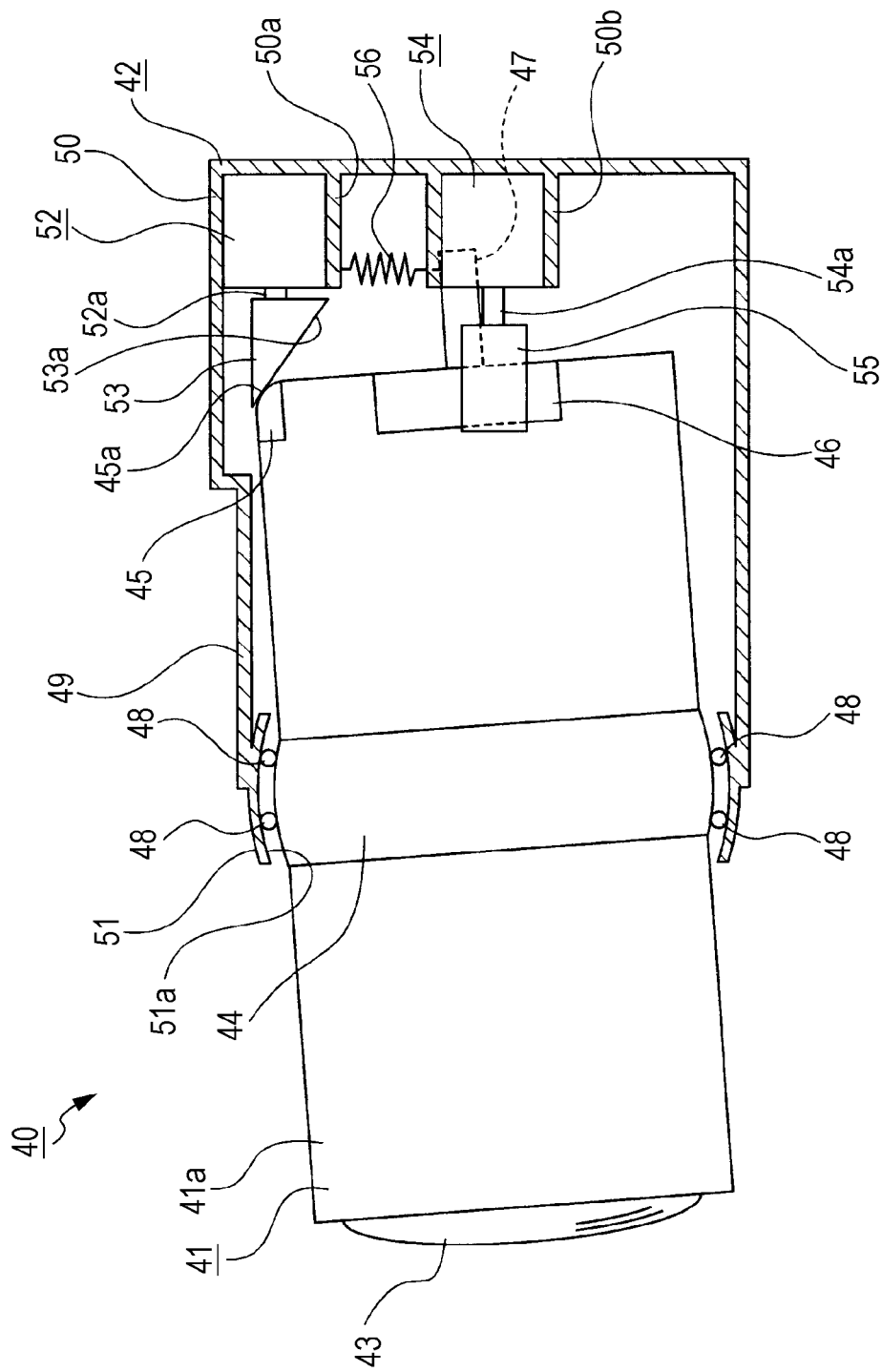
FIG. 53 is a schematic side view illustrating a condition where the lens unit is rotated toward the other side in the first direction.

First, a blur correction operation in the first direction (pitching direction) in the image blur correction device 40 will be described (refer to FIGS. 52 and 53).

In the image blur correction device 40, when the first driving shaft 52a of the first actuator 52 is moved frontward and thereby the first driving portion 53 is moved frontward, the first operating surface 53a slides on the first driven portion 45. Thereby, the lens unit 41 is rotated about the first fulcrum axis S1 as a fulcrum in the first direction in which the photography lens 13 faces slightly upward against elastic force of the first bias spring 56 (refer to FIG. 52).

At this time, the second driven portion 46 comes into contact with the second driving portion 55 of the second actuator 54. However, in accordance with the rotation of the lens unit 41 in the first direction, a condition of contact between the second driving portion 55 and the second driven portion 46 is slightly changed.

When the lens unit 41 is rotated in the first direction in such a manner, in accordance with the rotation of the lens unit 41, the condition of contact between the second driving portion 55 and the second driven portion 46 is changed. Hence, it is difficult for unnecessary load to be applied to the lens unit 41 from the second driving portion 55. Accordingly, the lens unit 41 is smoothly rotated in the first direction.

On the other hand, in the image blur correction device 40, when the first driving shaft 52a of the first actuator 52 is moved backward and thereby the first driving portion 53 is moved backward, the first operating surface 53a slides on the first driven portion 45. Thereby, the lens unit 41 is rotated about the first fulcrum axis S1 as a fulcrum in the first direction in which the photography lens 13 faces slightly downward due to elastic force of the first bias spring 56 (refer to FIG. 53).

At this time, the second driven portion 46 comes into contact with the second driving portion 55 of the second actuator 54. However, in accordance with the rotation of the lens unit 41 in the first direction, a condition of contact between the second driving portion 55 and the second driven portion 46 is slightly changed.

When the lens unit 41 is rotated in the first direction in such a manner, in accordance with the rotation of the lens unit 41, the condition of contact between the second driving portion 55 and the second driven portion 46 is changed. Hence, it is difficult for unnecessary load to be applied to the lens unit 41 from the second driving portion 55. Accordingly, the lens unit 41 is smoothly rotated in the first direction.

Figure 54:
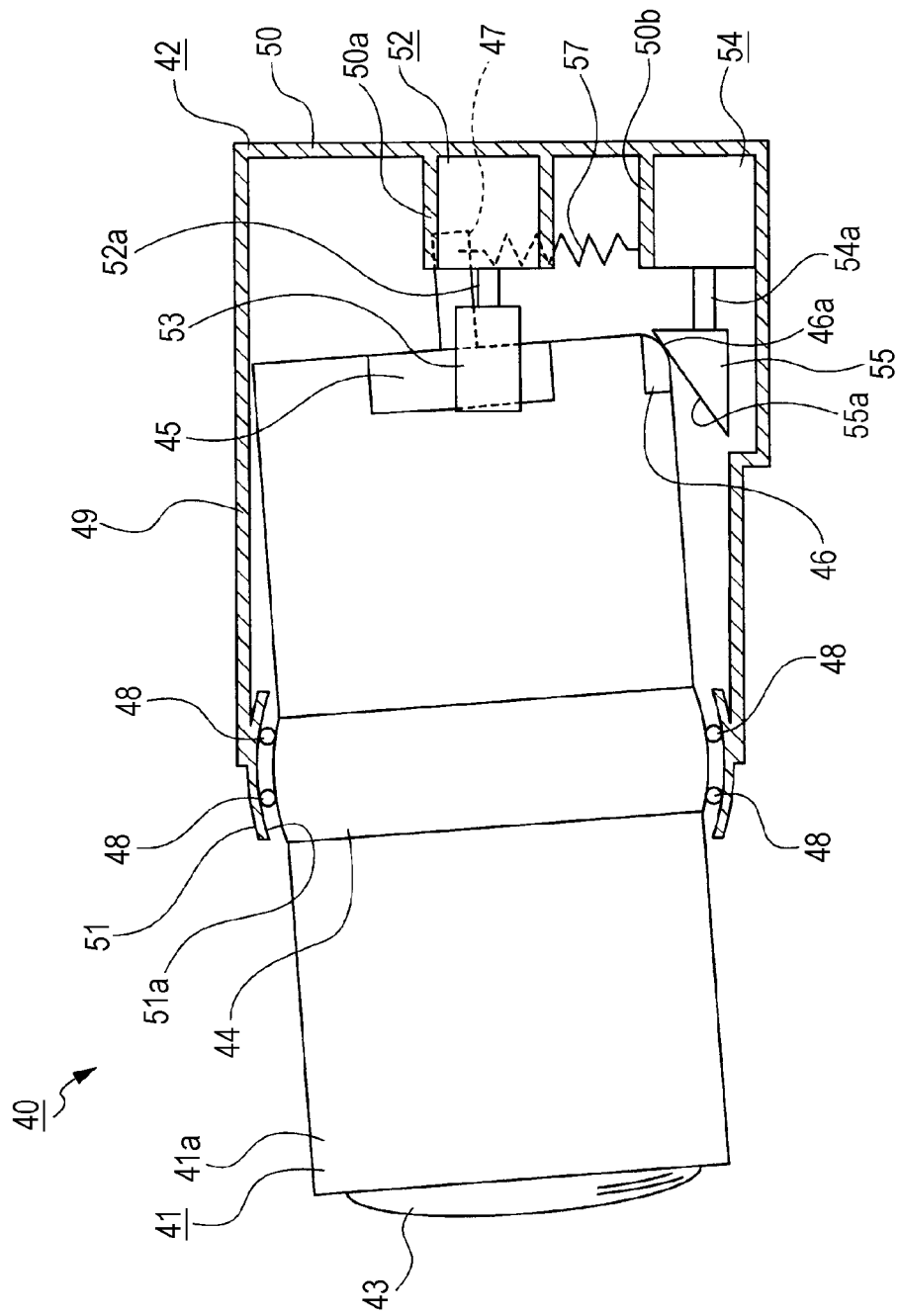
FIG. 54 is a schematic top plan view illustrating a condition where the lens unit is rotated toward one side in the second direction.
Figure 55:
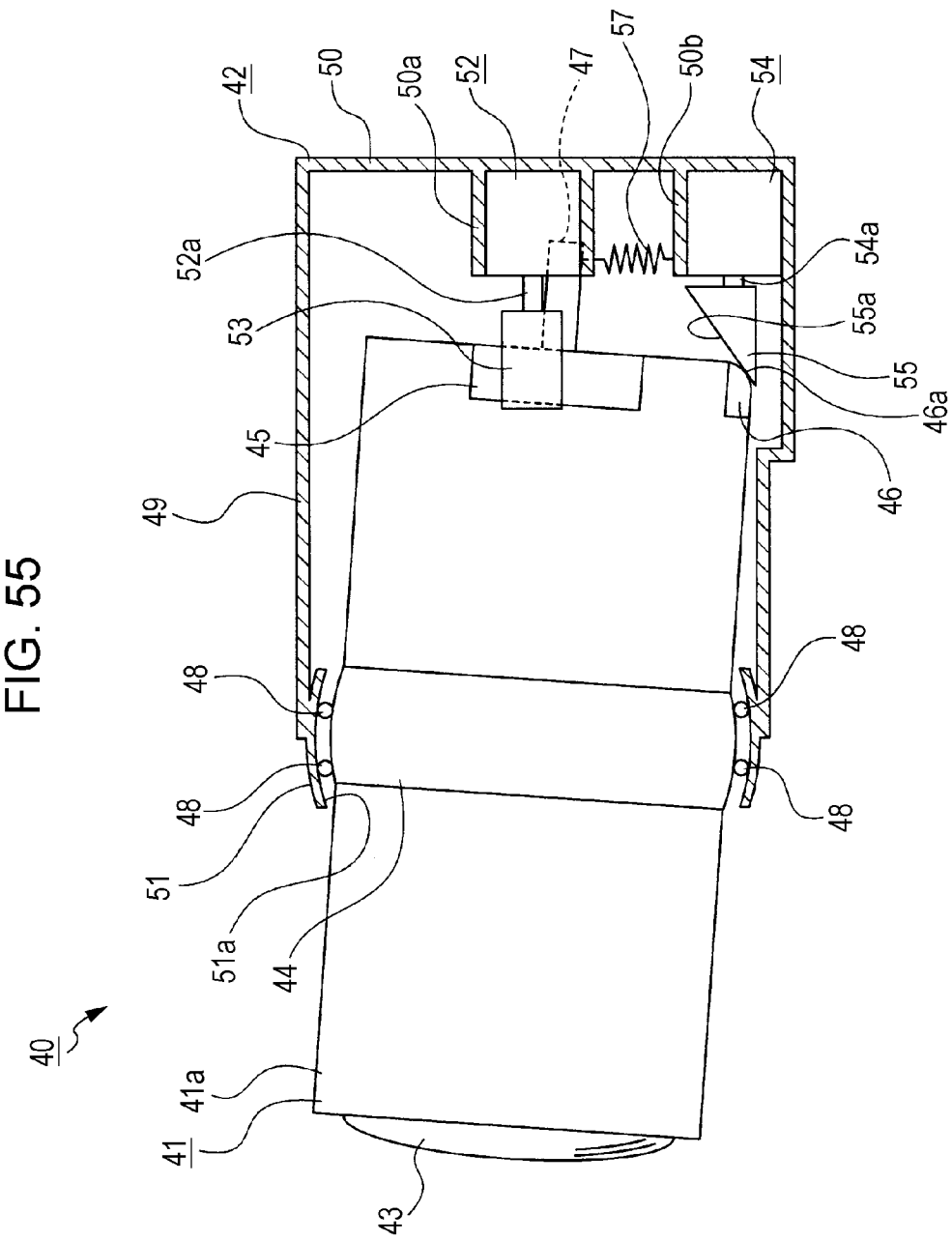
FIG. 55 is a schematic top plan view illustrating a condition where the lens unit is rotated toward the other side in the second direction.

Next, a blur correction operation in the second direction (yawing direction) in the image blur correction device 40 will be described (refer to FIGS. 54 and 55).

In the image blur correction device 40, when the second driving shaft 54a of the second actuator 54 is moved frontward and thereby the second driving portion 55 is moved frontward, the second operating surface 55a slides on the second driven portion 46. Thereby, the lens unit 41 is rotated about the second fulcrum axis S2 as a fulcrum in the second direction in which the photography lens 13 faces slightly leftward against elastic force of the second bias spring 57 (refer to FIG. 54).

At this time, the first driven portion 45 comes into contact with the first driving portion 53 of the first actuator 52. However, in accordance with the rotation of the lens unit 41 in the second direction, a condition of contact between the first driving portion 53 and the first driven portion 45 is slightly changed.

When the lens unit 41 is rotated in the second direction in such a manner, in accordance with the rotation of the lens unit 41, the condition of contact between the first driving portion 53 and the first driven portion 45 is changed. Hence, it is difficult for unnecessary load to be applied to the lens unit 41 from the first driving portion 53. Accordingly, the lens unit 41 is smoothly rotated in the second direction.

On the other hand, in the image blur correction device 40, when the second driving shaft 54a of the second actuator 54 is moved backward and thereby the second driving portion 55 is moved backward, the second operating surface 55a slides on the second driven portion 46. Thereby, the lens unit 41 is rotated about the second fulcrum axis S2 as a fulcrum in the second direction in which the photography lens 13 faces slightly rightward due to elastic force of the second bias spring 57 (refer to FIG. 55).

At this time, the first driven portion 45 comes into contact with the first driving portion 53 of the first actuator 52. However, in accordance with the rotation of the lens unit 41 in the second direction, the condition of contact between the first driving portion 53 and the first driven portion 45 is slightly changed.

When the lens unit 41 is rotated in the second direction in such a manner, in accordance with the rotation of the lens unit 41, the condition of contact between the first driving portion 53 and the first driven portion 45 is changed. Hence, it is difficult for unnecessary load to be applied to the lens unit 41 from the first driving portion 53. Accordingly, the lens unit 41 is smoothly rotated in the second direction.

In addition, in the image blur correction device 40, although not shown in the drawing, the lens unit 41 is configured to be rotatable in the second direction in a state where the lens unit 41 is rotated in the first direction from the reference position, and the lens unit 41 is configured to be rotatable in the first direction in a state where the lens unit 41 is rotated in the second direction from the reference position.

As described above, in the image blur correction device 40, the two gimbal mechanisms arranged in the optical axis direction are not configured such that the lens unit is rotated. Hence, it is possible to simplify the structure and achieve reduction in the size of the device.

Further, the first fulcrum axis S1 and the second fulcrum axis S2 are positioned to be coplanar. Hence, the lens unit 41 is rotated in the first and second directions respectively about the first fulcrum axis S1 and the second fulcrum axis S2, which are positioned to be coplanar, as fulcrums. As a result, it is possible to further achieve reduction in the size.

Furthermore, the first driven portion 45 and the second driven portion 46 are provided at one end portion of the lens unit 41 in the optical axis direction. The rotation fulcrum (reference point M) of the lens unit 41 relative to the fixing member 42 is positioned to be separated from the first driven portion 45 and the second driven portion 46 in the optical axis direction.

Accordingly, it is possible to rotate the lens unit 41 through small thrust forces of the first driving portion 53 and the second driving portion 55. As a result, it is possible to achieve reduction in the sizes of the first actuator 52 and the second actuator 54.

Moreover, the corner portion 45a and the corner portion 46a, of which outer surfaces are formed to be rounded, are respectively provided on the first driven portion 45 and the second driven portion 46. The first operating surface 53a of the first driving portion 53 and the second operating surface 55a of the second driving portion 55 are respectively slidable on the corner portion 45a and the corner portion 46a.

Accordingly, a sliding load of the first driving portion 53 to the first driven portion 45 and a sliding load of the second driving portion 55 to the second driven portion 46 are reduced. As a result, it is possible to secure a smooth rotation operation of the lens unit 41.

Further, the first operating surface 53a and the second operating surface 55a are formed to be coplanar. Hence, it is easy to form the first driving portion 53 and the second driving portion 55, and it is possible to form the image blur correction device 40 without an increase in manufacturing costs.

In addition, there are provided the first bias spring 56 and the second bias spring 57 that urge the lens unit 41 in a direction in which the first driven portion 45 and the second driven portion 46 are respectively pressed against the first operating surface 53a and the second operating surface 55a.

Accordingly, it is possible to secure the conditions of the contact between the first driven portion 45 and the first operating surface 53a and the contact between the second driven portion 46 and the second operating surface 55a, and thus it is possible to secure smooth and precise rotation operations of the lens unit 41.

Modified Examples of Image Blur Correction Device (Third Embodiment)

Next, modified examples (seventh and eighth modified examples) of the respective sections according to the third embodiment will be described (refer to FIGS. 56 to 60).

Seventh Modified Example

Figure 56:
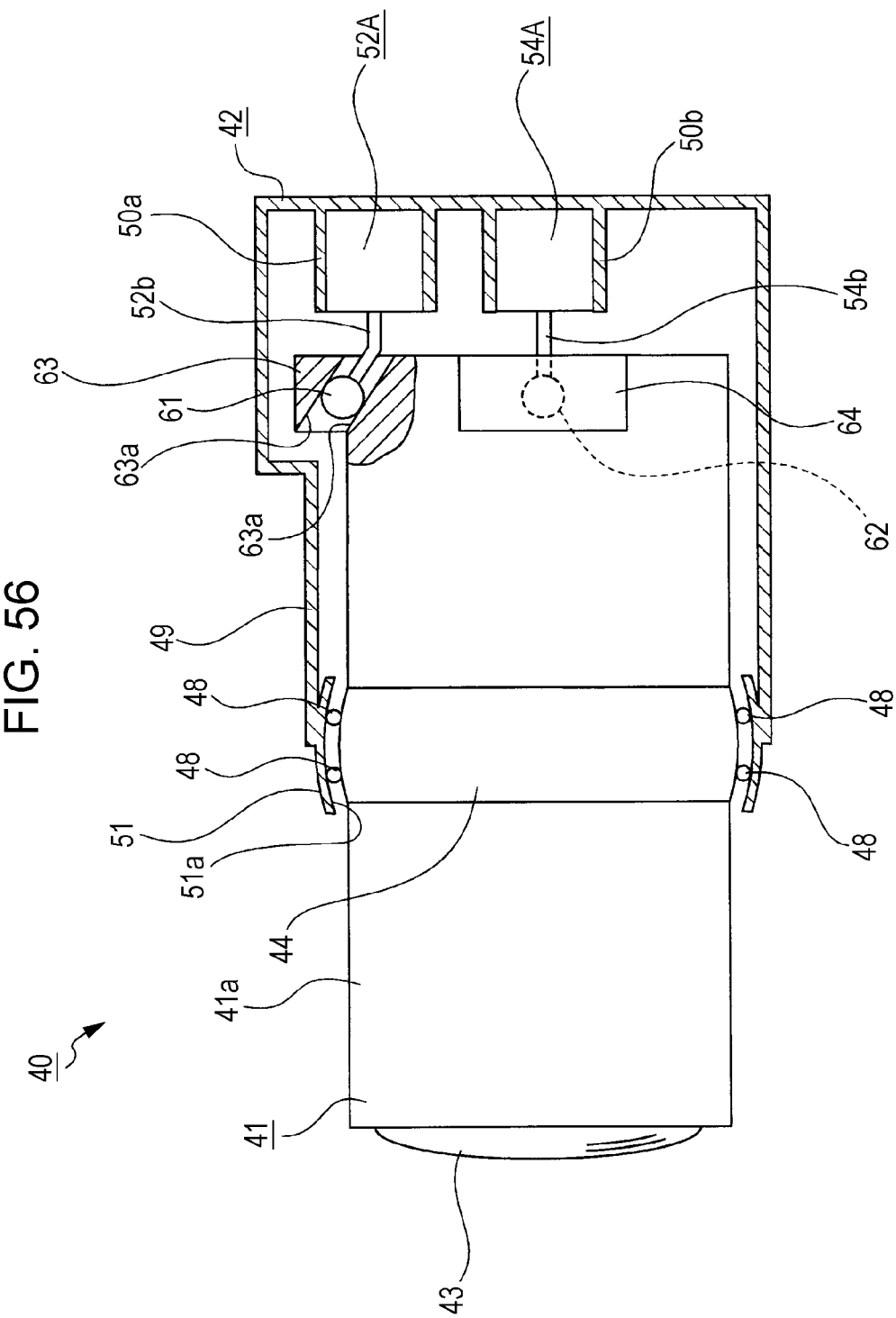
FIG. 56 is a schematic side view illustrating a seventh modified example together with FIGS. 57 and 58.
Figure 57:
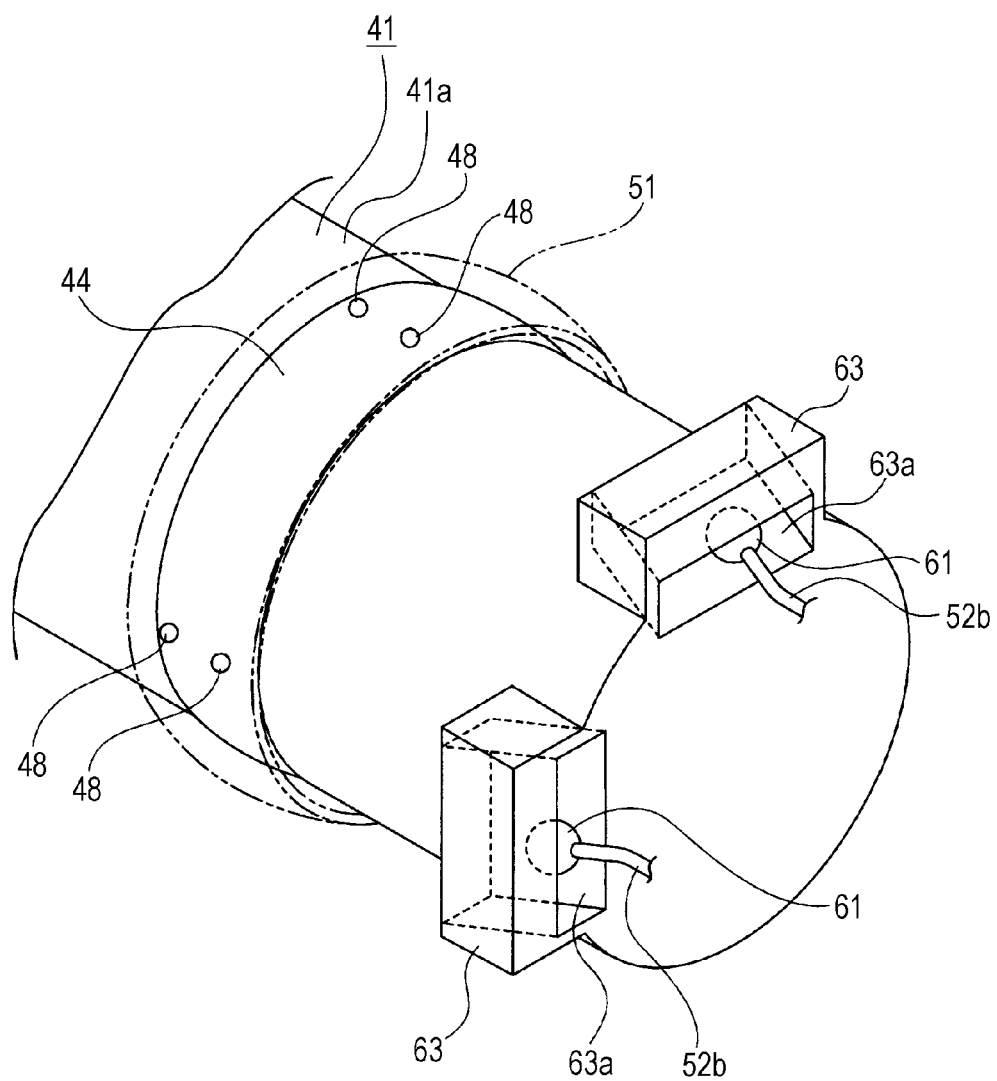
FIG. 57 is a schematic perspective view.
Figure 58:
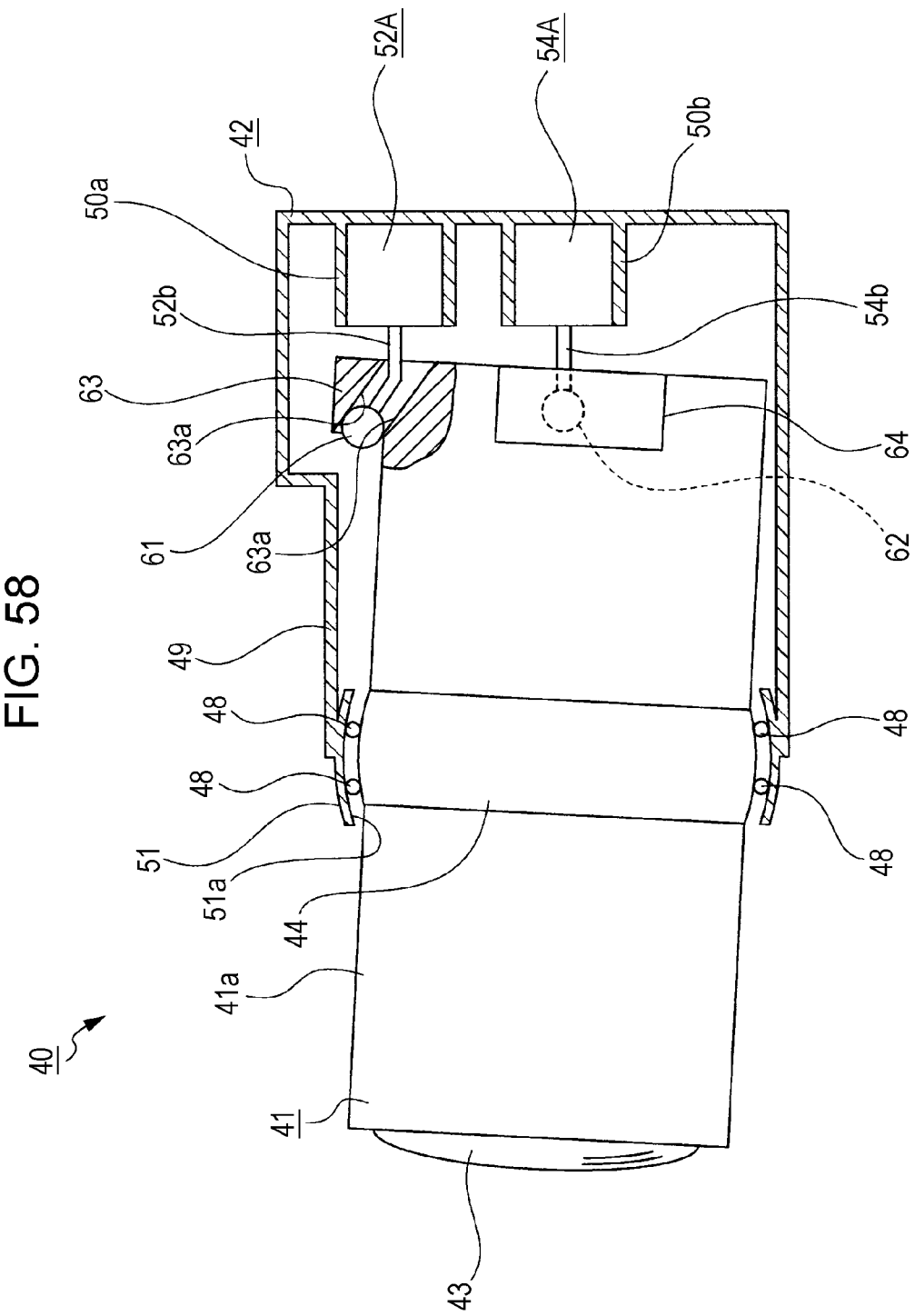
FIG. 58 is a schematic side view illustrating a condition where the lens unit is rotated.

The seventh modified example describes a first actuator 52A and a second actuator 54A as modified examples of the first actuator 52 and the second actuator 54 which rotate the lens unit 41 without using a bias spring (refer to FIGS. 56 and 57).

The first actuator 52A has a first driving shaft 52b which is bent, and a first driving portion 61 having a spherical shape is fixed onto the first driving shaft 52b.

The second actuator 54A has a second driving shaft 54b which is bent, and a second driving portion 62 having a spherical shape is fixed onto the second driving shaft 54b.

A first driven portion 63 is provided at the upper end portion of the lens unit 41, and the first driven portion 63 has a pair of surfaces 63a and 63a to be operated. The surfaces 63a and 63a are positioned to be inclined in the front-back direction and to face each other. The first driven portion 63 is formed in a horizontally long shape.

A second driven portion 64 is provided at the left end portion of the lens unit 41, and the second driven portion 64 has a pair of surfaces 64a and 64a to be operated. The surfaces 64a and 64a are positioned to be inclined in the front-back direction and to face each other. The second driven portion 64 is formed in a vertically long shape.

The first driving portion 61 is inserted between the surfaces 63a and 63a to be operated, and slides on the surfaces 63a and 63a to be operated. The second driving portion 62 is inserted between the surfaces 64a and 64a to be operated, and slides on the surfaces 64a and 64a to be operated.

When the first driving shaft 52b of the first actuator 52A is moved in the front-back direction and the first driving portion 61 is moved in the front-back direction, the first driving portion 61 slides on the first driven portion 63. Thereby, the lens unit 41 is rotated about the first fulcrum axis S1 as a fulcrum in the first direction in which the photography lens 13 faces slightly upward or downward (refer to FIG. 58). At this time, the second driving portion 62 of the second actuator 54A is slightly moved in the vertical direction between the surfaces 64a and 64a to be operated.

On the other hand, when the second driving shaft 54b of the second actuator 54A is moved in the front-back direction and the second driving portion 62 is moved in the front-back direction, the second driving portion 62 slides on the second driven portion 64. Thereby, the lens unit 41 is rotated about the second fulcrum axis S2 as a fulcrum in the second direction in which the photography lens 13 faces slightly rightward or leftward. At this time, the first driving portion 61 of the first actuator 52A is slightly moved in the horizontal direction between the surfaces 63a and 63a to be operated.

In such a manner, when the first actuator 52A and the second actuator 54A are used, the first driving portion 61 and the second driving portion 62 are inserted and moved between the surfaces 63a and 63a to be operated or the surfaces 64a and 64a to be operated, and the lens unit 41 is rotated. Hence, it is possible to smoothly rotate the lens unit 41 without using the bias spring. Accordingly, due to reduction in the number of components, it is possible to simplify the structure.

Further, since the first driving portion 61 and the second driving portion 62 are formed in spherical shapes, even when the lens unit 41 is rotated and inclined in the vertical direction or the horizontal direction, the distance between the surfaces 63a and 63a to be operated relative to the first driving portion 61 and the distance between the surfaces 64a and 64a to be operated relative to the second driving portion 62 are not changed, and it is possible to smoothly rotate the lens unit 41.

It should be noted that, instead of the first driving portion 61 and the second driving portion 62, it may be possible to use the cylindrical driving portions of the first actuator 25B and the second actuator 27B used in the fourth modified example.

Eighth Modified Example

Figure 59:
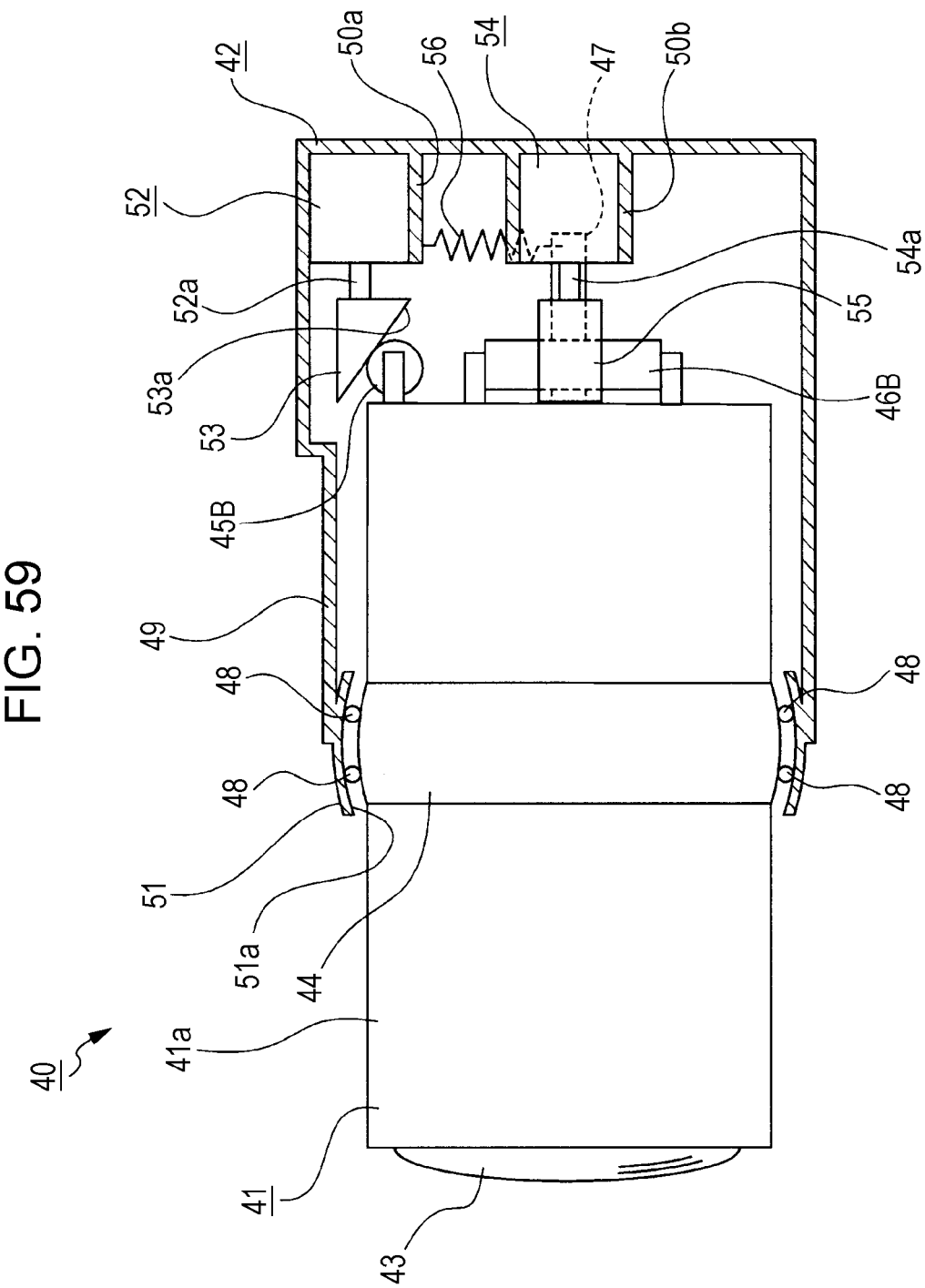
FIG. 59 is a schematic side view illustrating an eighth modified example together with FIG. 60.
Figure 60:
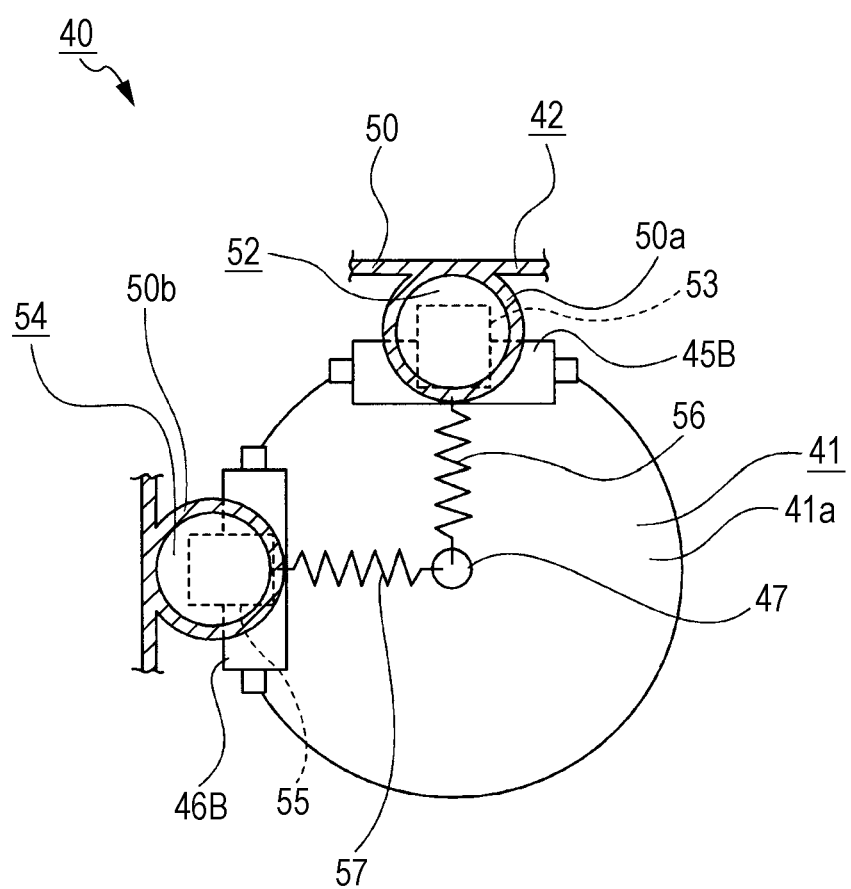
FIG. 60 is a schematic rear view.

The eighth modified example describes a first driven portion 45B and a second driven portion 46B as modified examples of the first driven portion 45 and the second driven portion 46 (refer to FIGS. 59 and 60).

The first driven portion 45B is formed in a cylindrical shape so as to be rotatable in the axial rotation direction, and functions as a rotatable roller. The axial direction of the first driven portion 45B is set as a horizontal direction, and the outer circumferential surface is in contact with the first driving portion 53. Thus, the first driven portion 45B is rotated when the first driving portion 53 is moved.

The second driven portion 46B is formed in a cylindrical shape so as to be rotatable in the axial rotation direction, and functions as a rotatable roller. The axial direction of the second driven portion 46B is set as a vertical direction, and the outer circumferential surface is in contact with the second driving portion 55. Thus, the second driven portion 46B is rotated when the second driving portion 55 is moved.

Accordingly, when the first driven portion 45B and the second driven portion 46B are used, the loads caused by the contact of the first driving portion 53 with the first driven portion 45B and the contact of the second driving portion 55 with the second driven portion 46B at the time of rotation of the lens unit 41 are small, and it is possible to secure a smooth rotation operation of the lens unit 41.

Configuration (Fourth Embodiment) of Image Blur Correction Device

Next, a configuration of an image blur correction device 40A according to a fourth embodiment will be described (refer to FIGS. 61 to 64). The image blur correction device 40A is provided in, for example, the imaging apparatus 4.

In addition, the image blur correction device 40A to be described later is different, compared with the image blur correction device 40 according to the third embodiment, in that the lens unit is configured to be also rotatable in the third direction and the shape of the driven portion is different. Accordingly, in the image blur correction device 40A, compared with the image blur correction device 40, only different parts will be described in detail, the other parts will be represented by numerals and signs the same as the numerals and signs used in the image blur correction device 40, and the description thereof will be omitted.

The image blur correction device 40A has a lens unit 41A and a fixing member 42A that supports the lens unit 41A.

A third driven portion 58, which protrudes leftward from the sliding portion 44, is provided on the lens unit 41A. A supporting hole 58a, which has a gentle arc shape convex toward the outside, is formed on the third driven portion 58.

A third holding portion 51b is provided at the left end portion of the annular portion 51A of the fixing member 42A. The annular portion 51A is formed in a shape which does not interfere with the third driven portion 58.

In the lens unit 41A, the sliding portion 44 is rotatably supported on the annular portion 51A of the fixing member 42A with the spherical objects 48, 48, . . . interposed therebetween. In the state where the lens unit 41A is supported on the fixing member 42A, the supporting surface 51a of the annular portion 51A is in contact with the spherical objects 48, 48, . . . , and the lens unit 41A is rotated with the spherical objects 48, 48, . . . interposed.

In addition, a dropout prevention portion, which is not shown in the drawing, is provided on the lens unit 41A or the fixing member 42A. The dropout prevention portion prevents the spherical objects 48, 48, . . . , which are interposed between the supporting surface 51a and the sliding portion 44, from dropping out.

The third holding portion 51b of the annular portion 51A in the fixing member 42A holds a third actuator 59. The third actuator 59 has a third driving shaft 59a that is movable in the vertical direction, and a third driving portion 60 is fixed onto the third driving shaft 59a. Accordingly, the third driving portion 60 is moved in the vertical direction by movement of the third driving shaft 59a.

The intermediate part of the third driving portion 60 is provided as a sliding engagement portion 60a which is made to be smaller than the other parts thereof. The outer shape of the sliding engagement portion 60a is formed to be a rectangular shape or a circular shape.

In the third driving portion 60, surfaces positioned on both sides of the sliding engagement portion 60a are formed as interference prevention surfaces 60b and 60b having spherical shapes, respectively. The interference prevention surfaces 60b and 60b are formed in shapes which are convex toward the sliding engagement portion 60a, respectively.

The sliding engagement portion 60a of the third driving portion 60 is supported to be slidable by the supporting hole 58a of the third driven portion 58, and is configured not to be rotatable in the shaft rotation direction of the third driving shaft 59a and not to be movable in the shaft direction thereof with respect to the third driven portion 58.

The lens unit 41A is configured to be rotatable in the first direction (pitching direction), which is the axial rotation direction of the first fulcrum axis S1, relative to the fixing member 42A. Further, the lens unit 41A is configured to be rotatable in the second direction (yawing direction), which is the axial rotation direction of the second fulcrum axis S2, relative to the fixing member 42A. Furthermore, the lens unit 41A is configured to be rotatable in the third direction (rolling direction), which is the axial rotation direction of the third fulcrum axis S3 (optical axis P), relative to the fixing member 42A.

The intersection point of the first fulcrum axis S1, the second fulcrum axis S2, and the third fulcrum axis S3 (optical axis P) is set as the reference point M, and the reference point M is set as a rotation fulcrum of the lens unit 41A.

The first driven portion 45A and the second driven portion 46A are provided at the back end portion of the lens unit 41A.

The first driven portion 45A is provided at the upper end portion of the lens unit 41A, and is formed in an arc shape centered on the reference point M. The second driven portion 46A is provided at the left end portion of the lens unit 41A, and is formed in an arc shape centered on the reference point M.

Operation (Fourth Embodiment) of Image Blur Correction Device

Hereinafter, a blur correction operation in the image blur correction device 40A will be described (refer to FIGS. 61 to 67).

Figure 61:
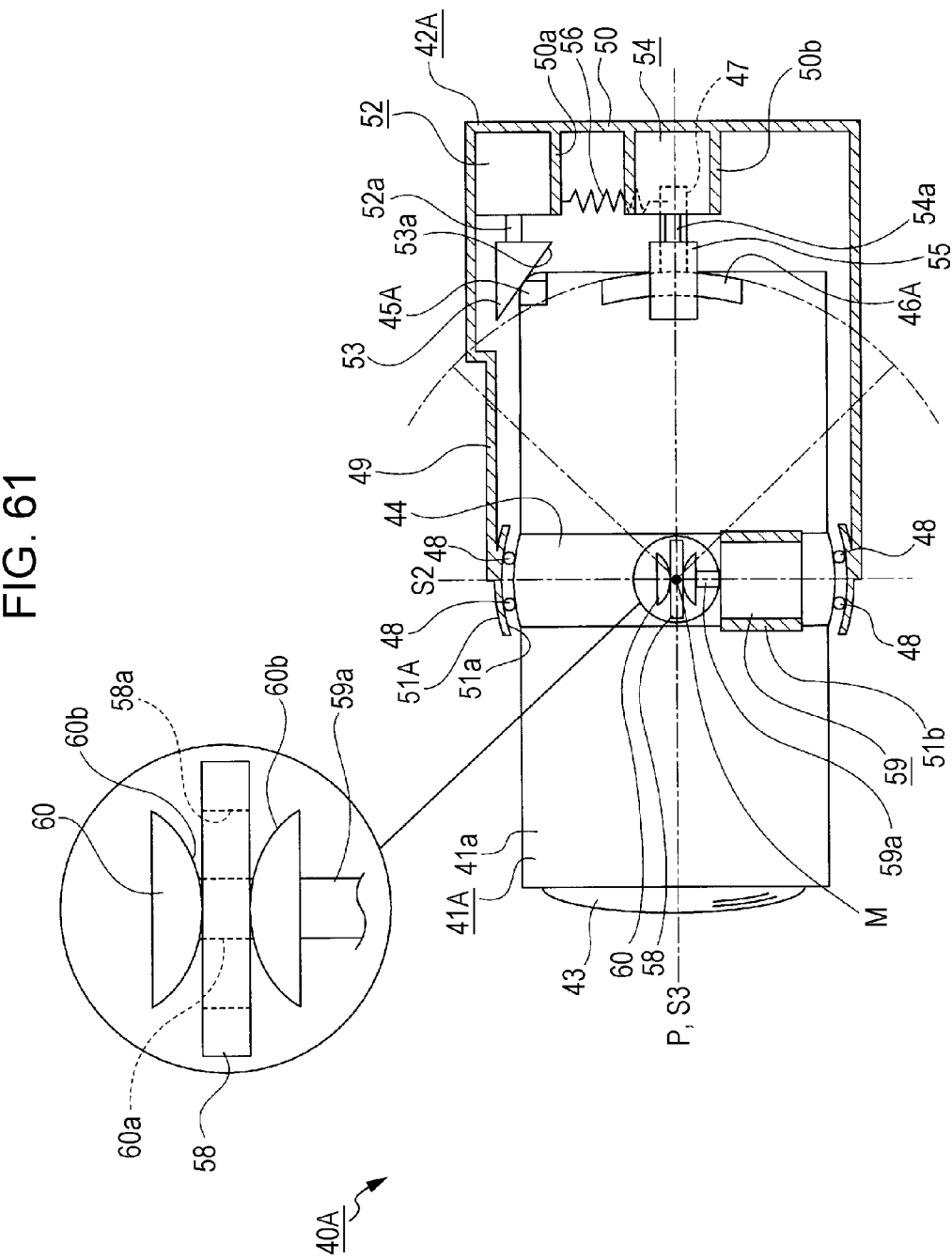
FIG. 61 is a schematic side view illustrating an image blur correction device according to the fourth embodiment together with FIGS. 62 to 67.
Figure 62:
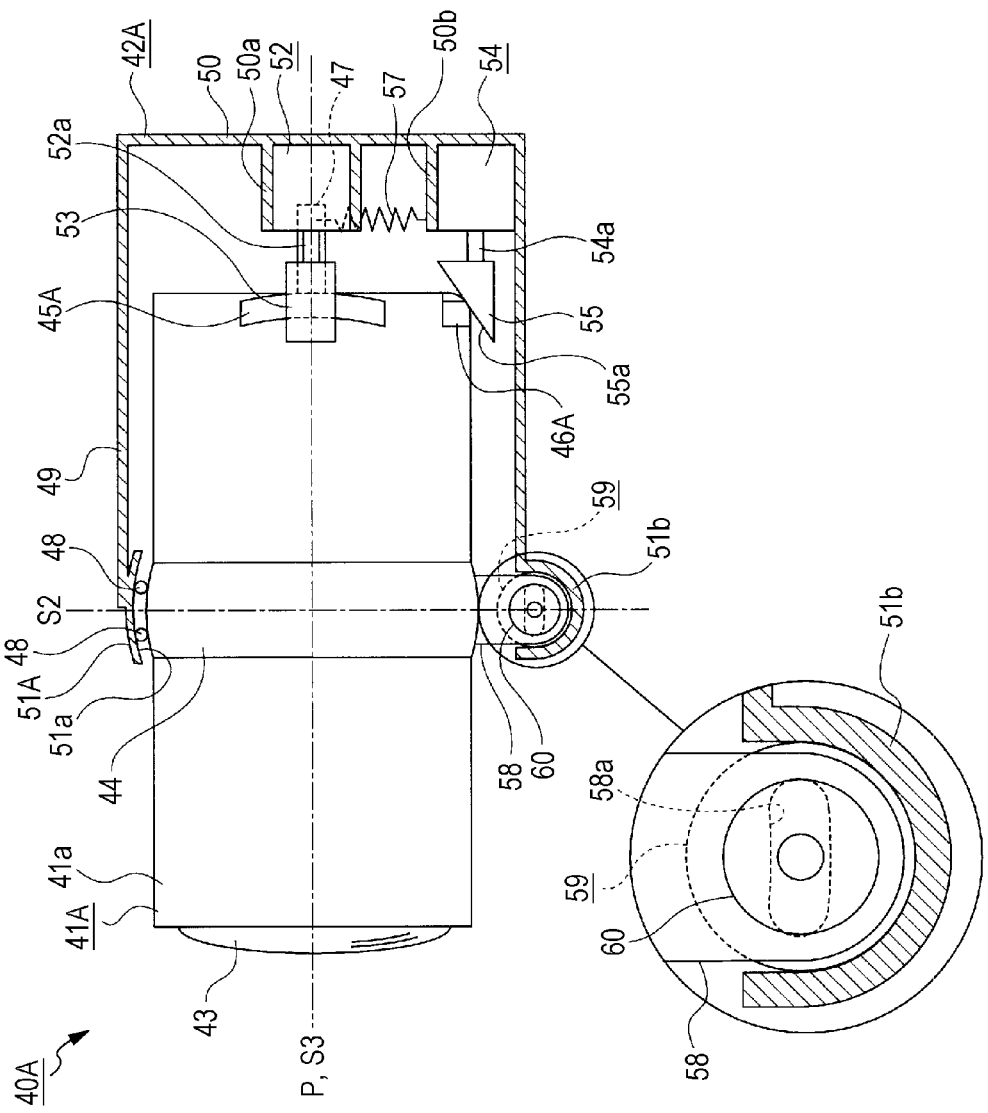
FIG. 62 is a schematic top plan view of the image blur correction device.
Figure 63:
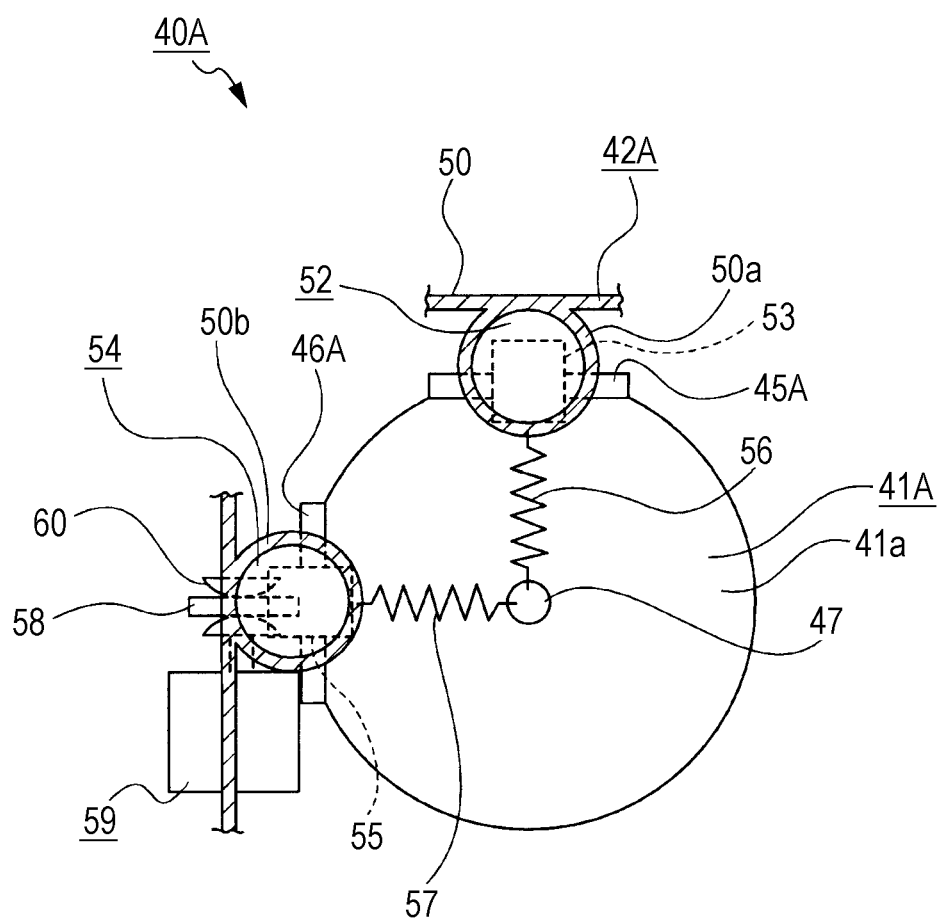
FIG. 63 is a schematic rear view of the image blur correction device.
Figure 64:
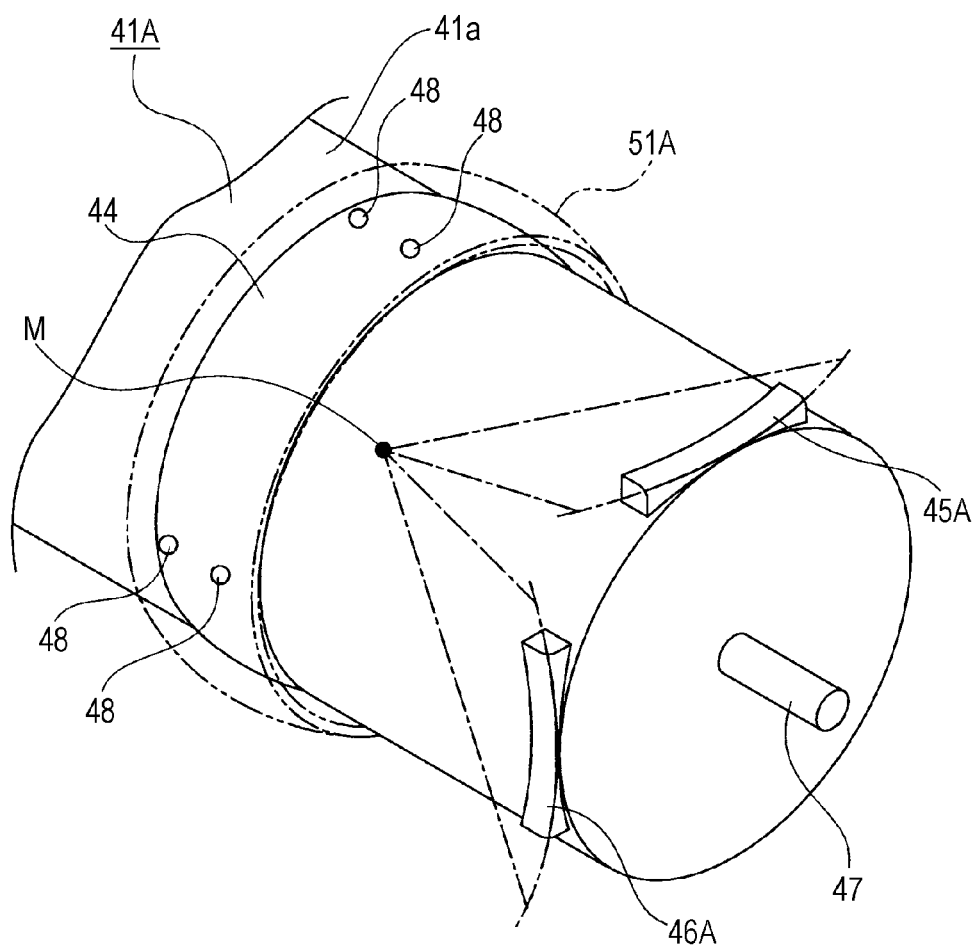
FIG. 64 is a schematic perspective view of the lens unit.

In a state where the blur correction operation is not performed, the image blur correction device 40A is at a reference position at which the device is not rotated in any one direction of the first direction, the second direction, and the third direction (refer to FIGS. 61 to 63).

Figure 65:
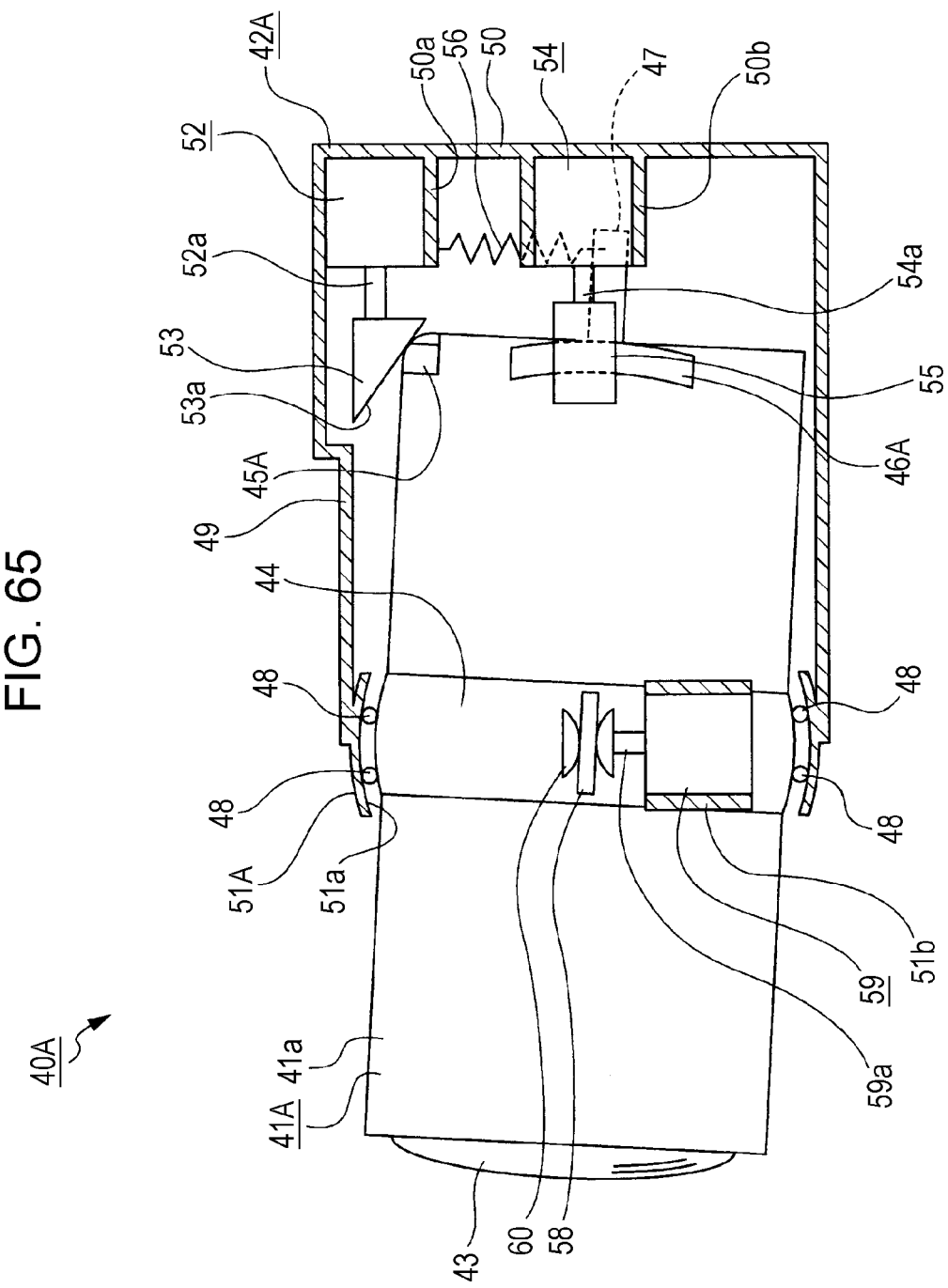
FIG. 65 is a schematic side view illustrating an operation of the image blur correction device in a condition where the lens unit is rotated in the first direction together with FIGS. 66 and 67.

First, a blur correction operation in the first direction (pitching direction) in the image blur correction device 40A will be described (refer to FIG. 65).

In the image blur correction device 40A, when the first driving shaft 52a of the first actuator 52 is moved frontward and thereby the first driving portion 53 is moved frontward, the first operating surface 53a slides on the first driven portion 45A. Thereby, the lens unit 41A is rotated about the first fulcrum axis S1 as a fulcrum in the first direction in which the photography lens 13 faces slightly upward against elastic force of the first bias spring 56.

When the first driving portion 53 is moved frontward and the lens unit 41A is rotated in the first direction, the second operating surface 55a slides on the second driven portion 46A. At this time, since the second driven portion 46A is formed in an arc shape centered on the reference point M, the position of contact of the second driven portion 46A with the second operating surface 55a of the second driving portion 55 is not changed in the front-back direction.

Simultaneously, the third driven portion 58 comes into contact with the third driving portion 60 of the third actuator 59. Thus, in accordance with the rotation of the lens unit 41A in the first direction, the third driving portion 60 is oblique to the third driven portion 58 in the vertical direction. However, the interference prevention surfaces 60b and 60b prevents the third driving portion 60 and the third driven portion 58 from interfering with each other.

On the other hand, in the image blur correction device 40A, when the first driving shaft 52a of the first actuator 52 is moved backward and thereby the first driving portion 53 is moved backward, the first operating surface 53a slides on the first driven portion 45A. Thereby, the lens unit 41A is rotated about the first fulcrum axis S1 as a fulcrum in the first direction in which the photography lens 13 faces slightly downward due to elastic force of the first bias spring 56.

When the first driving portion 53 is moved backward and the lens unit 41A is rotated in the first direction, the second operating surface 55a slides on the second driven portion 46A. At this time, since the second driven portion 46A is formed in an arc shape centered on the reference point M, the position of contact of the second driven portion 46A with the second operating surface 55a of the second driving portion 55 is not changed in the front-back direction.

Simultaneously, the third driven portion 58 comes into contact with the third driving portion 60 of the third actuator 59. Thus, in accordance with the rotation of the lens unit 41A in the first direction, the third driving portion 60 is oblique to the third driven portion 58 in the vertical direction. However, the interference prevention surfaces 60b and 60b prevent the third driving portion 60 and the third driven portion 58 from interfering with each other.

When the lens unit 41A is rotated in the first direction in such a manner, in accordance with the rotation of the lens unit 41A, the condition of contact between the second driving portion 55 and the second driven portion 46A is changed, and the interference prevention surfaces 60b and 60b prevent the third driving portion 60 and the third driven portion 58 from interfering with each other. Hence, it is difficult for unnecessary load to be applied to the lens unit 41A from the second driving portion 55 and the third driving portion 60. Accordingly, the lens unit 41A is smoothly rotated in the first direction.

Further, by using the second driven portion 46A which is formed in an arc shape, the position of contact of the second driven portion 46A with the second operating surface 55a is not changed in the front-back direction when the lens unit 41A is rotated in the first direction, and positional deviation in the second direction does not occur when the lens unit 41A is rotated in the first direction. Thus, it is possible to improve the accuracy in correction of the blur correction operation.

Figure 66:
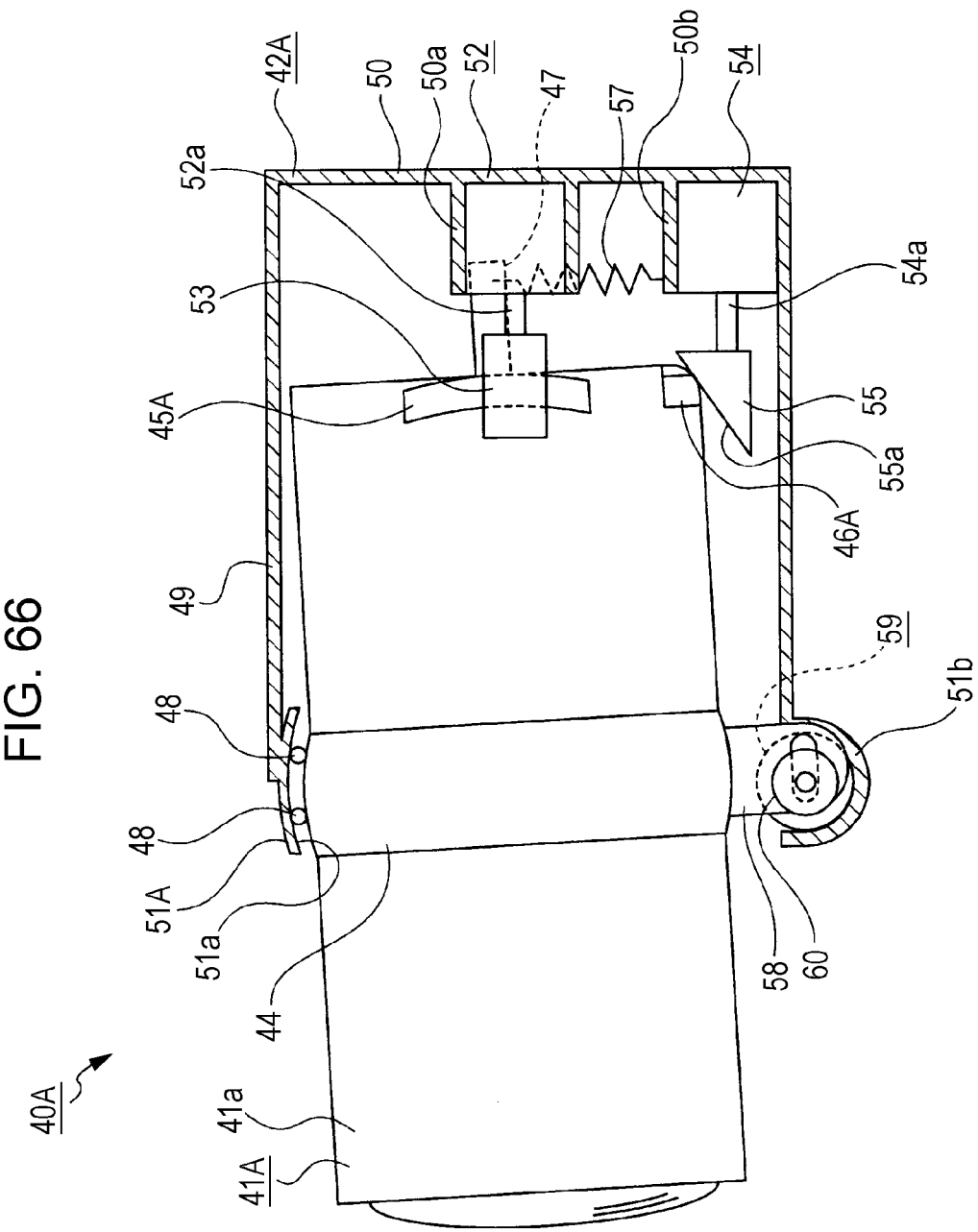
FIG. 66 is a schematic top plan view illustrating a condition where the lens unit is rotated in the second direction.

Next, a blur correction operation in the second direction (yawing direction) in the image blur correction device 40A will be described (refer to FIG. 66).

In the image blur correction device 40A, when the second driving shaft 54a of the second actuator 54 is moved frontward and thereby the second driving portion 55 is moved frontward, the second operating surface 55a slides on the second driven portion 46A. Thereby, the lens unit 41A is rotated about the second fulcrum axis S2 as a fulcrum in the second direction in which the photography lens 13 faces slightly leftward against elastic force of the second bias spring 57.

When the second driving portion 55 is moved frontward and the lens unit 41A is rotated in the second direction, the first operating surface 53a slides on the first driven portion 45A. At this time, since the first driven portion 45A is formed in an arc shape centered on the reference point M, the position of contact of the first driven portion 45A with the first operating surface 53a of the first driving portion 53 is not changed in the front-back direction.

Simultaneously, the third driving portion 60 of the third actuator 59 slides on the third driven portion 58 in accordance with the rotation of the lens unit 41A in the second direction, and the engagement position of the supporting hole 58a is changed.

On the other hand, in the image blur correction device 40A, when the second driving shaft 54a of the second actuator 54 is moved backward and thereby the second driving portion 55 is moved backward, the second operating surface 55a slides on the second driven portion 46A. Thereby, the lens unit 41A is rotated about the second fulcrum axis S2 as a fulcrum in the second direction in which the photography lens 13 faces slightly rightward due to elastic force of the second bias spring 57.

When the second driving portion 55 is moved backward and the lens unit 41A is rotated in the second direction, the first operating surface 53a slides on the first driven portion 45A. At this time, since the first driven portion 45A is formed in an arc shape centered on the reference point M, the position of contact of the first driven portion 45A with the first operating surface 53a of the first driving portion 53 is not changed in the front-back direction.

Simultaneously, the third driving portion 60 of the third actuator 59 slides on the third driven portion 58 in accordance with the rotation of the lens unit 41A in the second direction, and the engagement position of the supporting hole 58a is changed.

When the lens unit 41A is rotated in the second direction in such a manner, in accordance with the rotation of the lens unit 41A, the condition of contact between the first driving portion 53 and the first driven portion 45A is changed, the third driving portion 60 slides on the third driven portion 58, and the engagement position of the supporting hole 58a is changed. Hence, it is difficult for unnecessary load to be applied to the lens unit 41A from the first driving portion 53 and the third driving portion 60. Accordingly, the lens unit 41A is smoothly rotated in the second direction.

Further, by using the first driven portion 45A which is formed in an arc shape, the position of contact of the first driven portion 45A with the first operating surface 53a is not changed in the front-back direction when the lens unit 41A is rotated in the second direction, and positional deviation in the first direction does not occur when the lens unit 41A is rotated in the second direction. Thus, it is possible to improve the accuracy in correction of the blur correction operation.

Figure 67:
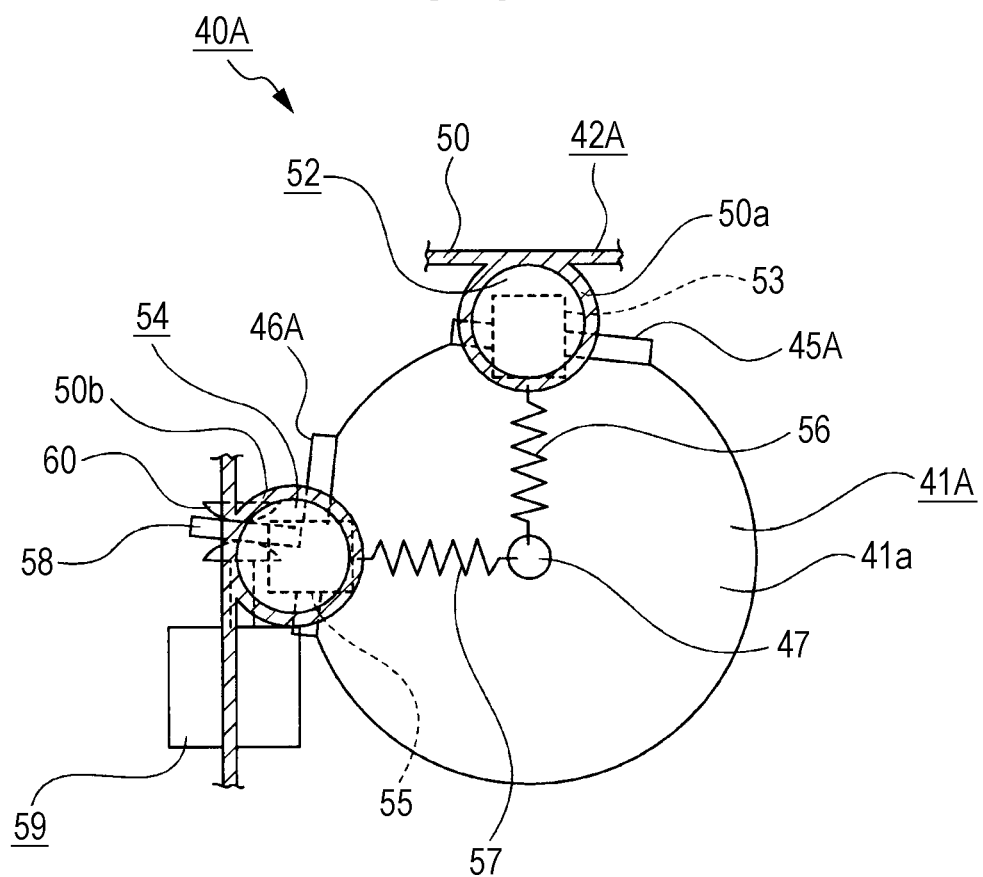
FIG. 67 is a schematic rear view illustrating a condition where the lens unit is rotated in the third direction.

Subsequently, a blur correction operation in the third direction (rolling direction) in the image blur correction device 40A will be described (refer to FIG. 67).

In the image blur correction device 40A, when the third driving shaft 59a of the third actuator 59 is moved upward and thereby the third driving portion 60 is moved upward, the third driven portion 58 is moved diagonally upward right in accordance with the movement of the third driving portion 60. Thereby, the lens unit 41A is rotated in the third direction about the third fulcrum axis S3 as a fulcrum such that the photography lens 13 is rotated toward one side.

When the third driving portion 60 is moved upward and the lens unit 41A is rotated in the third direction, the first operating surface 53a slides on the first driven portion 45A, and the second operating surface 55a slides on the second driven portion 46A. At this time, since the first driven portion 45A and the second driven portion 46A are respectively formed in arc shapes centered on the reference point M, the position of contact of the first driven portion 45A with the first operating surface 53a of the first driving portion 53 is not changed in the vertical direction, and then the position of contact of the second driven portion 46A with the second operating surface 55a of the second driving portion 55 is not changed in the horizontal direction.

In the image blur correction device 40A, when the third driving shaft 59a of the third actuator 59 is moved downward and thereby the third driving portion 60 is moved downward, the third driven portion 58 is moved diagonally downward right in accordance with the movement of the third driving portion 60. Thereby, the lens unit 41A is rotated in the third direction about the third fulcrum axis S3 as a fulcrum such that the photography lens 13 is rotated toward the other side.

When the third driving portion 60 is moved downward and the lens unit 41A is rotated in the third direction, the first operating surface 53a slides on the first driven portion 45A, and the second operating surface 55a slides on the second driven portion 46A. At this time, since the first driven portion 45A and the second driven portion 46A are respectively formed in arc shapes centered on the reference point M, the position of contact of the first driven portion 45A with the first operating surface 53a of the first driving portion 53 is not changed in the vertical direction, and then the position of contact of the second driven portion 46A with the second operating surface 55a of the second driving portion 55 is not changed in the horizontal direction.

When the lens unit 41A is rotated in the third direction in such a manner, the position of contact of the first driven portion 45A with the first operating surface 53a of the first driving portion 53 is not changed in the vertical direction, and then the position of contact of the second driven portion 46A with the second operating surface 55a of the second driving portion 55 is not changed in the horizontal direction. Accordingly, no unnecessary load to the lens unit 41A from the first driving portion 53 and the second driving portion 55 is applied. Hence, the lens unit 41A is smoothly rotated in the third direction.

In addition, in the image blur correction device 40A, although not shown in the drawing, the lens unit 41A is configured to be rotatable in the second direction in a state where the lens unit 41A is rotated in the first direction from the reference position, and the lens unit 41A is configured to be rotatable in the first direction in a state where the lens unit 41A is rotated in the second direction from the reference position.

Further, in the image blur correction device 40A, although not shown in the drawing, the lens unit 41A is configured to be rotatable in the third direction in a state where the lens unit 41A is rotated in the first direction from the reference position, and the lens unit 41A is configured to be rotatable in the first direction in a state where the lens unit 41A is rotated in the third direction from the reference position.

Furthermore, in the image blur correction device 40A, although not shown in the drawing, the lens unit 41A is configured to be rotatable in the third direction in a state where the lens unit 41A is rotated in the second direction from the reference position, and the lens unit 41A is configured to be rotatable in the second direction in a state where the lens unit 41A is rotated in the third direction from the reference position.

As described above, in the image blur correction device 40A, the two gimbal mechanisms arranged in the optical axis direction are not configured such that the lens unit is rotated. Hence, it is possible to simplify the structure and achieve reduction in the size of the device.

Further, the first fulcrum axis S1 and the second fulcrum axis S2 are positioned to be coplanar. Hence, the lens unit 41A is rotated in the first and second directions respectively about the first fulcrum axis S1 and the second fulcrum axis S2, which are positioned to be coplanar, as fulcrums. As a result, it is possible to further achieve reduction in the size.

Furthermore, the first driven portion 45A and the second driven portion 46A are provided at one end portion of the lens unit 41A in the optical axis direction. The rotation fulcrum (reference point M) of the lens unit 41A relative to the fixing member 42A is positioned to be separated from the first driven portion 45A and the second driven portion 46A in the optical axis direction.

Accordingly, it is possible to rotate the lens unit 41A through small thrust forces of the first driving portion 53 and the second driving portion 55. As a result, it is possible to achieve reduction in the sizes of the first actuator 52 and the second actuator 54.

In addition, there are provided the first bias spring 56 and the second bias spring 57 that urge the lens unit 41A in a direction in which the first driven portion 45A and the second driven portion 46A are respectively pressed against the first operating surface 53a and the second operating surface 55a.

Accordingly, it is possible to secure the conditions of the contact between the first driven portion 45A and the first operating surface 53a and the contact between the second driven portion 46A and the second operating surface 55a, and thus it is possible to secure smooth and precise rotation operations of the lens unit 41A.

In addition, the lens unit 41A is rotated in the third direction about the third fulcrum axis S3 as a fulcrum. Hence, it is possible to improve functionality, and it is possible to simplify the structure and achieve reduction in the size of the device.

Modified Examples of Image Blur Correction Device (Fourth Embodiment)

Next, a modified example (ninth modified example) of the fourth embodiment will be described (refer to FIGS. 68 to 70).

Ninth Modified Example

Figure 68:
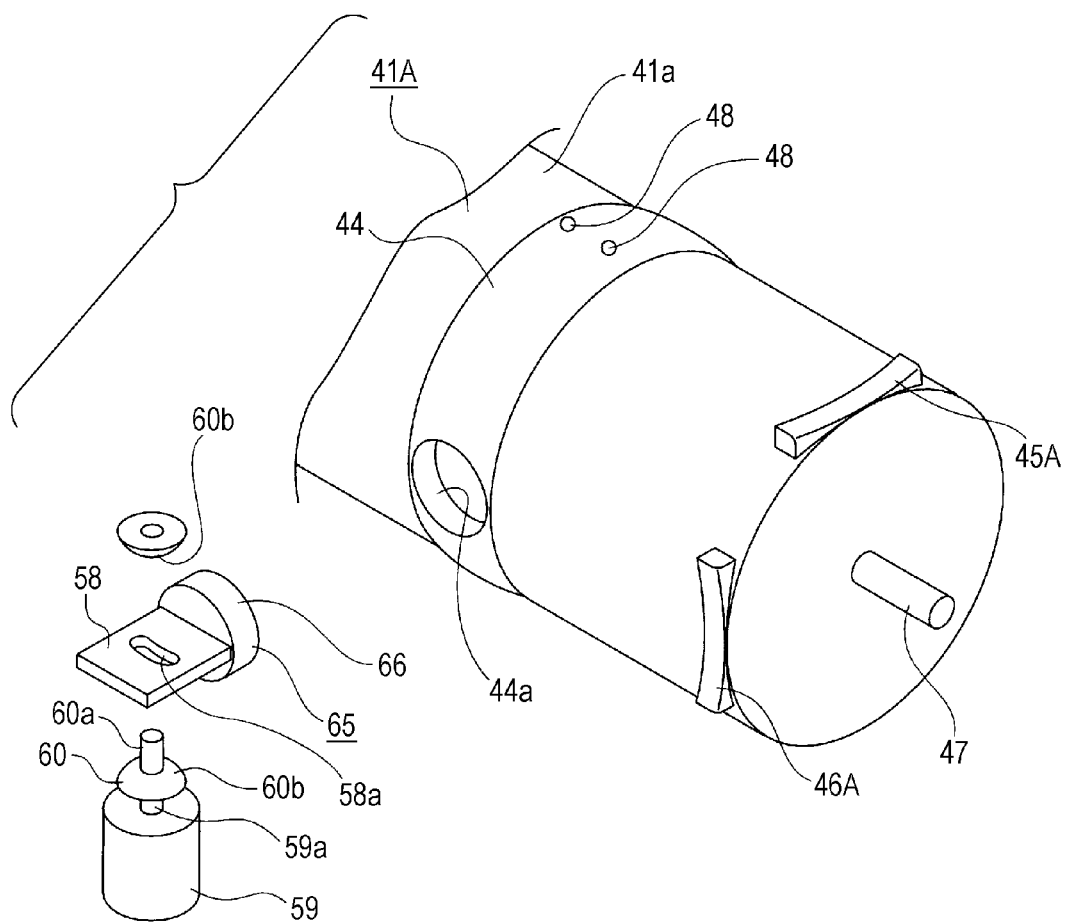
FIG. 68 is a schematic perspective view illustrating a ninth modified example together with FIGS. 69 and 70.
Figure 69:
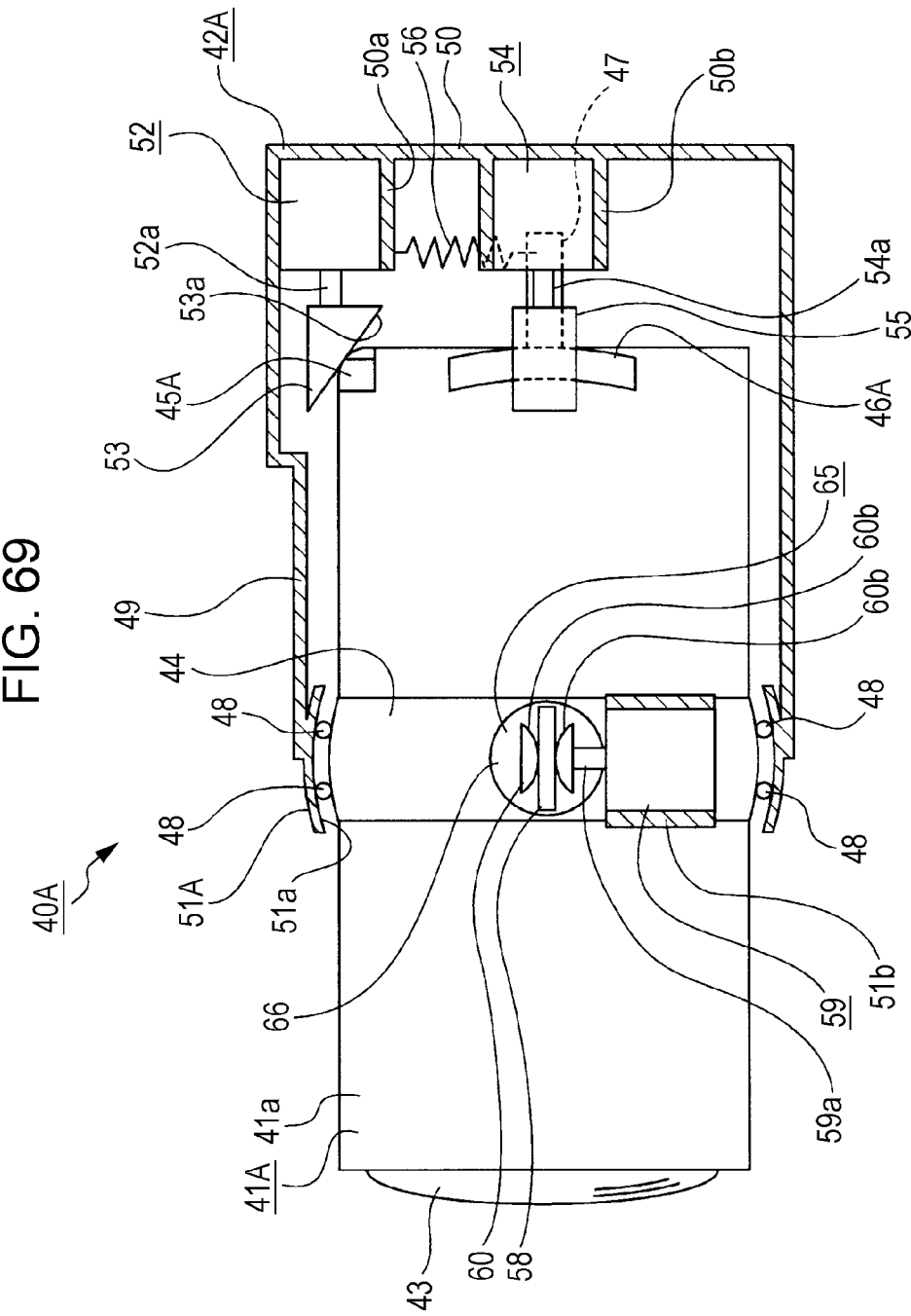
FIG. 69 is a schematic side view.

In the ninth modified example, a supporting hole 44a having a circular shape, which is open laterally, is formed on the sliding portion 44 of the lens unit 41A (refer to FIG. 68).

A rotating body 65 is provided on the lens unit 41A, and the rotating body 65 and the lens unit 41A are mutually rotatable. The rotating body 65 is formed of a discoid rotation base 66 and the third driven portion 58 which protrudes laterally from the rotation base 66 (refer to FIGS. 68 and 69).

The rotating body 65 is rotated in the axial rotation direction of the first fulcrum axis S1 relative to the lens unit 41A with the rotation base 66 inserted into the supporting hole 44a.

Figure 70:
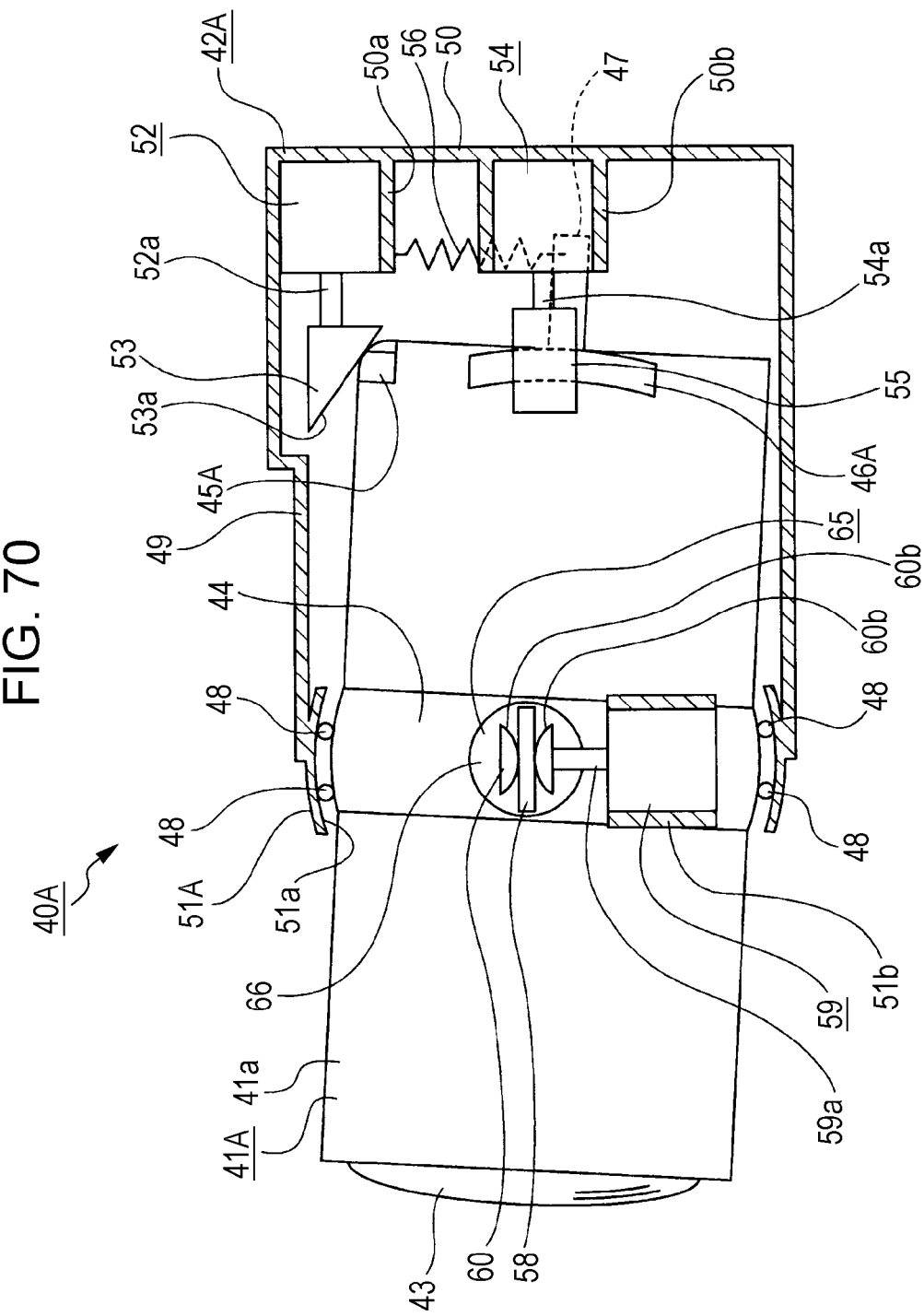
FIG. 70 is a schematic side view illustrating a condition where the lens unit is rotated.

When the first driving shaft 52a of the first actuator 52 is moved in the front-back direction and the first driving portion 53 is moved in the front-back direction, the lens unit 41A is rotated about the first fulcrum axis S1 as a fulcrum in the first direction (refer to FIG. 70).

At this time, the third driven portion 58 is sandwiched in the vertical direction by the third driving portion 60 of the third actuator 59. Since rotation of the rotating body 65 is regulated, the lens unit 41A is rotated in the first direction relative to the rotating body 65.

When the lens unit 41A is rotated in the first direction in such a manner, the lens unit 41A is rotated relative to the rotating body 65. Hence, it is difficult for unnecessary load to be applied to the lens unit 41A from the third driving portion 60. Accordingly, the lens unit 41A is smoothly rotated in the first direction.

In addition, the following configuration may be adopted: the rotating body 65 is provided at the upper end portion or the lower end portion of the lens unit 41A, and the rotating body 65 is rotatable in the axial rotation direction of the second fulcrum axis S2 relative to the lens unit 41A. In this case, when the lens unit 41A is rotated in the second direction, the rotating body 65 is rotated about the second fulcrum axis S2 as a fulcrum relative to the lens unit 41A. Hence, it is possible to smoothly rotate the lens unit 41A in the second direction.

In addition, in the ninth modified example using the rotating body 65, the interference prevention surfaces 60b and 60b having a curved shape are not formed on the third driving portion 60, and a surface of the third driving portion 60 being in contact with the third driven portion 58 may be formed to be planar.

Others

In the image blur correction device 40 according to the third embodiment and the image blur correction device 40A according to the fourth embodiment, a driving portion, which has an operating surface formed in a curved shape used in the first modified example, may also be used.

By using the driving portion that has the operating surface formed in a curved shape, when the lens unit 41 or 41A is rotated in a predetermined direction, positional deviation in other directions is small, and it is possible to improve the accuracy in correction of the blur correction operation.

Further, the operating surface constantly comes into line contact or point contact with the driven portion at the time of rotation of the lens unit 41 or 41A. Hence, the load caused by the contact at the time of rotation of the lens unit 41 or 41A is small, and thus it is possible to secure a smooth rotation operation of the lens unit 41 or 41A.

Further, in the image blur correction device 40 according to the third embodiment and the image blur correction device 40A according to the fourth embodiment, a driving portion having an operating surface may also be used. The operating surface is formed of the two planar portions used in the second modified example.

By using the driving portion having the operating surface that is formed of the two planar portions used in the second modified example, when the lens unit 41 or 41A is rotated in a predetermined direction, there is no positional deviation in other directions, and it is possible to improve the accuracy in correction of the blur correction operation.

Further, the intersection line of the operating surface constantly comes into line contact or point contact with the driven portion at the time of rotation of the lens unit 41 or 41A. Hence, the load caused by the contact at the time of rotation of the lens unit 41 or 41A is small, and thus it is possible to secure a smooth rotation operation of the lens unit 41 or 41A.

Figure 46:
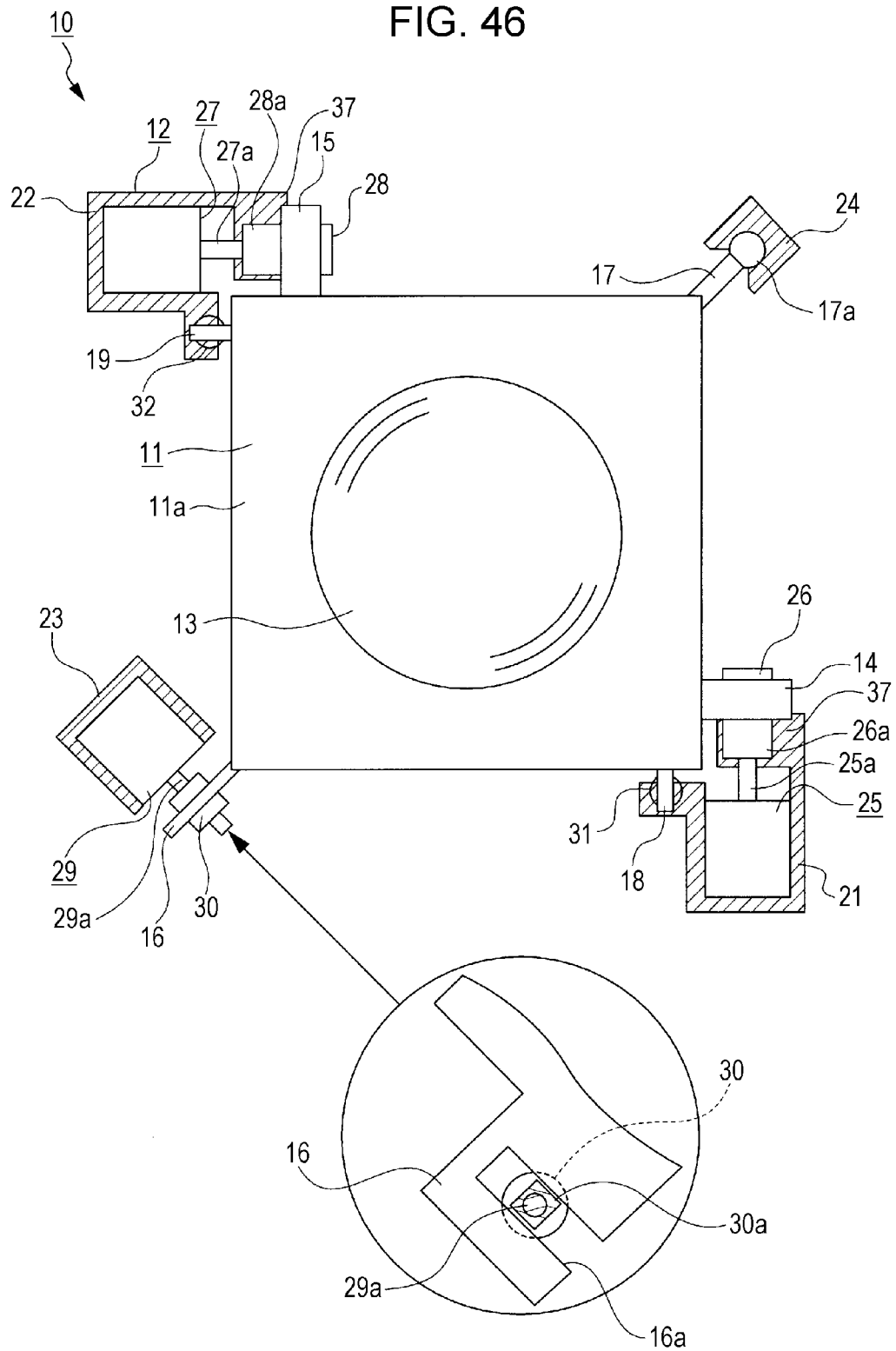
FIG. 46 is a schematic front view illustrating an example in which a rotatable-shaft-type actuator is used as the actuator together with FIG. 47.
Figure 47:
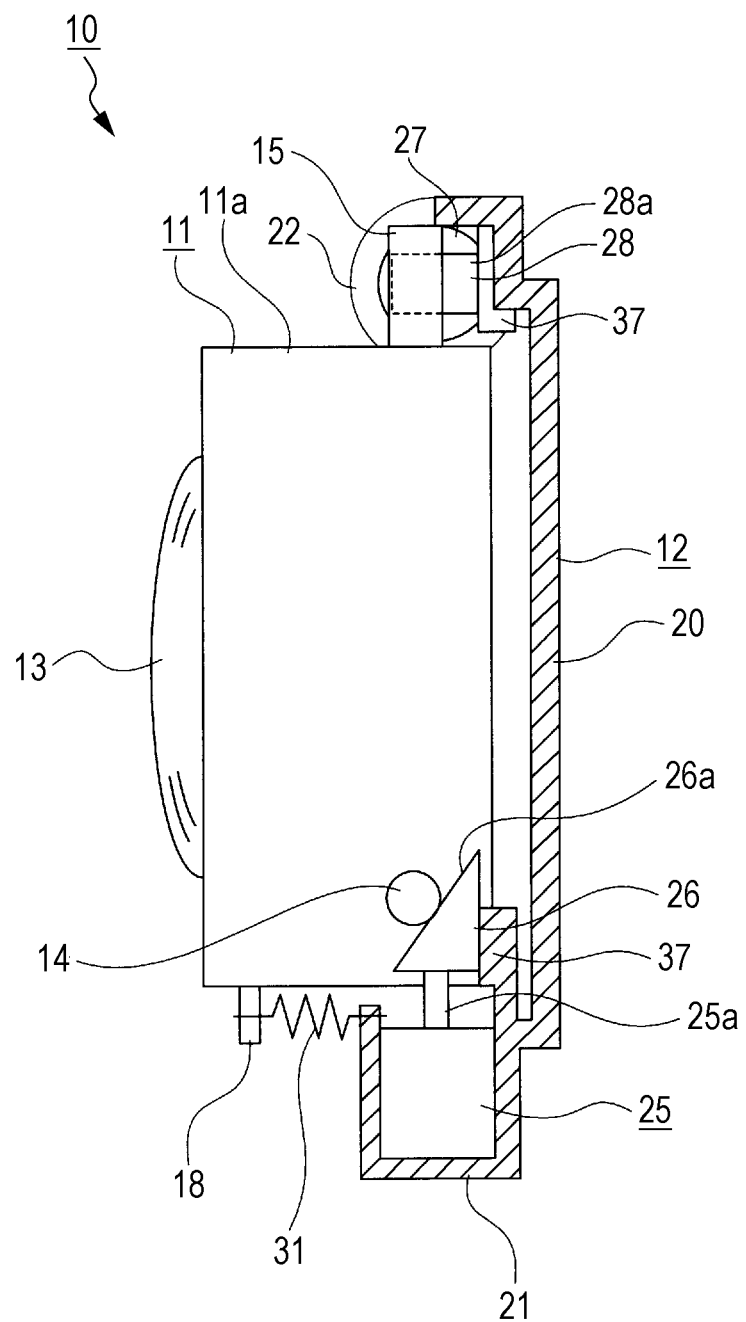
FIG. 47 is a schematic side view.
Figure 48:
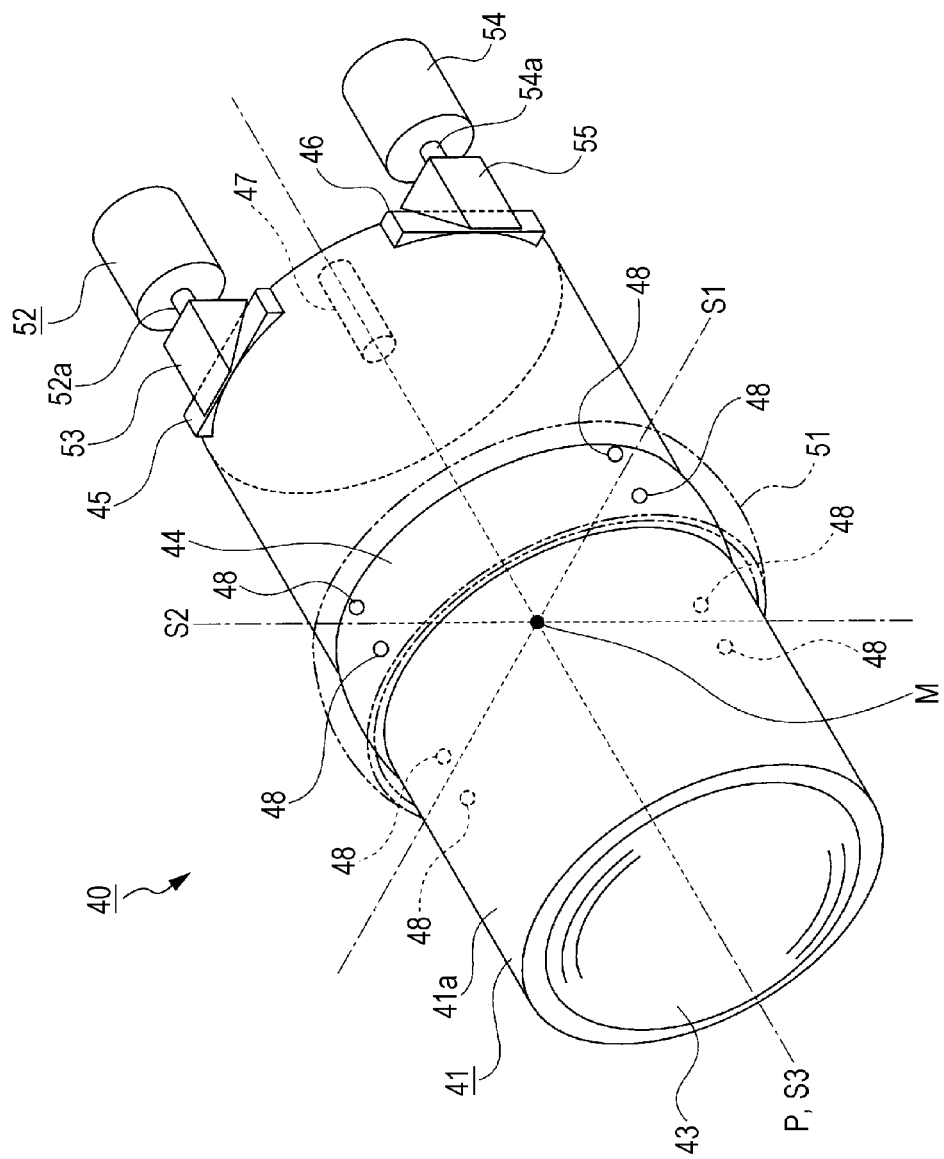
FIG. 48 is a schematic perspective view illustrating an image blur correction device according to a third embodiment together with FIGS. 49 to 55.

In addition, also in the image blur correction device 40 according to the third embodiment and the image blur correction device 40A according to the fourth embodiment, as shown in FIGS. 46 and 47, rotation of the driving portion is regulated by the rotation regulation portion. Thereby, it is possible to use a rotatable-shaft-type actuator as the actuator.

Further, also in the image blur correction device 40A according to the fourth embodiment, it is possible to apply configurations of the seventh modified example and the eighth modified example.

Embodiment of Imaging Apparatus

Figure 71:
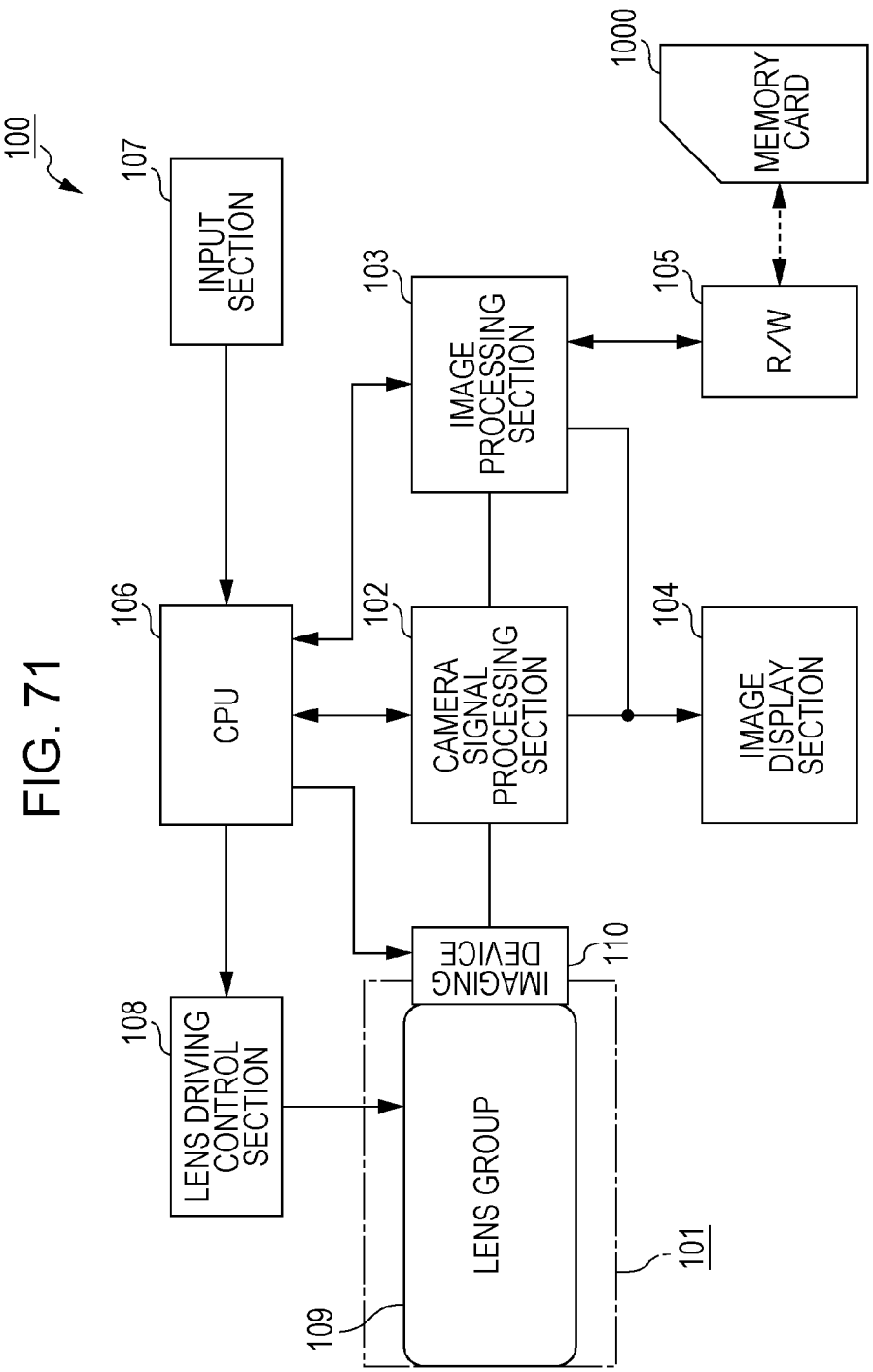
FIG. 71 is a block diagram of an imaging apparatus.

FIG. 71 is a block diagram of a mobile phone or a video camera as an imaging apparatus according to an embodiment of the present technology.

An imaging apparatus (mobile phone or video camera) 100 (corresponds to an imaging apparatus 1 or 4) includes: a lens unit 101 (corresponds to lens unit 11, 11A, 41, or 41A) that is in charge of an imaging function; a camera signal processing section 102 that performs signal processing such as analog-digital conversion on a photographed image signal; and an image processing section 103 that performs recording reproduction processing on an image signal. Further, the imaging apparatus 100 includes: an image display section 104 such as a liquid crystal panel that displays the photographed image and the like; a reader/writer (R/W) 105 that writes and reads the image signal into and from a memory card 1000; a central processing unit (CPU) 106 that controls the entire imaging apparatus 100; an input section 107 that is formed of various switches and the like for causing a user to perform necessary operations; and a lens driving control section 108 that controls driving of the lens disposed in the lens unit 101.

The lens unit 101 includes: an optical system that includes a lens group 109; an imaging device 110 such as a charge coupled device (CCD) or a complementary metal-oxide semiconductor (CMOS); and the like.

The camera signal processing section 102 performs various kinds of signal processing such as conversion of an output signal from the imaging device 110 into a digital signal, noise removal, image quality correction, and conversion into a luminance color difference signal.

The image processing section 103 performs compression coding and expansion decoding processing on the image signal based on a predetermined image data format, processing of converting data specification such as resolution, and the like.

The image display section 104 has a function of displaying a state of a user's operation performed on the input section 107 and various kinds of data such as the photographed image.

The R/W 105 writes the image data, which is encoded by the image processing section 103, into the memory card 1000, and reads the image data which is recorded in the memory card 1000.

The CPU 106 functions as a control processing unit that controls respective circuit blocks provided in the imaging apparatus 100, and controls the respective circuit blocks on the basis of an instruction input signal from the input section 107 and the like.

The input section 107 includes, for example, a shutter release button for performing a shutter operation and a selection switch for selecting an operation mode, and outputs the instruction input signal according to the user's operation to the CPU 106.

The lens driving control section 108 controls a not-shown motor that drives the lenses of the lens group 109 on the basis of a control signal sent from the CPU 106.

The memory card 1000 is, for example, a semiconductor memory that is detachable from a slot connected to the R/W 105.

Hereinafter, the operations of the imaging apparatus 100 will be described.

In a photography standby state, under the control performed by the CPU 106, the signal of the image photographed by lens unit 101 is output to the image display section 104 through the camera signal processing section 102, and is displayed as a camera live view. Further, when the instruction input signal for zooming sent from the input section 107 is input, the CPU 106 outputs a control signal to the lens driving control section 108, and thereby a predetermined lens of the lens group 109 is moved on the basis of the control of the lens driving control section 108.

When a not-shown shutter of the lens unit 101 is operated by the instruction input signal sent from the input section 107, the photographed image signal is output from the camera signal processing section 102 to the image processing section 103, and is subjected to the compression coding processing so as to be converted into digital data with a predetermined data format. The converted data is output to the R/W 105, and is written into the memory card 1000.

Focusing and zooming are performed by causing the lens driving control section 108 to move the predetermined lens of the lens group 109 on the basis of a control signal sent from the CPU 106.

When the image data recorded in the memory card 1000 is reproduced, in response to the operation of the input section 107, the predetermined image data is read from the memory card 1000 through the R/W 105, and is subjected to the expansion decoding processing through the image processing section 103. Thereafter, the reproduced image signal is output to the image display section 104, and a reproduced image is displayed.

Conclusion

As described above, in the image blur correction device 10, 10A, 40, or 40A, the lens unit 11, 11A, 41, or 41A is rotated by changing the position of contact between the first operating surface 26a, 26b, 26c, 26g, or 50a and the first driven portion 14, 14A, 14B, 14C, 14D, 41a, 41d, or 41f and the position of contact between the second operating surface 28a or 52a and the second driven portion 15, 15A, 15B, 15C, 15D, 41b, 41e, or 41g.

Accordingly, the two gimbal mechanisms arranged in the optical axis direction are not configured such that the lens unit is rotated. Hence, it is possible to simplify the structure and achieve reduction in the size of the device.

Present Technology

The present technology may have the following configurations:

(1) An image blur correction device including:

a lens unit that has at least one lens and is rotatable at least in a first direction, which is an axial rotation direction of a first fulcrum axis orthogonal to an optical axis of the lens, and a second direction which is an axial rotation direction of a second fulcrum axis orthogonal to the first fulcrum axis;

a fixing member that rotatably supports the lens unit in the first direction and the second direction;

a first actuator that has a first driving portion movable in a predetermined direction so as to rotate the lens unit in the first direction; and a second actuator that has a second driving portion movable in a predetermined direction so as to rotate the lens unit in the second direction, in which an operating surface, which is oblique to the fulcrum axis, is formed on the driving portion, in which a driven portion, of which the operating surface is slidable at the time of movement of the driving portion, is provided in the lens unit, and in which the lens unit is rotated by changing a position on the operating surface coming into contact with the driven portion.

(2) The image blur correction device according to (1), in which the first fulcrum axis and the second fulcrum axis are positioned to be coplanar.

(3) The image blur correction device according to (1) or (2),
in which the lens unit is rotatable in a third direction which is an axial rotation direction of a third fulcrum axis orthogonal to both of the first fulcrum axis and the second fulcrum axis, and
in which a third actuator, which has a third driving portion movable in a predetermined direction so as to rotate the lens unit in the third direction, is provided.

(4) The image blur correction device according to any one of (1) to (3),
in which the driven portion is provided at one end in an optical axis direction, and
in which a fulcrum for rotation in the first direction and the second direction about the fixing member of the lens unit is positioned to be separated from the driven portion in the optical axis direction.

(5) The image blur correction device according to any one of (1) to (4),
in which a corner portion, of which an outer surface is formed to be rounded, is provided on the driven portion, and
in which the operating surface is slidable on the corner portion.

(6) The image blur correction device according to any one of (1) to (5), in which the driven portion is formed in an arc shape centered on the fulcrum for rotation in the first direction and the second direction of the lens unit.

(7) The image blur correction device according to any one of (1) to (6), in which the operating surface is formed in a planar shape.

(8) The image blur correction device according to any one of (1) to (6), in which the operating surface is formed in a curved shape convex toward the driven portion.

(9) The image blur correction device according to any one of (1) to (6),
in which the operating surface is formed of two planar portions which are oblique, and
in which an intersection line portion between the two planar portions is slidable on the driven portion.

(10) The image blur correction device according to any one of (1) to (9), in which a bias spring for urging the lens unit in a direction, in which the driven portion is pressed against the operating surface, is provided.

(11) The image blur correction device according to any one of (1) to (10),
in which a rotatable roller is provided as the driven portion, and
in which the driven portion is rotated when the operating surface slides on the driven portion.

(12) An imaging apparatus including:
an image blur correction device that has a lens unit having at least one lens and an outer casing, in which the lens unit is disposed, and corrects image blur by rotating the lens unit at least in a first direction, which is an axial rotation direction of a first fulcrum axis orthogonal to an optical axis of the lens, and a second direction which is an axial rotation direction of a second fulcrum axis orthogonal to the first fulcrum axis,
in which the image blur correction device includes
a fixing member that rotatably supports the lens unit in the first direction and the second direction,
a first actuator that has a first driving portion movable in a predetermined direction so as to rotate the lens unit in the first direction, and
a second actuator that has a second driving portion movable in a predetermined direction so as to rotate the lens unit in the second direction,
in which an operating surface, which is oblique to the fulcrum axis, is formed on the driving portion,
in which a driven portion, of which the operating surface is slidable at the time of movement of the driving portion, is provided in the lens unit, and
in which the lens unit is rotated by changing a position on the operating surface coming into contact with the driven portion.

It should be understood by those skilled in the art that various modifications, combinations, sub-combinations and alterations may occur depending on design requirements and other factors insofar as they are within the scope of the appended claims or the equivalents thereof.

What is claimed is:
1. An image blur correction device, comprising:
a lens unit that has at least one lens and is configured to rotate at least in a first direction, which is an axial rotation direction of a first fulcrum axis orthogonal to an optical axis of the lens, and a second direction which is an axial rotation direction of a second fulcrum axis orthogonal to the first fulcrum axis; and
a fixing member that is configured to rotatably support the lens unit in the first direction and the second direction, wherein the fixing member comprises:
a first actuator having a first driving portion configured to rotate the lens unit in the first direction;
a second actuator having a second driving portion configured to rotate the lens unit in the second direction,
a first operating surface on the first driving portion, and
a second operating surface on the second driving portion, and
wherein the lens unit comprises:
a first driven portion, on which the first operating surface is slidable at the time of movement of the first driving portion, and
a second driven portion, on which the second operating surface is slidable at the time of movement of the second driving portion,
wherein one of the first driven portion comprises a first corner portion of which an outer surface is rounded, or the second driven portion comprises a second corner portion of which an outer surface is rounded,
wherein one of the first operating surface or the second operating surface is slidable on one of the first corner portion or the second corner portion respectively, and
wherein the lens unit is further configured to rotate based on a change in a position of the first operating surface that comes into contact with the first driven portion.

2. The image blur correction device according to claim 1, wherein the first fulcrum axis and the second fulcrum axis are coplanar.

3. The image blur correction device according to claim 1, wherein the lens unit is further configured to rotate in a third direction which is an axial rotation direction of a third fulcrum axis orthogonal to the first fulcrum axis and the second fulcrum axis, and wherein a third actuator having a third driving portion is configured to move in a third direction to rotate the lens unit in the third direction.

4. The image blur correction device according to claim 1, wherein the first driven portion and the second driven portion are positioned at one end in an optical axis direction, and
wherein a fulcrum for rotation in the first direction and the second direction relative to the fixing member of the lens unit is separated from the first driven portion and the second driven portion in the optical axis direction.

5. The image blur correction device according to claim 4, wherein one of the first driven portion or the second driven portion are of arc shape centered on the fulcrum for rotation in one of the first direction or the second direction of the lens unit.

6. The image blur correction device according to claim 1, wherein one of the first operating surface or the second operating surface is planar in shape.

7. The image blur correction device according to claim 1, wherein one of the first operating surface or the second operating surface is curved in shape and convex towards one of the first driven portion or the second driven portion respectively.

8. The image blur correction device according to claim 1, wherein one of the first operating surface or the second operating surface is two planar portions which are oblique, and
wherein an intersection line portion between each of the two planar portions is slidable on a respective one of the first driven portion or the second driven portion.

9. The image blur correction device according to claim 1, further comprising
a bias spring that is configured to urge the lens unit to press one of the first driven portion or the second driven portion against a respective one of the first operating surface or the second operating surface.

10. The image blur correction device according to claim 1,
wherein a rotatable roller is provided as one of the first driven portion or the second driven portion, and
wherein one of the first driven portion or the second driven portion is rotated based on a respective one of the first operating surface or the second operating surface that is configured to slide on the respective first driven portion or the second driven portion.

11. An imaging apparatus, comprising:
an image blur correction device that has a lens unit having at least one lens and an outer casing to hold the lens unit, and is configured to correct image blur by rotation of the lens unit at least in a first direction, which is an axial rotation direction of a first fulcrum axis orthogonal to an optical axis of the lens, and a second direction which is an axial rotation direction of a second fulcrum axis orthogonal to the first fulcrum axis,
wherein the image blur correction device includes:
a fixing member that is configured to rotatably support the lens unit in the first direction and the second direction,
wherein the fixing member comprises:
a first actuator having a first driving portion configured to rotate the lens unit in the first direction,
a second actuator having a second driving portion configured to rotate the lens unit in the second direction,
a first operating surface on the first driving portion, and
a second operating surface on the second driving portion, and
wherein the lens unit comprises:
a first driven portion, on which the first operating surface is slidable at the time of movement of the first driving portion, and
a second driven portion, on which the second operating surface is slidable at the time of movement of the second driving portion,
wherein one of the first driven portion comprises a first corner portion of which an outer surface is rounded, or the second driven portion comprises a second corner portion of which an outer surface is rounded,
wherein one of the first operating surface or the second operating surface is slidable on one of the first corner portion or the second corner portion respectively, and
wherein the lens unit is further configured to rotate based on a change in a position of the first operating surface that comes into contact with the first driven portion.

12. The image blur correction device according to claim 1, wherein one of the first operating surface or the second operating surface is oblique to one of the first fulcrum axis or the second fulcrum axis respectively.

13. The image blur correction device according to claim 1, wherein the second operating surface comes into contact with the second driven portion by movement of the second actuator.

* * * * *